United States Patent
Maeda et al.

(10) Patent No.: US 7,209,716 B2
(45) Date of Patent: Apr. 24, 2007

(54) RADIO COMMUNICATION SYSTEM, RADIO STATION, AND RADIO COMMUNICATION METHOD

(75) Inventors: Koji Maeda, Yokosuka (JP); Yuji Aburakawa, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 378 days.

(21) Appl. No.: 10/786,541

(22) Filed: Feb. 26, 2004

(65) Prior Publication Data

US 2004/0171352 A1    Sep. 2, 2004

(30) Foreign Application Priority Data

Feb. 27, 2003 (JP) .............................. 2003-051894
Jun. 13, 2003 (JP) .............................. 2003-169916

(51) Int. Cl.
H04B 1/04 (2006.01)
(52) U.S. Cl. .................. 455/119; 455/115.1; 455/192.1
(58) Field of Classification Search ................ 455/119, 455/115.1, 115.2, 115.4, 296, 334, 230, 192.1, 455/192.2, 182.1, 182.2, 226.1–226.4, 63.11, 455/69
See application file for complete search history.

(56) References Cited

U.S. PATENT DOCUMENTS 4,701,935 A   10/1987 Namiki
5,600,672 A * 2/1997 Oshima et al. .......... 455/192.1
5,740,208 A * 4/1998 Hulbert et al. .............. 455/296
6,144,844 A * 11/2000 Rainish .................... 455/192.2
6,463,266 B1 10/2002 Shohara
6,493,397 B1 12/2002 Takahashi et al.
6,603,958 B1 * 8/2003 Gao et al. .................... 455/119
2002/0155811 A1 10/2002 Prismantas et al.
2002/0197958 A1 * 12/2002 Collins et al. ................ 455/63
2003/0114123 A1 * 6/2003 Prockup ..................... 455/119
2003/0220084 A1 * 11/2003 Makarov ................. 455/226.1
2005/0079850 A1 * 4/2005 Chen et al. ................. 455/334

FOREIGN PATENT DOCUMENTS

EP        0 371 433 A2    6/1990
WO       WO 92/22142     12/1992

* cited by examiner

Primary Examiner—Lana Le
(74) Attorney, Agent, or Firm—Oblon, Spivak, McClelland, Maier & Neustadt, P.C.

(57) ABSTRACT

A radio communication system comprises: a radio receiver including an interference canceller configured to generate a replica of a received signal and remove an interference signal from the received signal, and a frequency offset estimator configured to estimate a carrier frequency offset between a carrier frequency of the interference signal and a carrier frequency of a desired signal included in the received signal; and a radio transmitter including a frequency controller configured to adjust a carrier frequency of a transmitted desired signal to the carrier frequency of the interference signal based on the carrier frequency offset received from the radio receiver.

6 Claims, 25 Drawing Sheets

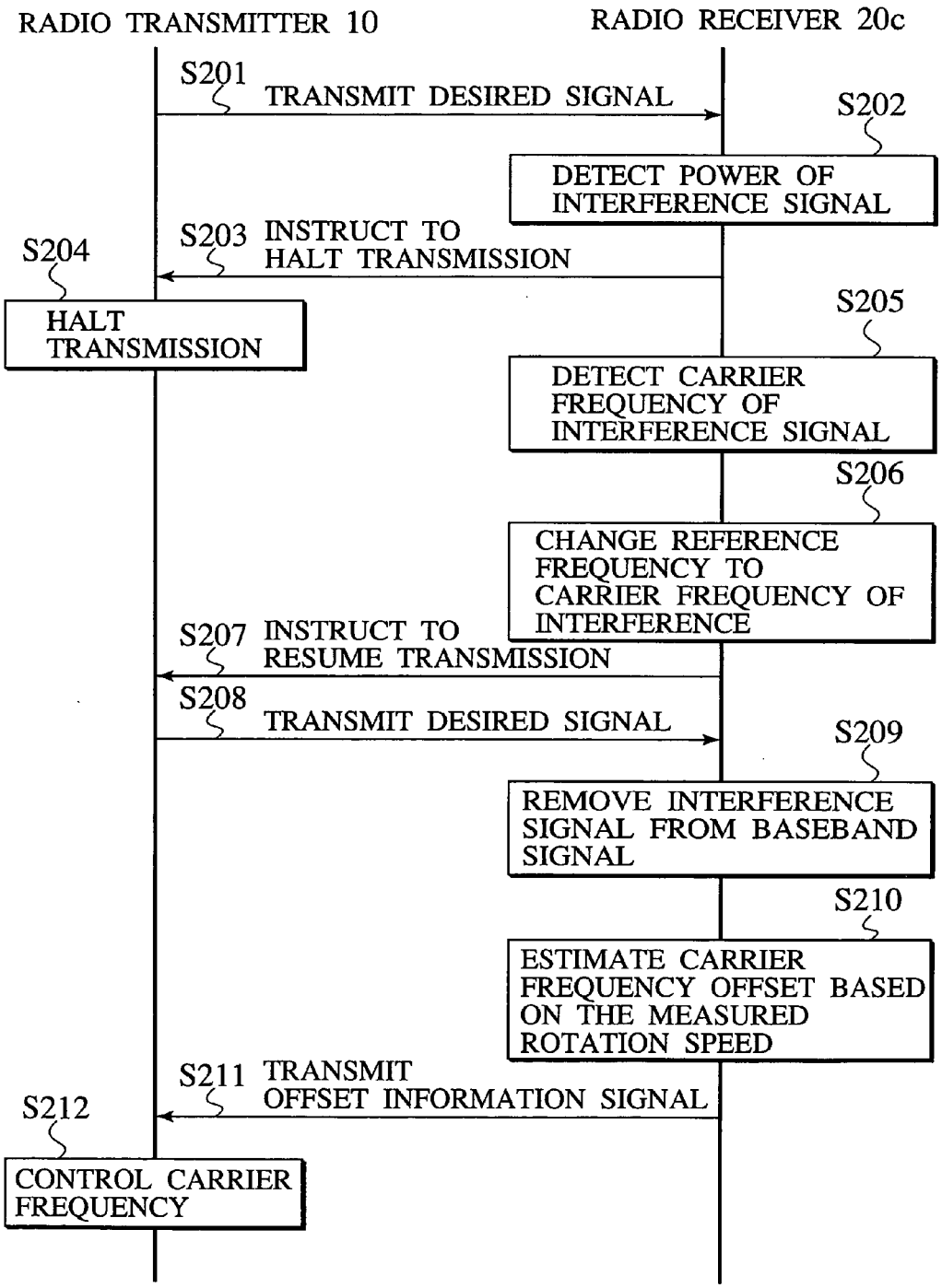

US 7,209,716 B2

RADIO COMMUNICATION SYSTEM, RADIO STATION, AND RADIO COMMUNICATION METHOD

CROSS REFERENCE TO RELATED APPLICATIONS

This application is based upon and claims the benefit of priority from the prior Japanese Patent Applications No. P2003-51894, filed on Feb. 27, 2003 and No. P2003-169916, filed on Jun. 13, 2003; the entire contents of which are incorporated herein by reference.

BACKGROUND OF THE INVENTION

1. Field of the Invention

The present invention relates to a radio communication system, a radio station, and a radio communication method.

2. Description of the Related Art

Conventionally, with the radio communication system, technology reducing affects from interference and increasing frequency utilization efficiency has been considered, since the frequency utilization efficiency deteriorates due to a plurality of radio signals interfering with each other. For example, an interference canceller is used for such interference reduction technology. As shown in FIG. 1, an interference canceller 820 in a receiver 800 estimates the propagation path for an interference signal and a desired signal from a received signal, which is received by an antenna 810, and information regarding the desired signal and the interference signal. The received signal includes the desired signal and the interference signal influenced by propagation path functions $h_i$ and $h_d$ and noise n. The interference canceller 820 removes the interference signal from the received signal by generating a replica of the received signal using the estimated propagation path (e.g., Japanese Patent Application Laid-Open No. 2002-43962).

With the interference canceller 820, a determination unit 821 outputs desired signal symbol sequence candidates and interference signal symbol sequence candidates. A propagation path estimator 822 estimates propagation path estimation values $h_i'$ and $h_d'$. The propagation path estimator 822 multiplies the desired signal symbol sequence candidates and interference signal symbol sequence candidates by the propagation path estimation values $h_i'$ and $h_d'$ so as to generate replicas of the desired signal and the interference signal. The determination unit 821 calculates the difference between the actual received signal and the replica, and outputs the desired signal components of the desired signal symbol sequence candidate and the interference signal symbol sequence candidate, which have a minimum absolute value of the calculated difference, as a received desired signal sequence.

Specifically, the determination unit 821 represents a signal vector obtained by detecting and sampling the received signal on a coordinate as signal points, and determines a symbol sequence corresponding to the received signal replica, which has a signal point constellation closest to the signal vector obtained by sampling, as the received desired signal sequence. In FIG. 1, four signal forms obtained through the QPSK are represented as signal points plotted on a coordinate. Accordingly, a receiver 800 can obtain the desired signal sequence most likely to have been transmitted.

This kind of interference canceller 820 is mostly used in mobile communication. With mobile communication, frequency offset needs to be considered especially on the uplink. For frequency offset compensation, there is a method shown in FIG. 2. A base station 910 transmits a reference frequency fc' to mobile stations 920 and 930. Each of the mobile stations 920 and 930 receives the reference frequency fc', and operates an oscillator based on the received reference frequency, obtaining a carrier frequency with little frequency offset between the other mobile station 920 or 930.

Nevertheless, the interference canceller 820 determines the symbol sequence corresponding to the received signal replica, which has a signal point constellation closest to the received signal as the received desired signal sequence. As a result, when the signal points for the replica of received signals corresponding to a plurality of symbol sequences are the same plotted point coordinates, or are extremely close in position, erroneous determination occurs with a high probability.

Furthermore, when the carrier frequency offset between the desired signal and the interference signal is great, the desired signal points or interference signal points, i.e. the signal points for the received signals are observed to quickly rotate on the coordinate, making it difficult to estimate a propagation path by following that quick rotation.

Moreover, in the case of applying such frequency offset compensation as shown in FIG. 2 for base stations, since the base stations are extensively arranged in various places, an additional problem, which some base stations cannot receive the reference frequency from a base station transmitting the reference frequency may develop.

As a result, the effectiveness of the interference canceller is reduced, and the frequency utilization efficiency cannot be appropriately improved.

BRIEF SUMMARY OF THE INVENTION

The object of the present invention is to enhance the effectiveness of an interference canceller and improve the frequency utilization efficiency.

A radio communication system of the present invention comprises: a radio receiver including an interference canceller configured to generate a replica of a received signal and remove an interference signal from the received signal, and a frequency offset estimator configured to estimate a carrier frequency offset between a carrier frequency of the interference signal and a carrier frequency of a desired signal included in the received signal; and a radio transmitter including a frequency controller configured to adjust a carrier frequency of a transmitted desired signal to the carrier frequency of the interference signal based on the carrier frequency offset received from the radio receiver.

According to the radio communication system, the radio receiver may estimate the carrier frequency offset. The radio transmitter may then adjust the carrier frequency of the transmitted desired signal to the carrier frequency of the interference signal based on the estimated carrier frequency offset. Accordingly, the carrier frequency offset may be independently compensated on each radio link connected between the radio receiver and the radio transmitter. Therefore, the interference canceller of the radio receiver may remove the interference signal by following the propagation path estimation. Thereby, the radio communication system may enhance the effectiveness of the interference canceller and improve the frequency utilization efficiency.

A different radio communication system of the present invention comprises: a radio receiver including an interference canceller configured to generate a replica of a received signal and remove an interference signal from the received signal, a phase difference measurement unit configured to measure a phase difference between a desired signal and the interference signal, and an interference quality measurement unit configured to measure an interference reception quality indicating an influence of the interference signal on the received signal; and a radio transmitter including a controller configured to control at least one of a phase of a transmitted desired signal and a transmission power of the transmitted desired signal based on a measured phase difference and a measured interference reception quality.

According to the radio communication system, the radio transmitter can control the phase or transmission power of the transmitted desired signal based on the measured phase difference of the received signal and measured interference reception quality indicating the influence of the interference signal on the received signal, which are measured at the reception base station. Therefore, the radio communication system can distribute the signal points of received signals, when plotting those signal points. Therefore, the interference canceller of the radio receiver may efficiently remove the interference signal. As a result, the radio communication system may enhance the effectiveness of the interference canceller and improve the frequency utilization efficiency.

A radio station of the present invention comprises: an interference canceller configured to generate a replica of a received signal and remove an interference signal from the received signal, a frequency offset estimator configured to estimate a carrier frequency offset between a carrier frequency of the interference signal and a carrier frequency of a desired signal included in the received signal, and an information signal generator configured to generate an offset information signal based on the carrier frequency offset.

According to the radio station, the carrier frequency offset may be estimated. The base station may generate an offset information signal based on the estimated carrier frequency offset. Therefore, by such radio station becoming a radio receiver, the radio station may notify the radio transmitter of the carrier frequency offset itself or information decided from the carrier frequency offset or the like. Accordingly, the radio transmitter may adjust the carrier frequency of the transmitted desired signal to carrier frequency of the interference signal based on the notified carrier frequency offset or the information decided from the carrier frequency offset. As a result, the radio station may independently compensate the carrier frequency offset on each radio link connected to the radio transmitter. Therefore, the interference canceller of the radio station may remove the interference signal by following propagation path estimation. Thereby, the radio station may enhance the effectiveness of the interference canceller and improve the frequency utilization efficiency.

A different radio station of the present invention comprises: a frequency controller configured to adjust a carrier frequency of a transmitted desired signal to a carrier frequency of an interference signal based on a carrier frequency offset between the carrier frequency of the interference signal and a carrier frequency of a desired signal, and estimated by a radio receiver.

According to the radio station, the carrier frequency of the transmitted desired signal may be adjusted to carrier frequency of the interference signal based on the carrier frequency offset of the interference signal detected by the radio receiver. As a result, by such radio station becoming a radio transmitter, the carrier frequency offset may be independently compensated on each radio link connected to the radio receiver. Therefore, the interference canceller of the radio receiver may remove the interference signal by following propagation path estimation. Thereby, the radio station may enhance the effectiveness of the interference canceller and improve the frequency utilization efficiency.

A further different radio station of the present invention comprises: a controller configured to control at least one of a phase of a transmitted desired signal and a transmission power of the transmitted desired signal based on a measured phase difference between a desired signal and an interference signal included in a received signal in a radio receiver, and a measured interference reception quality indicating an influence of the interference signal on the received signal.

According to the radio station becoming the radio transmitter, the phase or transmission power of the transmitted desired signal may be controlled based on the measured phase difference and the measured interference reception quality at the radio receiver. Therefore, the radio station can distribute the signal points of reception signals when plotting those signal points. Accordingly, the interference canceller of the radio receiver may efficiently remove the interference signal. As a result, the radio station may enhance the effectiveness of the interference canceller and improve the frequency utilization efficiency.

A radio communication method of the present invention comprises: estimating a carrier frequency offset between a carrier frequency of an interference signal and a carrier frequency of a desired signal included in a received signal, and adjusting a carrier frequency of a transmitted desired signal to the carrier frequency of the interference signal based on the carrier frequency offset.

A different radio communication method of the present invention comprises: generating a replica of a received signal and removing an interference signal from the received signal, measuring a phase difference between a desired signal and the interference signal, measuring an interference reception quality indicating an influence of the interference signal on the received signal, and controlling at least one of a phase of a transmitted desired signal and a transmission power of the transmitted desired signal based on a measured phase difference and a measured interference reception quality.

BRIEF DESCRIPTION OF THE SEVERAL VIEWS OF THE DRAWINGS

FIG. 9 is a flow chart illustrating a procedure for a radio communication method of the fourth embodiment;

DETAILED DESCRIPTION OF THE INVENTION

[First Embodiment]

(Radio Communication System)

Figure 1:
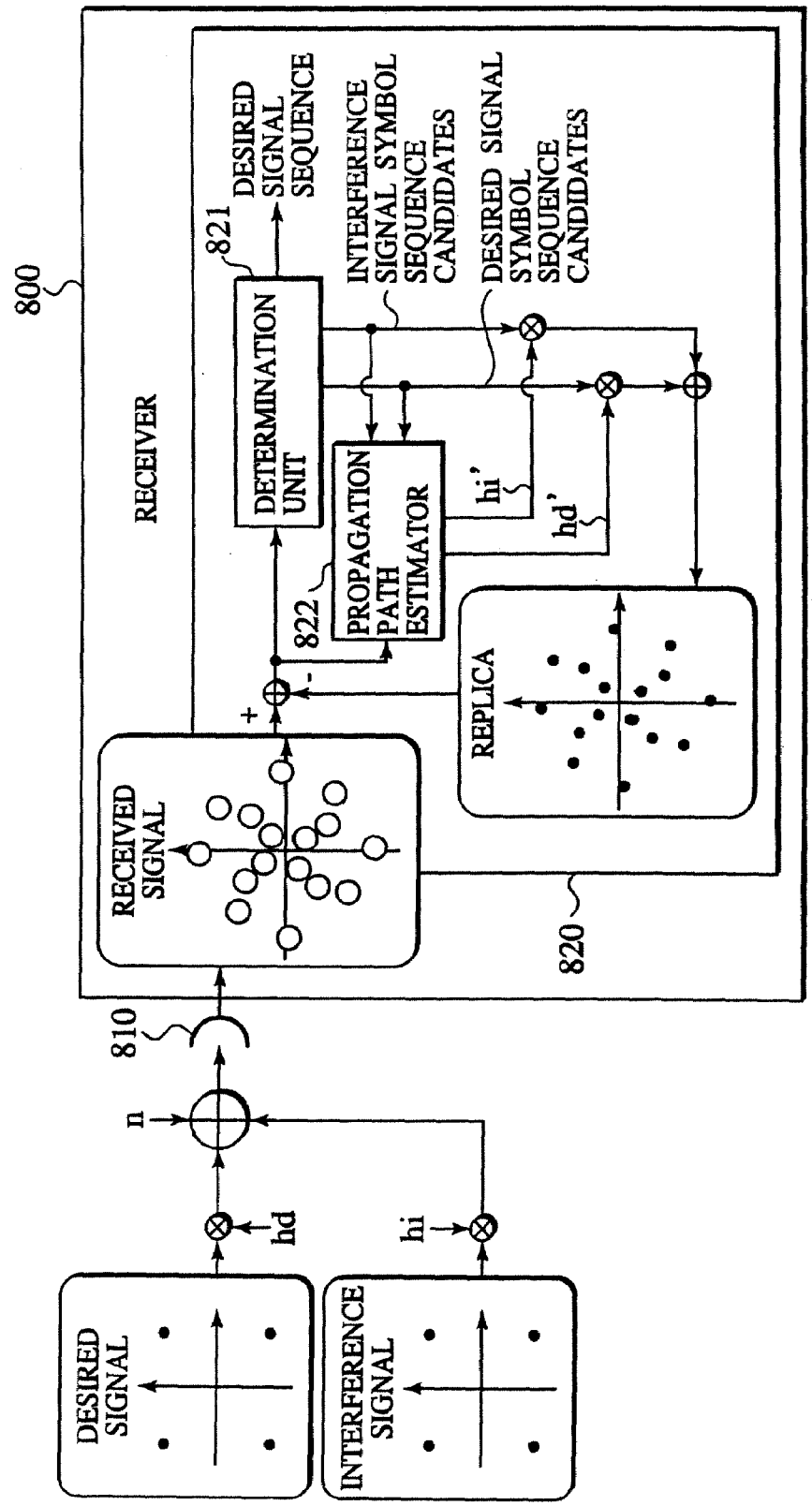
FIG. 1 is a block diagram showing a conventional interference canceller.
Figure 2:
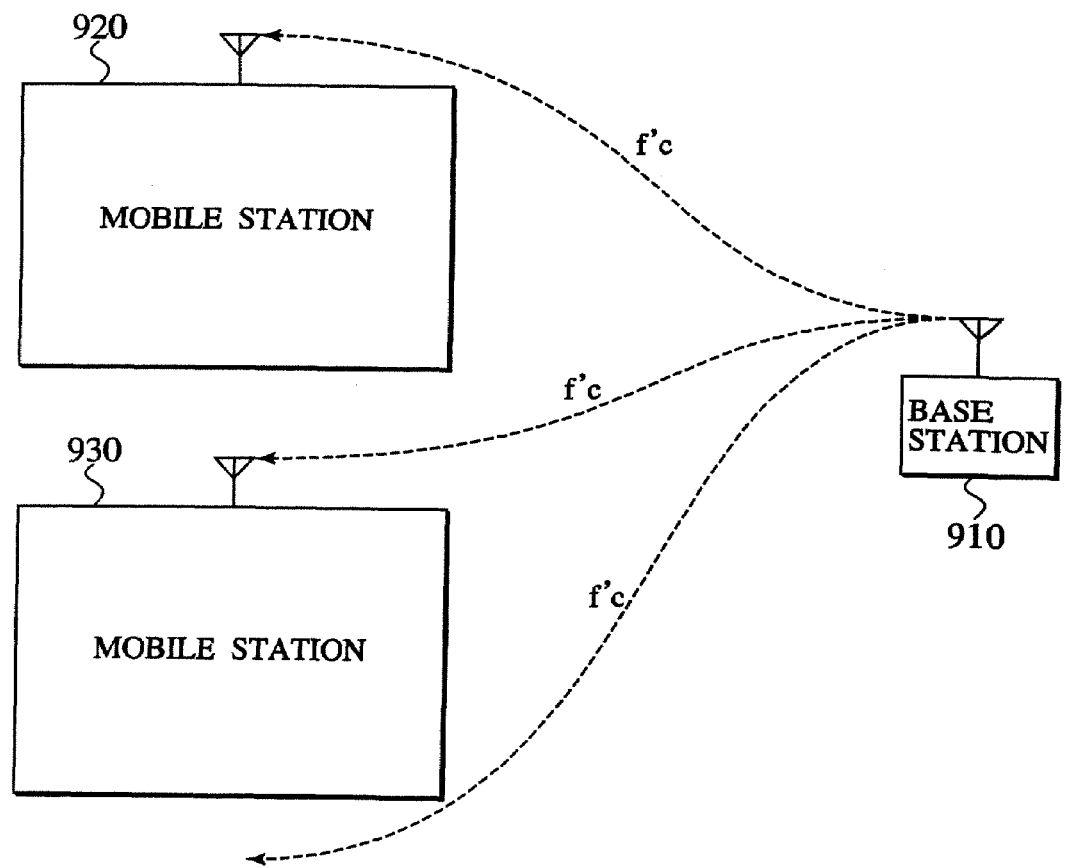
FIG. 2 is a diagram illustrating a conventional frequency offset compensation.
Figure 3:
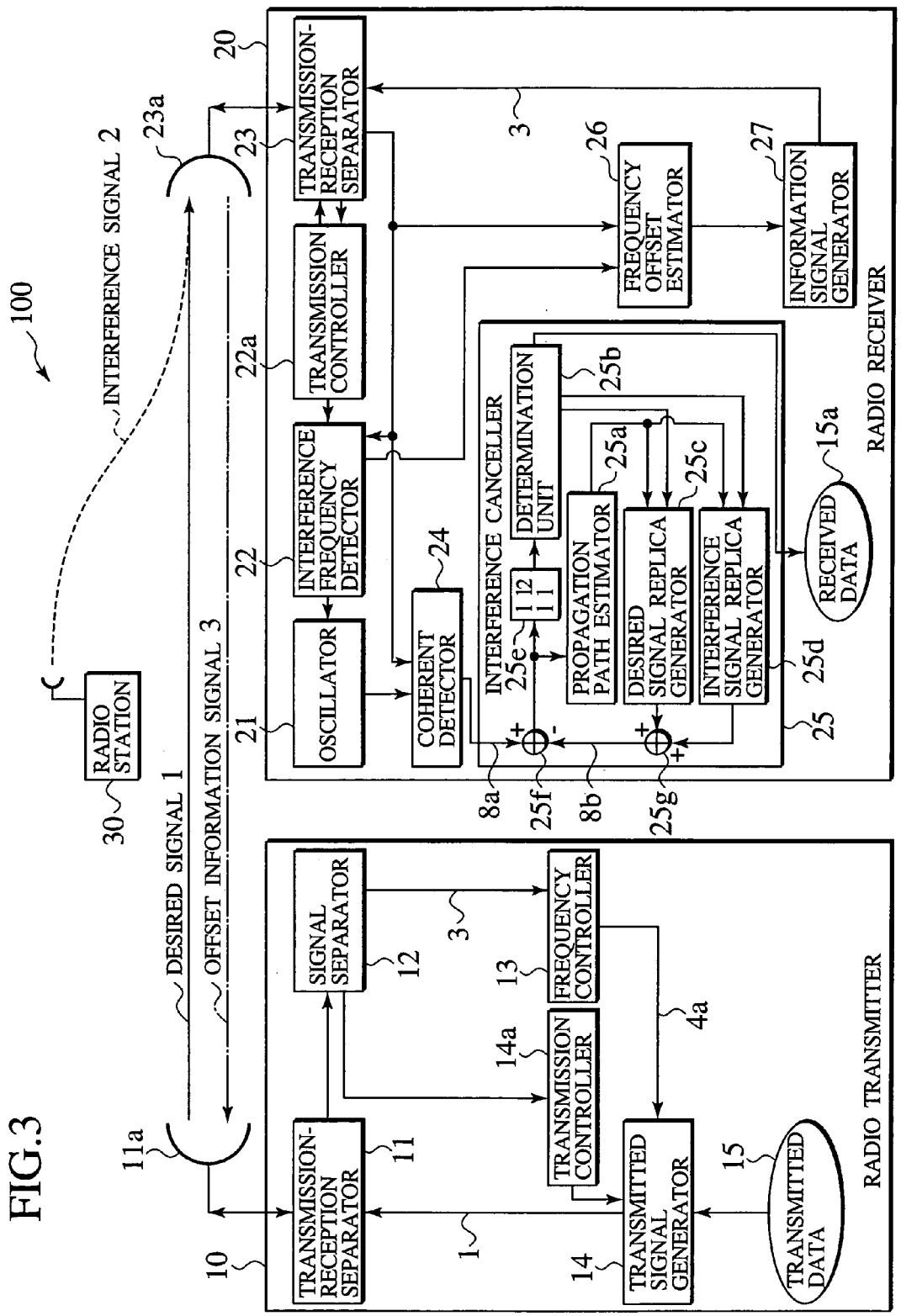
FIG. 3 is a block diagram showing a radio communication system of a first embodiment.

As shown in FIG. 3, a radio communication system 100 comprises a radio transmitter 10 and a radio receiver 20. The radio transmitter 10 transmits a desired signal 1 including transmitted data 15 to the radio receiver 20. The radio receiver 20 receives the desired signal 1 transmitted from the radio transmitter 10, and an interference signal 2 from a radio station 30. In the radio communication system 100, radio communication between the radio transmitter 10 and the radio receiver 20 are performed. For example, the radio communication between base stations, between access points, between the base station and access point, between the mobile station and base station, between the radio terminal and access point, between the radio stations in the adohoc network, or between the radio stations in the multihop network can be performed. In other words, the base station, the access point, the mobile station, the radio terminal, the radio station in the adohoc network, and the radio station in the multihop network are used as the radio transmitter 10 and radio receiver 20.

In order to simplify the following description, the radio transmitter 10 is described having a transmission system configuration and the radio receiver 20 having a reception system configuration; however, the radio transmitter 10 may have the configuration of the reception system of the radio receiver 20, and the radio receiver 20 may have the configuration of the transmission system of the radio transmitter 10.

The radio receiver 20 includes an oscillator 21, an interference frequency detector 22, a transmission controller 22a, an antenna 23a, a transmission-reception separator 23, a coherent detector 24, an interference canceller 25, a frequency offset estimator 26, and an information signal generator 27.

The antenna 23a transmits and receives signals. The antenna 23a transmits, for example, an information signal as a transmission signal, and receives a mixed signal including an interference signal 2 from the radio station 30 and a desired signal 1 from the radio transmitter 10, as a reception signal. The information signal is a signal including control information provided to the radio transmitter 10 from the radio receiver 20. The radio receiver 20 transmits an offset information signal 3 including a carrier frequency offset estimated by the radio receiver 20, as an information signal. The carrier frequency offset between the carrier frequency of the interference signal 2 and the carrier frequency of the desired signal 1, which are included in the received signal.

The transmission-reception separator 23 switches over between input and output for a received signal input from the antenna 23a and a transmission signal output to the antenna 23a, respectively. The transmission-reception separator 23 acquires the offset information signal 3 as a transmission signal from the information signal generator 27. The transmission-reception separator 23 inputs the received signal to the interference frequency detector 22, the transmission controller 22a, the coherent detector 24, and the frequency offset estimator 26.

The interference frequency detector 22 detects a carrier frequency $fc+\Delta f$ of the interference signal 2. The interference frequency detector 22 detects the carrier frequency of the interference signal 2 when the interference signal 2 is more than or equal to a predetermined power. The predetermined power is set to a certain appropriate value, which is used to determine whether detection of the carrier frequency of the interference signal 2 is necessary. The predetermined power may be set to, for example, a certain value that allows the interference signal 2 to be seen small and also the received signal to be seen approximately equivalent to the desired signal 1. The interference frequency detector 22 can reduce the control load of the radio transmitter 10 and the radio receiver 20, by detecting the carrier frequency of the interference signal 2 only when the interference signal 2 is more than or equal to the predetermined power then omitting transmission of the offset information signal 3 to radio transmitter 10 and compensation for the frequency offset at the radio transmitter 10 when influence from the carrier frequency offset is small.

Specifically, the transmission controller 22a detects the power of the interference signal 2, instructs the radio transmitter 10 to halt or start transmission of the desired signal 1, and instructs the interference frequency detector 22 to detect the carrier frequency of the interference signal 2. The transmission controller 22a detects the power of the interference signal 2 included in the received signal from the transmission-reception separator 23. The transmission controller 22a instructs the radio transmitter 10 to halt transmission of the desired signal 1 when the interference signal 2 is more than or equal to the predetermined power. The antenna 23a receives only the interference signal 2 while the radio receiver 10 halts transmission of the desired signal 1. Therefore, the interference frequency detector 22 can acquire only the interference signal 2 as a received signal from the transmission-reception separator 23.

Accordingly, the transmission controller 22a instructs the interference frequency detector 22 to detect the carrier frequency of the interference signal 2 once the radio transmitter 10 has been instructed to halt transmission. Subsequently, the transmission controller 22a instructs the radio transmitter 10 to resume transmission of the desired signal 1. The transmission controller 22a instructs by transmitting a halt or a resume instruction to the radio transmitter 10 via the transmission-reception separator 23 and the antenna 23a.

The interference frequency detector 22 detects the carrier frequency of the received signal from the transmission-reception separator 23. The interference frequency detector 22 detects the carrier frequency of the received signal as the carrier frequency of the interference signal 2 once it has acquired a detection instruction from the transmission controller 22a. The interference frequency detector 22 acquires a detection instruction from the transmission controller 22a only when the interference signal 2 is more than or equal to the predetermined power. However, when acquiring a detection instruction from the transmission controller 22a, transmission of the desired signal 1 is halted and the interference frequency detector 22 acquires only the interference signal 2 as a received signal from the transmission-reception separator 23. Therefore, by detecting the carrier frequency of the received signal only when the interference frequency detector 22 acquires the detection instruction from the transmission controller 22a, the interference frequency detector 22 can detect the carrier frequency of the interference signal 2 only when the interference signal 2 is more than or equal to the predetermined power. The interference frequency detector 22 then inputs the detected carrier frequency of the interference signal 2 to the frequency offset estimator 26 and the oscillator 21.

The interference frequency detector 22 detects the carrier frequency of the received signal as the carrier frequency of the desired signal 1 while not acquiring a detection instruction from the transmission controller 22a. The interference frequency detector 22 does not acquire a detection instruction from the transmission controller 22a when the interference signal 2 is less than the predetermined power. Therefore, while the interference frequency detector 22 is not acquiring an instruction, the power of the interference signal 2 is less than the predetermined power, and the received signal is assumed to be approximately equivalent to the desired signal 1. The interference frequency detector 22 inputs the detected carrier frequency of the desired signal 1 to the oscillator 21.

The oscillator 21 oscillates at a reference frequency, and inputs it to the coherent detector 24. The oscillator 21 acquires the carrier frequency of the received desired signal 1 from the interference frequency detector 22, and oscillates therewith as a reference frequency before detecting the carrier frequency of the interference signal 2. After having detected the carrier frequency of the interference signal 2, the oscillator 21 rotates the oscillated reference frequency to the carrier frequency of the interference signal 2 from the interference frequency detector 22.

In this embodiment, the oscillator 21 uses the carrier frequency of the desired signal 1 as a reference frequency before detecting the carrier frequency of the interference signal 2 and transmitting the offset information signal 3. And the oscillator 21 uses the carrier frequency of the interference signal 2 as the same after the offset information signal 3 has been transmitted. Note that after the oscillator 21 has rotated the oscillated reference frequency to the carrier frequency of the interference signal 2 detected by the interference frequency detector 22, the interference frequency detector 22 may instruct the radio transmitter 10 to resume transmission of the desired signal 1.

The coherent detector 24 synchronously detects the received signal input from the transmission-reception separator 23 based on the reference frequency input from the oscillator 21. The interference frequency detector 22 the received signal, which is the signal after the interference frequency detector 22 has detected the carrier frequency of the interference signal 2 and transmission of the desired signal 1 has resumed, namely, the received signal mixed the desired signal 1 and the interference signal 2. The coherent detector 24 inputs the detected received signal to the interference canceller 25.

The frequency offset estimator 26 estimates the carrier frequency offset $\Delta f$, which is the difference between the carrier frequency $fc+\Delta f$ of the interference signal 2 included in the received signal and the carrier frequency $fc$ of the desired signal 1 included in the received signal. The frequency offset estimator 26 acquires the carrier frequency of the interference signal 2 from the interference frequency detector 22. In addition, the frequency offset estimator 26 acquires the received signal from the transmission-reception separator 23. When an interference signal 2 does not generate from a radio station 30, the radio transmitter 10 notifies the radio receiver 20 of transmission commencement of the desired signal 1 and transmits the desired signal 1. The signal received by the radio receiver 20 at the time when this transmission commences is almost the desired signal 1. Therefore, when having acquired the received signal, which is received at the commencement notice from the radio transmitter 10, the frequency offset estimator 26 considers that the received signal is the desired signal 1, and detects its carrier frequency, and memorizes it. The frequency offset estimator 26 estimates the carrier frequency offset by calculating the difference between the acquired carrier frequency of the interference signal 2 and the memorized carrier frequency of the desired signal 1. The frequency offset estimator 26 inputs the estimated carrier frequency offset to the information signal generator 27.

The information signal generator 27 generates an information signal including control information, which is provided to the radio transmitter 10 from the radio receiver 20. The information signal generator 27 generates an offset information signal 3 based on the carrier frequency offset $\Delta f$, as information signal. The offset information signal may include the carrier frequency offset itself, or may include information decided from the carrier frequency offset. The offset information signal 3 in this embodiment includes the carrier frequency offset. The information signal generator 27 generates the offset information signal 3 by converting the information including the carrier frequency offset acquired from the frequency offset estimator 26 to a signal through modulation. The information signal generator 27 inputs the generated offset information signal 3 to the transmission-reception separator 23. In this manner, the information signal generator 27 transmits the offset information signal 3 to the radio transmitter 10 via the transmission-reception separator 23 and the antenna 23a.

The interference canceller 25 generates a replica of the received signal and removes the interference signal 2 from the received signal. The interference canceller 25 comprises a propagation path estimator 25a, a determination unit 25b, a desired signal replica generator 25c, an interference signal replica generator 25d, a squaring circuit 25e, a subtracter 25f, and an adder 25g.

To begin with, the propagation path estimator 25a estimates the propagation paths for the received signal 1 and the interference signal 2, and calculates the respective propagation path estimation values. The propagation path estimator 25a acquires the difference between an actually received signal 8a and a plurality of received signal replicas 8b from the subtracter 25f so as to estimate propagation paths using the difference. The propagation path estimator 25a inputs the calculated propagation path estimation value for the desired signal 1 to the desired signal replica generator 25c. The propagation path estimator 25a then inputs the calculated propagation path estimation value for the interference signal 2 to the interference signal replica generator 25d.

In addition, the determination unit 25b generates a plurality of desired signal symbol sequence candidates and interference signal symbol sequence candidates. The determination unit 25b inputs the generated a plurality of desired signal symbol sequence candidates to the desired signal replica generator 25c. The determination unit 25b then inputs the generated a plurality of interference signal symbol sequence candidates to the interference signal replica generator 25d.

The desired signal replica generator 25c generates a plurality of desired signal replicas by multiplying the propagation path estimation value for the desired signal 1 from the propagation path estimator 25a by the signal points, which are obtained by modulating the a plurality of desired signal symbol sequence candidates from the determination unit 25b. The interference signal replica generator 25d generates a plurality of interference signal replicas by multiplying the propagation path estimation value for the interference signal 2 from the propagation path estimator 25a by the signal points, which are obtained by modulating the a plurality of interference signal symbol sequence candidates from the determination unit 25b. The desired signal replica generator 25c and the interference signal replica generator 25d input a plurality of generated desired signal replicas and interference signal replicas to the adder 25g.

The adder 25g adds together the a plurality of desired signal replicas and interference signal replicas acquired from the desired signal replica generator 25c and the interference signal replica generator 25d, respectively, so as to calculate the sum thereof and generate a plurality of received signal replicas 8b. In this manner, the desired signal replica generator 25c, the interference signal replica generator 25d, and the adder 25g generate the received signal replicas 8b based on the propagation path estimation value. The adder 25g inputs the generated a plurality of received signal replicas 8b to the subtracter 25f.

The subtracter 25f acquires the actually received signal 8a from the coherent detector 24 and a plurality of received signal replicas 8b from the adder 25g. The subtracter 25f calculates the differences between the actually received signal 8a and a plurality of received signal replicas 8b, and inputs the differences to the propagation path estimator 25a and the squaring circuit 25e. The squaring circuit 25e squares the differences between the received signal 8a and a plurality of received signal replicas 8b, and inputs squared values to the determination unit 25b.

The determination unit 25b determines the desired signal symbol sequence candidate and the interference signal symbol sequence candidate, which allow a minimum squared value of the difference between the actually received signal 8a and a plurality of received signal replicas 8b, and outputs the desired signal components thereof as the received desired signal 1. The determination unit 25b can determine the desired signal symbol sequence candidate and the interference signal symbol sequence candidate, which allow a minimum absolute value of the difference between the actually received signal 8a and a plurality of received signal replicas 8b, by determining using the squared value of the difference between the received signal 8a and a plurality of received signal replicas 8b as such. In this manner, the determination unit 25b compares the received signal replicas 8b with the actually received signal 8a so as to determine the desired signal components of the received signal replica 8b close to the actually received signal 8a, as the desired signal 1. Furthermore, the interference canceller 25 removes the interference signal 2 from the received signal 8a acquired from the coherent detector 24 so as to provide the desired signal 1. The determination unit 25b then demodulates the desired signal 1, and outputs the received data 15a transmitted from a radio transmitter 10, and received by the radio receiver 20.

The transmission-reception separator 23, the interference frequency detector 22, the transmission controller 22a, the oscillator 21, the coherent detector 24, the frequency offset estimator 26, the interference canceller 25, and the information signal generator 27 may utilize a circuit performing the above-mentioned functions, for example.

The radio transmitter 10 comprises an antenna 11a, a transmission-reception separator 11, a signal separator 12, a frequency controller 13, a transmitted signal generator 14, and a transmission controller 14a. The antenna 11a transmits and receives signals. The antenna 11 transmits, for example, the desired signal 1 as a transmission signal, and receives an information signal such as the offset information signal 3 as a received signal. The transmission-reception separator 11 switches over between input and output of the transmission signal output to the antenna 11a and the received signal input from the antenna 11a, respectively. The transmission-reception separator 11 acquires the desired signal as a transmission signal from the information signal generator 14. The transmission-reception separator 11 inputs the received signal to the signal separator 12.

The signal separator 12 separates the offset information signal 3 from within the received signals, and inputs it to the frequency controller 13. The signal separator 12 separates a halt and a resume instruction for transmission of the desired signal 1 from within the received signals, and inputs it to the transmission controller 14a. The frequency controller 13 adjusts the carrier frequency of the transmitted desired signal 1 to the carrier frequency of the interference signal 2 based on the carrier frequency offset $\Delta f$ received from the radio receiver 20. The frequency controller 13 acquires the carrier frequency offset from the offset information signal 3. The frequency controller 13 controls the carrier frequency by inputting to the transmitted signal generator 14 a carrier frequency control signal 4a, which is used to control the carrier frequency of the desired signal based on the carrier frequency offset.

The transmission controller 14a acquires a halt and a resume instruction for transmission of the desired signal 1 from the radio receiver 20 via the antenna 11a and the transmission-reception separator 11. The transmission controller 14a instructs the transmitted signal generator 14 to halt and resume transmission of the desired signal 1 in conformity with the acquired instruction.

The transmitted signal generator 14 generates a desired signal including the transmitted data 15 as a transmission signal from the transmitted data 15, and inputs it to the transmission-reception separator 11. The transmitted signal generator 14 generates a desired signal 1 using the carrier wave frequency fc+$\Delta$f in conformity with the carrier frequency control signal 4a. Accordingly, the transmitted signal generator 14 can generate the desired signal 1 of the carrier frequency adjusted to carrier frequency of the interference signal 2. The transmitted signal generator 14 transmits the desired signal 1 to the radio receiver 20 via the transmission-reception separator 11 and the antenna 11a.

The transmitted signal generator 14 halts and resumes transmission of the desired signal 1 in conformity with the instruction from the transmission controller 14a. The transmitted signal generator 14 halts transmission of the desired signal 1 without inputting it to the transmission-reception separator 11 when a halt instruction has been acquired from the transmission controller 14a. Subsequently, the transmitted signal generator 14 inputs the desired signal 1 to the transmission-reception separator 11 so as to resume transmission thereof when having acquired a resume instruction from the transmission controller 14a. The transmission-reception separator 11, the signal separator 12, the frequency controller 13, the transmitted signal generator 14 and the transmission controller 14a may utilize a circuit performing the above-mentioned functions.

(Radio Communication Method)

Figure 4:
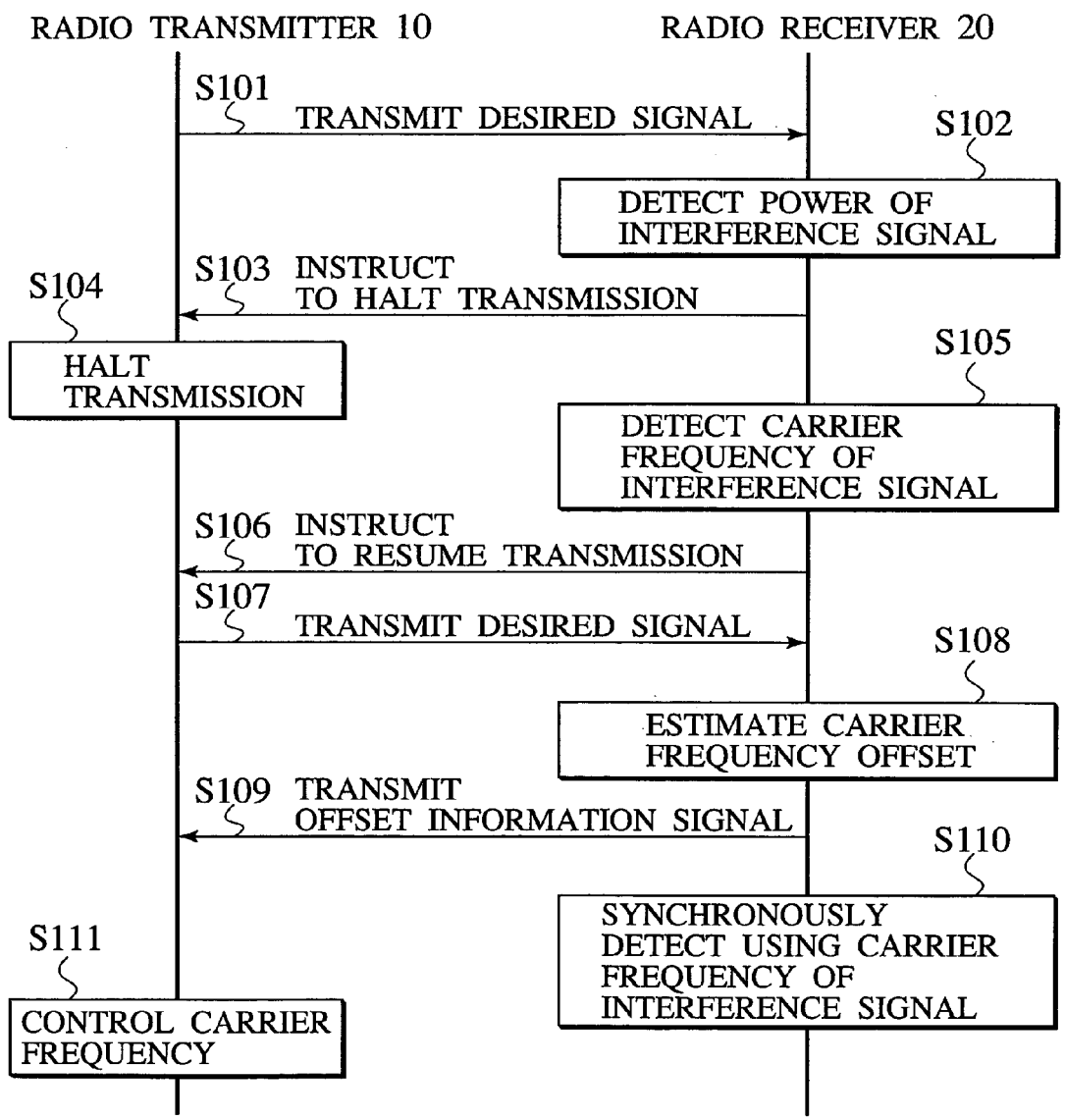
FIG. 4 is a flow chart illustrating a procedure for a radio communication method of the first embodiment.

A procedure for a radio communication method using a communication system 100 shown in FIG. 3 is described referencing FIG. 4. The radio transmitter 10 transmits a desired signal 1 (S101). The radio receiver 20 detects the power of an interference signal 2 included in the received signal (S102). The radio receiver 20 instructs the radio transmitter 10 to halt transmission of the desired signal 1 when the interference signal 2 is more than or equal to a predetermined power (S103). The radio transmitter 10 halts transmission of the desired signal in conformity with the halt instruction (S104). The radio receiver 20 detects a carrier frequency of the interference signal 2 while the radio transmitter 10 halts transmission of the desired signal 1 (S105). The radio receiver 20 instructs the radio transmitter 10 to resume transmission of the desired signal 1 after the radio receiver 20 detects the carrier frequency of the interference signal 2 (S106). The radio transmitter 10 resumes transmission and transmits the desired signal 1 in conformity with the instruction from the radio receiver 20 (S107).

After transmission of the desired signal 1 has resumed, the radio receiver 20 estimates a carrier frequency offset $\Delta$f based on the memorized carrier frequency of the desired signal 1 and the detected carrier frequency of the interference signal 2 (S108). The radio receiver 20 transmits to the radio transmitter 10 an offset information signal 3 including the estimated carrier frequency offset $\Delta$f (S109).

After the offset information signal 3 is transmitted, the radio receiver 20 synchronously detects using the carrier frequency of the interference signal 2 as a reference frequency (S110). Furthermore, the radio receiver 20 removes the interference signal 2 from the Synchronously detected received signal, and demodulates the received signal so as to provide the received data 15a. The radio transmitter 10 controls the carrier frequency of the desired signal 1 so as to adjust the carrier frequency of the transmitted desired signal 1 to carrier frequency fc+$\Delta$f of the interference signal 2 based on the carrier frequency offset $\Delta$f included in the offset information signal 3 (S111). The radio transmitter 10 then transmits to the radio receiver 20 the desired signal 1 with the controlled carrier frequency.

According to the radio communication system 100, radio transmitter 10, radio receiver 20, and a radio communication method, the radio receiver 20 can estimate the carrier frequency offset. The radio receiver 20 may generate the offset information signal 3 including the estimated carrier frequency offset. Therefore, the radio receiver 20 can notify the radio transmitter 10 of the carrier frequency offset.

The radio transmitter 10 may then adjust the carrier frequency of the transmitted desired signal 1 to the carrier frequency of the interference signal 2 based on the notified carrier frequency offset estimated by the radio receiver 20. Accordingly, the carrier frequency offset may be independently compensated on each radio link connected between the radio receiver 20 and the radio transmitter 10. Therefore, an interference canceller 25 of the radio receiver 20 may remove the interference signal 2 by following propagation path estimation. Thereby, the radio communication system 100 may enhance the effectiveness of the interference canceller 25 and improve the frequency utilization efficiency. The carrier frequency offset may be compensated even in a high frequency radio system with a great carrier frequency offset.

The interference frequency detector 22 detects the carrier frequency of the interference signal 2 by instructing the radio transmitter 10 to halt transmission of the desired signal 1 and receive only the interference signal 2. Accordingly, the interference frequency detector 22 may accurately and easily detect the carrier frequency of the interference signal 2.

[Second Embodiment]

Figure 5:
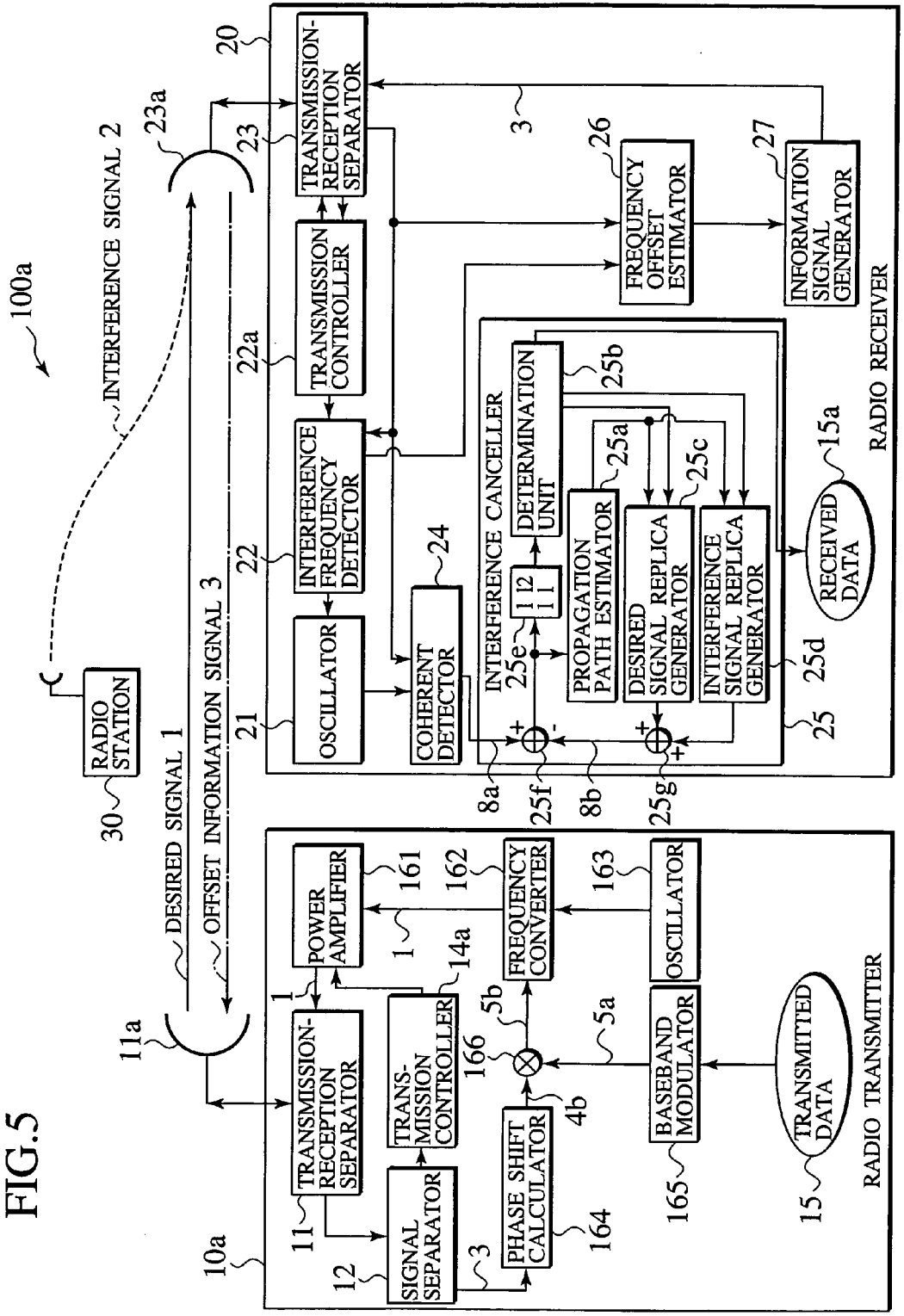
FIG. 5 is a block diagram showing a radio communication system of a second embodiment.

As shown in FIG. 5, a radio communication system 100a comprises a radio transmitter 10a and the radio receiver 20. The radio transmitter 10a comprises the antenna 11a, the transmission-reception separator 11, the signal separator 12, the transmission controller 14a, a power amplifier 161, a frequency converter 162, an oscillator 163, a phase shift calculator 164, a baseband modulator 165, and a multiplier 166. Namely, the radio transmitter 10a shown in FIG. 5 comprises the phase shift calculator 164 and the multiplier 166 in place of the frequency controller 13 of the radio transmitter 10 shown in FIG. 3, and also comprises the power amplifier 161, the frequency converter 162, the oscillator 163 and the baseband modulator 165 in place of the transmitted signal generator 14. The same reference numerals are given in FIG. 5 for the substantially same configuration as those in the radio communication system 100 shown in FIG. 3, and a part of the description is omitted.

The baseband modulator 165 modulates the transmitted data 15 to be included in the desired signal 1 into a baseband signal 5a. The baseband modulator 165 inputs the baseband signal 5a to the multiplier 166.

The signal separator 12 inputs to the phase shift calculator 164 the offset information signal 3 separated from the received signal. The phase shift calculator 164 calculates the angular speed 2p$\Delta$f in accordance with the carrier frequency offset from the carrier frequency offset $\Delta$f included in the received offset information signal 3. As such, the angular speed $2\pi\Delta f$ is proportional to the carrier frequency offset $\Delta$f. The phase shift calculator 164 calculates the phase rotation amount 4b '$e^{j2\pi\Delta ft}$' from the calculated angular speed $2\pi\Delta f$. The phase rotation amount is represented by a complex exponential in this manner. The phase shift calculator 164 then inputs to the multiplier 166 the phase rotation amount $4b$ '$e^{j2\pi \Delta ft}$', which is based on the angular speed $2\pi \Delta f$ proportional to the carrier frequency offset.

The multiplier 166 rotates the phase of the baseband signal 5a at the angular speed $2\pi \Delta f$ in accordance with the carrier frequency offset by multiplying the baseband signal 5a by the phase rotation amount $4b$ '$e^{j2\pi \Delta ft}$', which is input from the phase shift calculator 164. The multiplier 166 inputs to the frequency converter 162 the phase-shifted baseband signal 5b obtained through rotation.

In this manner, the phase shift calculator 164 inputs to the multiplier 166 the phase rotation amount $4b$ '$e^{j2\pi \Delta ft}$' that depends on the carrier frequency offset, and the multiplier 166 rotates the phase of the baseband signal 5a at the angular speed $2\pi \Delta f$ that depends on the carrier frequency offset, in conformity with the input phase rotation amount $4b$ '$e^{j2\pi \Delta ft}$'. Thereby, the carrier frequency of the desired signal 1 is adjusted to carrier frequency of the interference signal 2. Namely, the phase shift calculator 164 and the multiplier 166 function as a frequency controller that adjusts the carrier frequency of the desired signal 1 to carrier frequency of the interference signal 2 based on the carrier frequency offset.

The frequency converter 162 converts the center frequency of the phase-shifted baseband signal 5b to the desired signal 1. The oscillator 163 oscillates a reference frequency of the frequency converter 162 and inputs it thereto. The frequency converter 162 converts the center frequency of the phase-shifted baseband signal 5b using the reference frequency from the oscillator 163.

The carrier frequency of the desired signal 1 obtained through the conversion by the frequency converter 162 apparently adjusts to the carrier frequency $fc+\Delta f$ of the interference signal 2, as in the following Equation (1).

$$\{s(t) e^{j2\pi \Delta ft}\} \times e^{j2\pi \Delta fct} = s(t) e^{j2\pi(fc+\Delta f)t} \quad \text{(Equation 1)}$$

The frequency converter 162 inputs to the power amplifier 161 the desired signal 1 obtained through the conversion. The transmission controller 14a instructs the power amplifier 161 to halt and resume transmission of the desired signal 1.

The power amplifier 161 amplifies the power of the desired signal 1 from the frequency converter 162. The power amplifier 161 inputs the amplified desired signal 1 to the transmission-reception separator 11, which then transmits it to the radio receiver 20 via the antenna 11a. The power amplifier 161 halts and resumes transmission of the desired signal 1 in conformity with the instruction from the transmission controller 14a. The power amplifier 161 halts transmission of the desired signal 1 without inputting it to the transmission-reception separator 11 when a halt instruction has been acquired from the transmission controller 14a. Subsequently, after acquiring a resume instruction from the transmission controller 14a, the power amplifier 161 inputs the desired signal 1 to the transmission-reception separator 11 so as to resume transmission thereof.

In this manner, the baseband modulator 165, the oscillator 163, the frequency converter 162, and the power amplifier function as a transmitted signal generator that generates the desired signal 1 from the transmitted data 15.

According to the radio transmitter 10a, the carrier frequency of the desired signal 1 can apparently adjust to the carrier frequency of the interference signal 2 by rotating the phase of the baseband signal 5a at the angular speed $2\pi \Delta f$ in accordance with the carrier frequency offset $\Delta f$, which is notified from the radio receiver 10. Thereby, the radio transmitter 10a can easily compensate for the carrier frequency offset.

[Third Embodiment]

Figure 6:
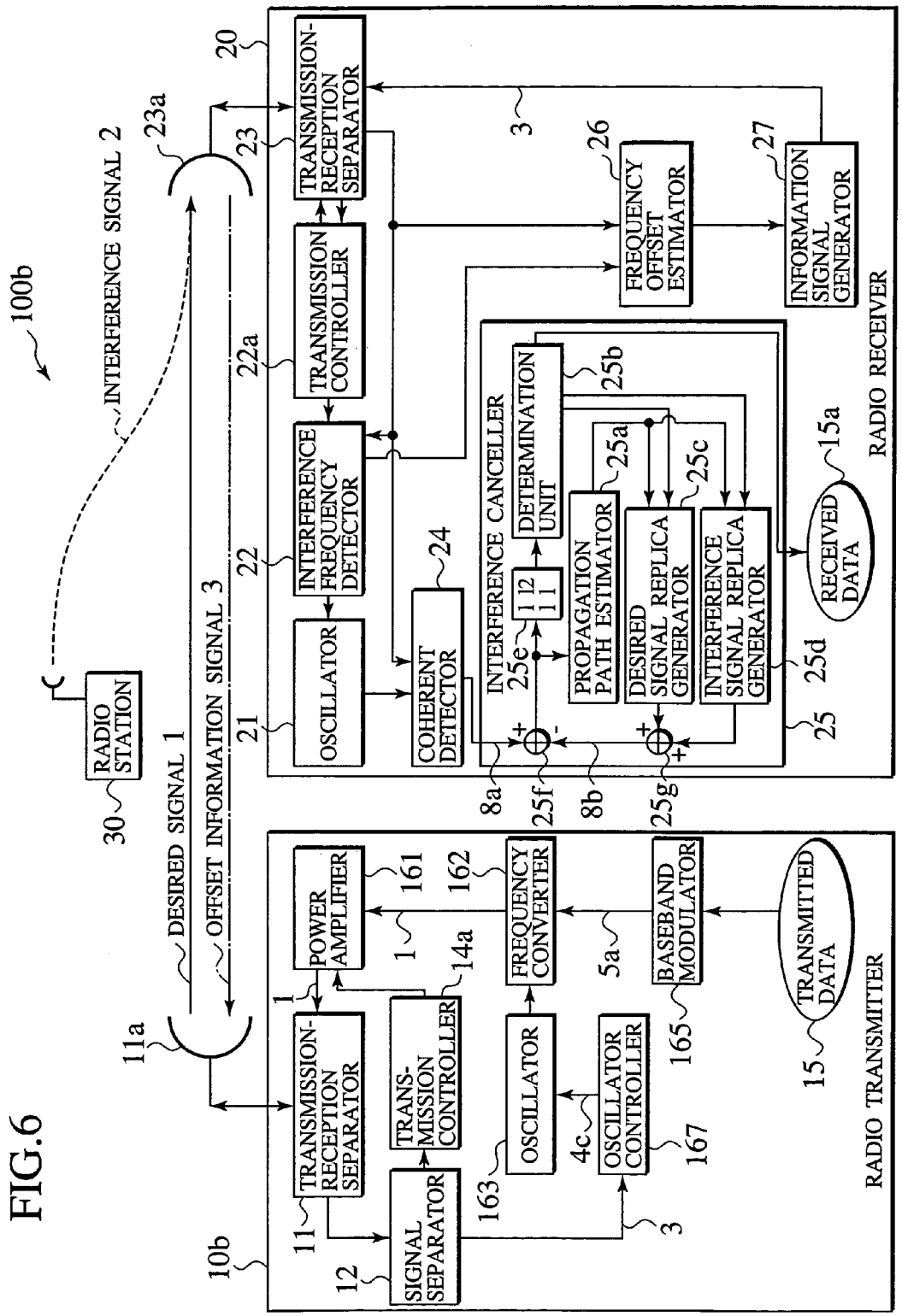
FIG. 6 is a block diagram showing a radio communication system of a third embodiment.

As shown in FIG. 6, a radio communication system 100b comprises a radio transmitter 10b and the radio receiver 20. The radio transmitter 10b comprises the antenna 11a, the transmission-reception separator 11, the signal separator 12, the transmission controller 14a, the power amplifier 161, the frequency converter 162, the oscillator 163, and an oscillator controller 167. Namely, the radio transmitter 10b shown in FIG. 6 comprises the oscillator controller 167 in place of the frequency controller 13 of the radio transmitter 10 shown in FIG. 3, and also comprises the power amplifier 161, the frequency converter 162, the oscillator 163, and the baseband modulator 165 in place of the transmitted signal generator 14. The same reference numerals are given in FIG. 6 for the substantially same configuration as those in the radio communication systems 100 and 100a shown in FIGS. 3 and 5, and a part of the description is omitted.

The signal separator 12 inputs to the oscillator controller 167 the offset information signal 3 separated from the received signal. The baseband modulator 165 inputs to the frequency converter 162 the baseband signal 5a obtained by modulating the transmitted data 15.

The oscillator controller 167 adjusts the carrier frequency of the desired signal 1 to be transmitted to the carrier frequency of the interference signal 2 by controlling the reference frequency used to convert the center frequency of the baseband signal 5a through the frequency converter 162, based on the carrier frequency offset. Based on the carrier frequency offset $\Delta f$ included in the acquired offset information signal 3, the oscillator controller 167 decides the reference frequency used for conversion such that the carrier frequency of the desired signal 1 adjusts to carrier frequency of the interference signal 2. The oscillator controller 167 inputs to the oscillator 163 a reference frequency control signal 4c, which is used to instruct the decided reference frequency.

The oscillator 163 oscillates with the reference frequency, which is included in the reference frequency control signal 4c acquired from the oscillator controller 167, and inputs the reference frequency to the frequency converter 162. The frequency converter 162 converts the center frequency of the baseband signal 5a using the reference frequency acquired from the oscillator 163, so as to make the desired signal 1. In this manner, the oscillator controller 167 controls the reference frequency used through the frequency converter 162 by instructing the oscillator 163 to oscillate with the decided reference frequency. The oscillator controller 167 functions as a frequency controller that adjusts the carrier frequency of the desired signal 1 to be transmitted to the carrier frequency of the interference signal 2 by controlling the reference frequency based on the carrier frequency offset. The oscillator controller 167 may utilize a circuit performing the above-mentioned functions.

According to the radio transmitter 10b, the carrier frequency of the desired signal 1 can adjust to the carrier frequency of the interference signal 2 with higher accuracy by controlling the reference frequency used to convert the center frequency of the baseband signal 5a, based on the carrier frequency offset. Accordingly, the radio transmitter 10b may compensate for the carrier frequency offset with higher accuracy. Therefore, the remnant carrier frequency offset after the carrier frequency offset has been compensated may be reduced.

[Fourth Embodiment]

Figure 7:
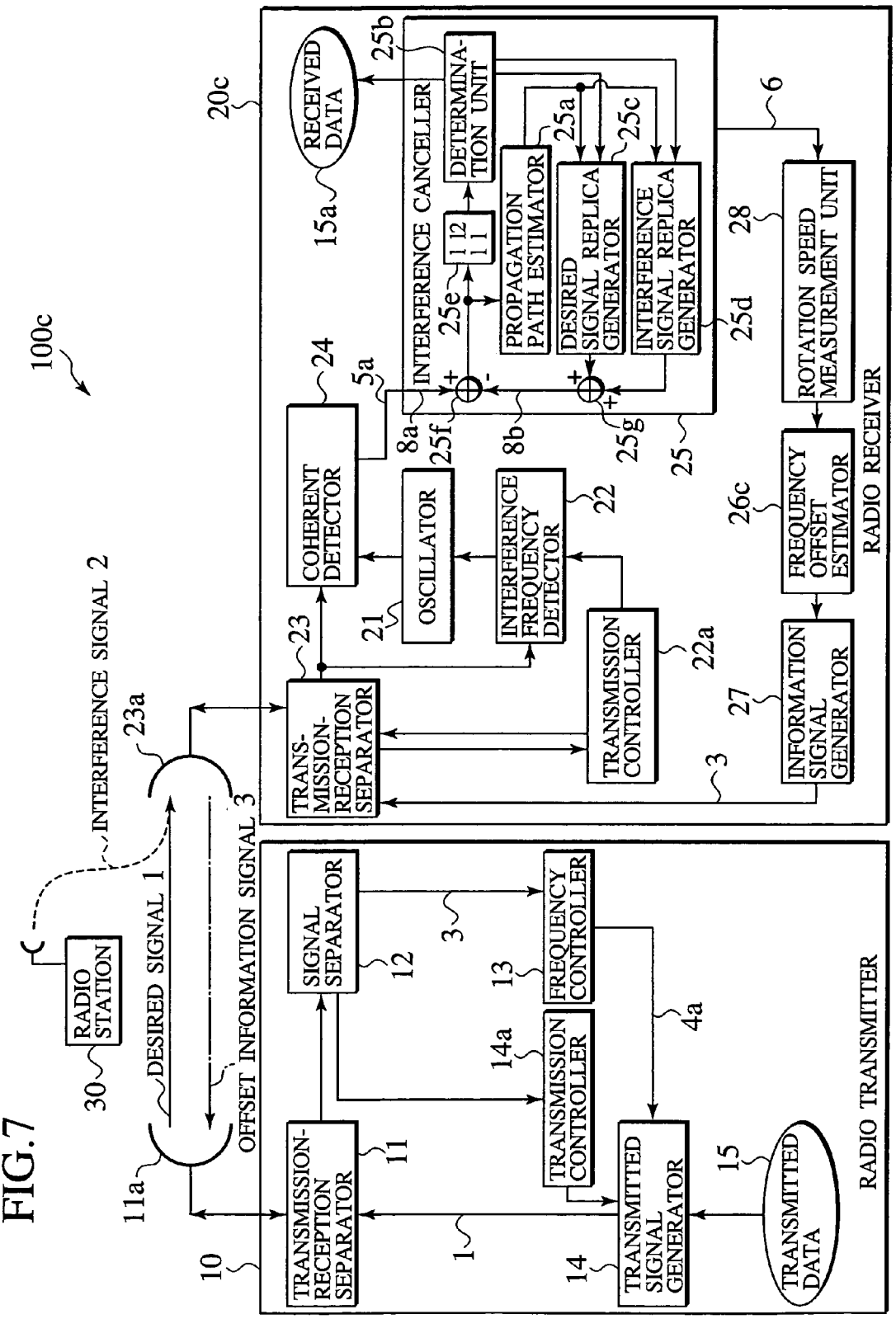
FIG. 7 is a block diagram showing a radio communication system of a fourth embodiment.

As shown in FIG. 7, a radio communication system 100c comprises the radio transmitter 10 and a radio receiver 20c. The radio receiver 20 comprises the oscillator 21, the interference frequency detector 22, the transmission controller 22a, the antenna 23a, the transmission-reception separator 23, the coherent detector 24, the interference canceller 25, a frequency offset estimator 26c, a rotation speed measurement unit 28, and the information signal generator 27. The same reference numerals are given in FIG. 7 for the substantially same configuration as those in the radio communication systems 100 shown in FIG. 3, and a part of the description is omitted.

Figure 8A:
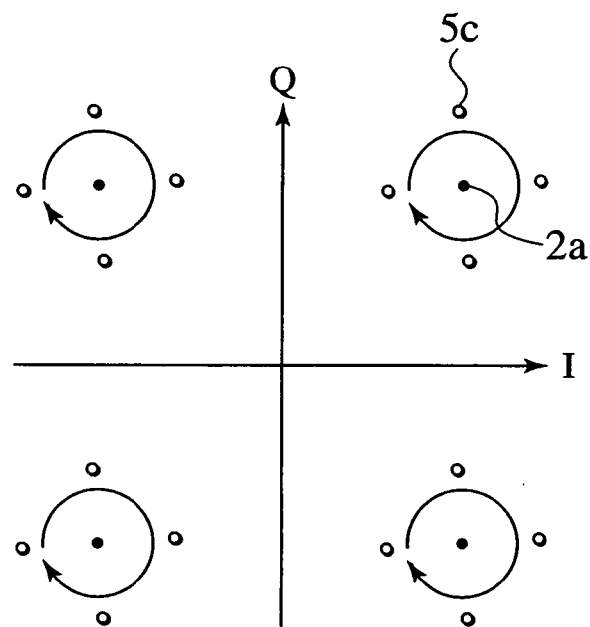
FIGS. 8A and 8B are signal constellation diagrams of baseband signals and residual signals, respectively.

The oscillator 21 acquires the carrier frequency fc+$\Delta$f of the interference signal 2 from the interference frequency detector 22, oscillating therewith as the reference frequency of the coherent detector 24. The coherent detector 24 synchronously detects the received signal mixed the desired signal 1 and the interference signal 2 using a reference signal input from the oscillator 21, namely the carrier frequency of the interference signal 2 used as the reference frequency so as to obtain the baseband signal 5a as the synchronously detected received signal. The signal constellation diagram of signal points 5c of a baseband signal 5a is shown in FIG. 8A. The signal constellation diagram is a diagram showing signal points plotted on a coordinate where the vertical axis represents quadrature (Q) components and the horizontal axis represents in-phase (I) components. The signal points 5c of the baseband signals 5a are observed to rotate around the signal point 2a of the interference signal 2 at an angular speed $2\pi\Delta f$ proportional to the carrier frequency offset $\Delta f$. It should be noted that the signal point 2a of the interference signal 2 is actually invisible. The coherent detector 24 inputs to the interference canceller 25 the baseband signal 5a obtained by synchronously detecting the received signal.

Figure 8B:
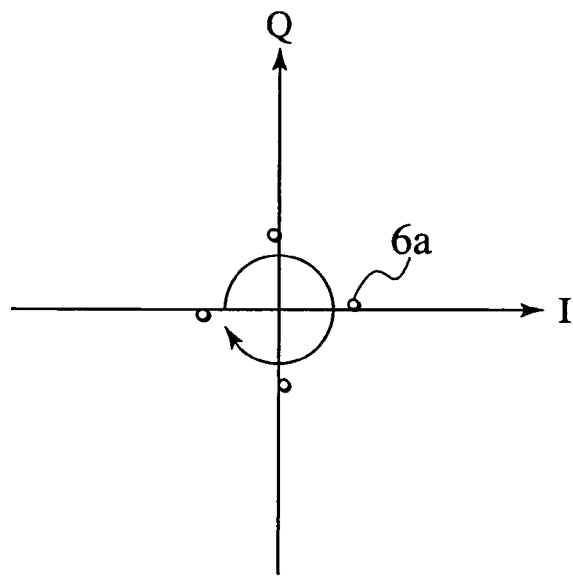

The interference canceller 25 obtains a residual signal 6 by removing the interference signal 2 from the baseband signal 5a. The residual signal 6 includes not only the desired signal 1 but noise as well. The signal constellation diagram of signal points 6a of the residual signal 6 is shown in FIG. 8B. The signal point 6a of the residual signal 6 results from subtracting the signal point 2a of the interference signal 2 from the signal points 5c of the baseband signal 5a, and is observed to rotate at the angular speed $2\pi\Delta f$ proportional to the carrier frequency offset $\Delta f$. Namely, the phase of the residual signal 6 rotates at the angular speed $2\pi\Delta f$. Since the phase of the desired signal 1 rotates at the angular speed $2\pi\Delta f$ in this manner, the phase of the residual signal 6 while noise remains in the desired signal 1 also averagely rotates at the angular speed $2\pi\Delta f$. The interference canceller 25 inputs the residual signal 6 to the rotation speed measurement unit 28.

The rotation speed measurement unit 28 measures the rotation speed $2\pi\Delta f$ of the desired signal 1 included in the synchronously detected received signal. The rotation speed is the angular speed of signal phase rotation. The rotation speed measurement unit 28 measures the rotation speed of the residual signal 6, which results from removing the interference signal 2 acquired from the interference canceller 25. In this manner, the rotation speed measurement unit 28 may measure the rotation speed of the desired signal 1 itself, or measure the rotation speed of the residual signal 6 while noise remains in the desired signal 1.

Furthermore, the rotation speed measurement unit 28 may measure the rotation speed $2\pi\Delta f$ of the desired signal 1 included in the synchronously detected received signal by estimating the rotation speed based on the propagation path estimation value estimated through the propagation path estimator 25a of the interference canceller 25. In this case, the propagation path estimator 25a inputs the propagation path estimation value to the rotation speed measurement unit 28 rather than the interference canceller 25 inputs the residual signal 6 to the rotation speed measurement unit 28. The rotation speed measurement unit 28 may accurately measure the rotation speed from the propagation path estimation value especially after the carrier frequency offset has been sufficiently reduced. The rotation speed measurement unit 28 inputs the measured rotation speed to the frequency offset estimator 26c.

The frequency offset estimator 26c estimates the carrier frequency offset based on the rotation speed of the desired signal 1 included in the received signal. The frequency offset estimator 26c may estimate the carrier frequency offset $\Delta f$ through calculation based on the rotation speed $2\pi\Delta f$ acquired from the rotation speed measurement unit 28. The frequency offset estimator 26c inputs the estimated carrier frequency offset to the information signal generator 27. The frequency offset estimator 26c may estimate based on the rotation speed of the desired signal 1 itself, or estimate based on the rotation speed of the residual signal 6 while noise remains in the desired signal 1. The frequency offset estimator 26c and the rotation speed measurement unit 28 may utilize a circuit performing the above-mentioned functions.

Note that it is preferable that the transmission controller 22a instructs the radio transmitter 10 to transmit a desired signal 1 configured with a single symbol with sufficiently little transmission power when instructing the radio transmitter 10 to resume transmission of the desired signal 1. Accordingly, the transmitted signal generator 14 of the radio transmitter 10 resumes transmission of the desired signal 1 configured with a single symbol with sufficiently little transmission power based on the instruction from the transmission controller 14a in conformity with the instruction from the radio receiver 20c. Hereby, since the desired signal 1 is transmitted with sufficiently little transmission power, the interference canceller 25 may easily generate interference signal symbol sequence candidates and easily generate interference signal replicas. Therefore, the interference canceller 25 may easily remove the interference signal 2.

Furthermore, in the case where control of the carrier frequency continues and the carrier frequency offset has been reduced, it is preferable that the transmission controller 22a instruct the radio transmitter 10 to gradually increase the transmission power of the desired signal 1. Accordingly, the transmitted signal generator 14 of the radio transmitter 10 transmits the desired signal 1 while gradually increasing the transmission power. As a result, reception quality of the desired signal increases, and the estimation accuracy of the frequency offset estimator 26c improves.

In addition, the frequency offset estimator 26c may pre-memorize the symbol sequence of the desired signal 1, and estimate the carrier frequency offset using the memorized symbol sequence. As a result, the frequency offset estimator 26c may estimate the carrier frequency offset with high accuracy. Furthermore, in this case, it is unnecessary for the transmission controller 22a to instruct to decrease the transmission power of the desired signal 1. In addition, when measuring the rotation speed $2\pi\Delta f$ of the desired signal 1 based on the propagation path estimation value, the rotation speed measurement unit 28 may measure the rotation speed with high accuracy even if the transmission power of the desired signal 1 is large. Furthermore, also in this case, it is unnecessary for the transmission controller 22a to instruct to decrease the transmission power of the desired signal 1.

(Radio Communication Method)

A procedure for a radio communication method using the communication system 100c shown in FIG. 7 is described referencing FIG. 9. The radio transmitter 10 and the radio receiver 20c perform steps (S201) through (S205). Steps (S201) through (S205) are the same as steps (S101) through (S105) shown in FIG. 4. The radio receiver 20c changes the reference frequency used for synchronized detection to the carrier frequency fc+$\Delta$f of the interference signal 2 detected in step (S205) (S206). Subsequently, the radio receiver 20c instructs the radio transmitter 10 to resume transmission of the desired signal 1 (S207). The radio transmitter 10 resumes transmission and transmits the desired signal 1 in conformity with the instruction from the radio receiver 20c (S208).

After transmission of the desired signal 1 is resumed, the radio receiver 20c synchronously detects the received signal including the desired signal 1 and the interference signal 2 using the carrier frequency of the interference signal 2 as the reference frequency so as to obtain the baseband signal 5a. The radio receiver 20c then obtains the residual signal 6 by removing the interference signal 2 from the baseband signal 5a (S209). The radio receiver 20c measures the rotation speed $2\pi\Delta f$ of the residual signal 6 as the rotation speed of the desired signal 1. The radio receiver 20c estimates the carrier frequency offset $\Delta f$ based on the measured rotation speed $2\pi\Delta f$ (S210). The radio receiver 20c transmits to the radio transmitter 10 an offset information signal 3 including the estimated carrier frequency offset $\Delta f$ (S211). Based on the carrier frequency offset $\Delta f$ included in the offset information signal 3, the radio transmitter 10 controls the carrier frequency of the desired signal 1 by adjusting the carrier frequency of the transmitted desired signal 1 to the carrier frequency fc+$\Delta f$ of the interference signal 2 (S212). The radio transmitter 10 then transmits to the radio receiver 20c the carrier frequency-controlled desired signal 1.

Such radio receiver 20c may estimate the carrier frequency offset by measuring the rotation speed of the desired signal 1 included in the received signal itself, or the rotation speed of the residual signal 6 while noise remains in the desired signal 1. As a result, the carrier frequency offset may be independently compensated on each radio link connected between the radio receiver 20c and the radio transmitter 10.

[Fifth Embodiment]

Figure 10:
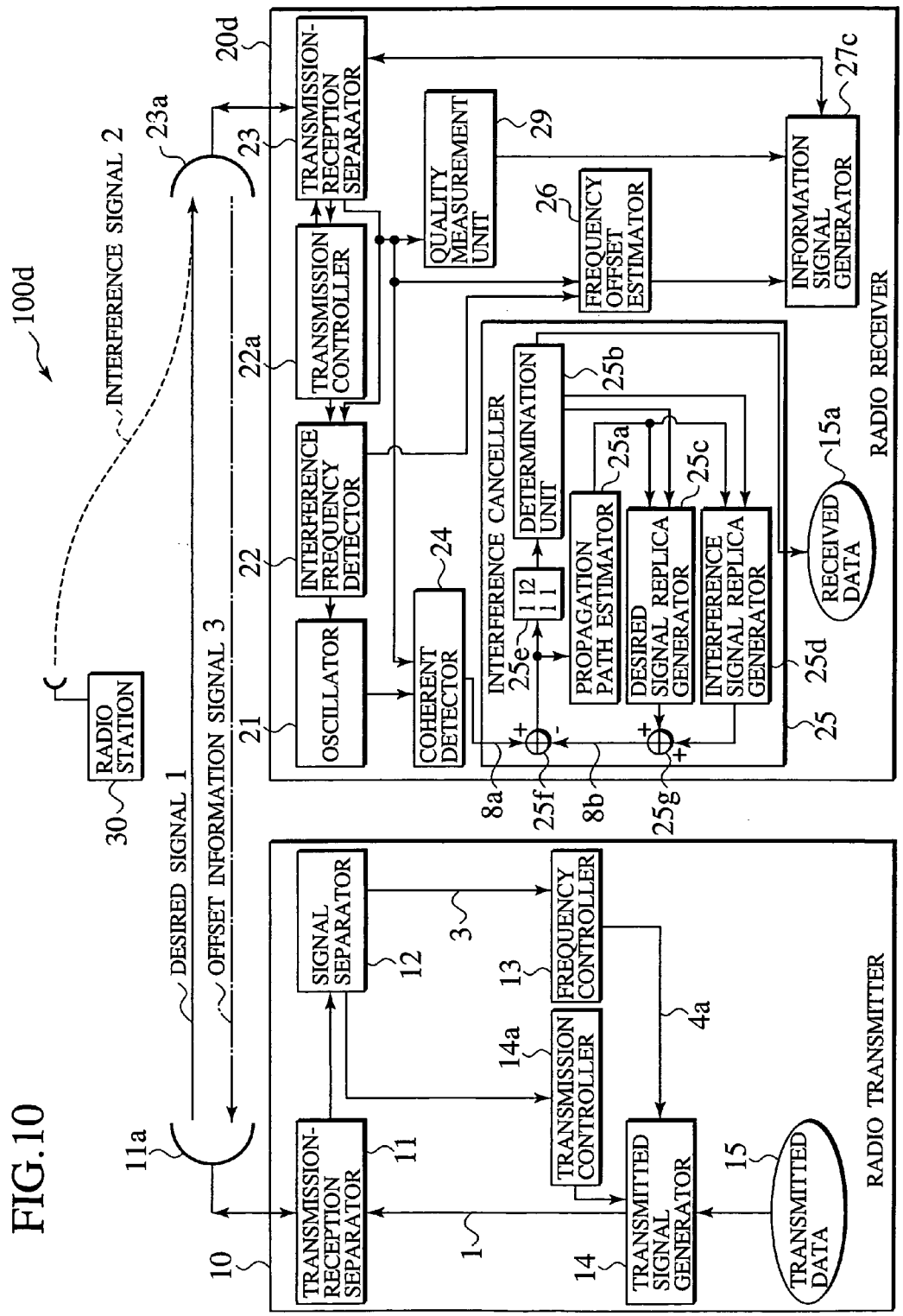
FIG. 10 is a block diagram showing a radio communication system of a fifth embodiment.

As shown in FIG. 10, a radio communication system 100d comprises the radio transmitter 10 and a radio receiver 20d. The radio receiver 20d comprises the oscillator 21, the interference frequency detector 22, the transmission controller 22a, the antenna 23a, the transmission-reception separator 23, the coherent detector 24, the interference canceller 25, the frequency offset estimator 26, an information signal generator 27c and a quality measurement unit 29. The same reference numerals are given in FIG. 10 for the substantially same configuration as those in the radio communication systems 100 shown in FIG. 3, and a part of the description is omitted.

The transmission-reception separator 23 inputs a received signal to the quality measurement unit 29. The quality measurement unit 29 measures the reception quality of the received signal. The quality measurement unit 29 measures as a reception quality the carrier-to-interference power ratio (CIR), signal-to-interference power ratio (SIR), carrier-to-noise power ratio (CNR) and the like for the received signal. The quality measurement unit 29 may also measure as the reception quality those that represent the quality of the received signal such as the power ratio of the received signal or the desired signal to the interference signal 2 or noise. It is especially preferable that the quality measurement unit 29 measures the CNR. The quality measurement unit 29 measures the reception quality of the received signal from the coherent detector 24. The quality measurement unit 29 inputs the measured reception quality to the information signal generator 27c.

The information signal generator 27c makes a determination of whether to control the carrier frequency based on the measured reception quality of the received signal. The information signal generator 27c determines whether to control the carrier frequency by comparing the measured reception quality with the threshold of the reception quality, which is used for the determination of whether to control. The information signal generator 27c then decides whether to generate an offset information signal 3 based on the determination result. Namely, the information signal generator 27c decides whether to generate the offset information signal 3 and transmits it to the radio transmitter 10. Alternatively, the information signal generator 27c decides the information to be included in the offset information signal 3 based on the determination result. The information to be included in the offset information signal 3 may be the carrier frequency offset, comparison results between the threshold and the measured reception quality, the determination result of whether to control the carrier frequency, or the like. It is preferable that the information signal generator 27c determine utilizing the measured values of the CNR and threshold of the CNR.

The information signal generator 27c presets and memorizes the threshold of the reception quality, then compares the memorized threshold with the measured reception quality. The greater the reception quality of the received signal, the more the estimation accuracy of the carrier frequency offset improves. For example, in the case of a large noise power and a low CNR, there is concern of degradation in estimation accuracy of the carrier frequency offset due to noise power. Therefore, the threshold of the reception quality should be a certain value, which the carrier frequency offsets can be estimated with the high accuracy and the carrier frequency of the desired signal 1 can be controlled based on the carrier frequency offset with the high accuracy, due to high reception quality in the case of using more than or equal to the value.

The information signal generator 27c determines to control the carrier frequency if the measured reception quality is more than or equal to the threshold. The information signal generator 27c then decides to generate the offset information signal 3 and transmit it to the radio transmitter 10 based on the determination result. In this case, the information signal generator 27c generates the offset information signal 3 by modulating the information including the carrier frequency offset acquired from the frequency offset estimator 26 into a signal. The information signal generator 27c transmits the generated offset information signal 3 to the radio transmitter 10 via the transmission-reception separator 23 and the antenna 23a.

Meanwhile, the information signal generator 27c determines not to control the carrier frequency if the measured reception quality is less than the threshold. The information signal generator 27c then decides not to generate the offset information signal 3 and not transmit it to the radio transmitter 10 based on the determination result. In this case, the information signal generator 27c discards the carrier frequency offset acquired from the frequency offset estimator 26, and does not generate the offset information signal 3.

The radio transmitter 10 controls the carrier frequency of the desired signal 1 based on the carrier frequency offset included in the offset information signal 3 when the offset information signal 3 has been received. The radio transmitter 10 does not control the carrier frequency of the desired signal 1 based on the carrier frequency offset when the offset information signal 3 has not been received.

Alternatively, in the case where the measured reception quality value is more than or equal to the threshold, the information signal generator 27c determines to control the carrier frequency, and decides that the information to be included in the offset information signal 3 is the estimated carrier frequency offset acquired from the frequency offset estimator 26. Meanwhile, in the case where the measured reception quality value is less than the threshold, the information signal generator 27c determines to control the carrier frequency, and decides that the information to be included in the offset information signal 3 is carrier frequency offset '0', regardless of the carrier frequency offset estimated by the frequency offset estimator 26. The information signal generator 27c then generates the offset information signal 3 by modulating the information including the determined carrier frequency offset into a signal. The information signal generator 27c transmits the generated offset information signal 3 to the radio transmitter 10 via the transmission-reception separator 23 and the antenna 23a.

The information signal generator 27c may generate the offset information signal 3 including not only the carrier frequency offset, but the comparison results between the threshold and the measured reception quality, and the determination result of whether to control the carrier frequency as well. For example, it may generate an offset information signal 3 including the information indicating that the measured reception quality is less than the threshold as the comparison result, and the estimated carrier frequency offset.

The radio transmitter 10 controls the carrier frequency of the desired signal 1 based on the estimated carrier frequency offset included in the offset information signal 3, when the offset information signal 3 including the estimated carrier frequency offset has been received. The frequency controller 13 of the radio transmitter 10 controls the carrier frequency of the desired signal 1 in conformity with a carrier frequency offset '0' even when the offset information signal 3 with carrier frequency offset '0' has been received. As a result, since there is no carrier frequency offset needing compensation, effective compensation for the carrier frequency offset is not performed.

(Radio Communication Method)

Figure 11A:
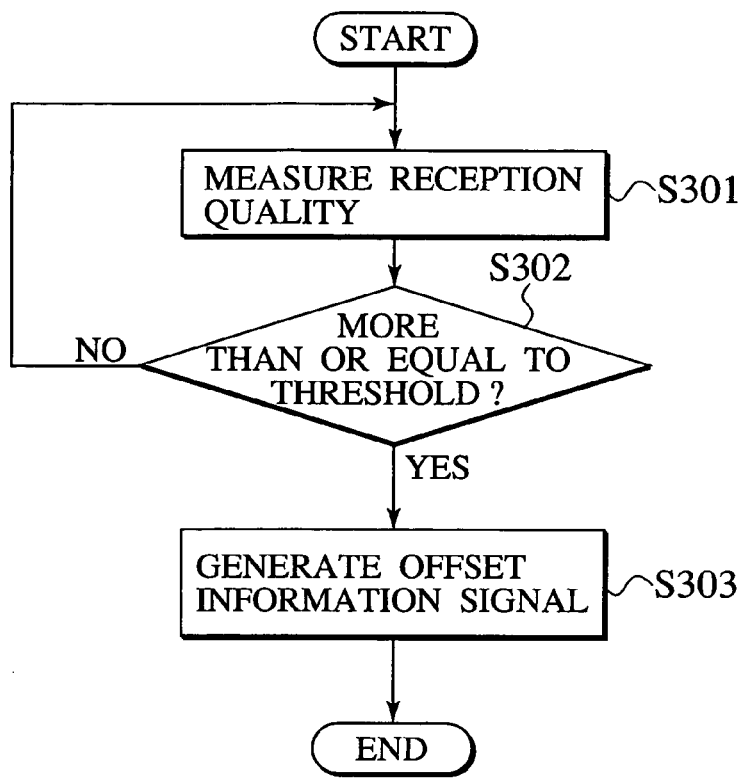
FIGS. 11A and 11B are flow charts illustrating an offset information signal transmission procedure for the radio communication method of the fifth embodiment.

A transmission procedure for a radio communication method using the communication system 100d shown in FIG. 10 is described referencing FIG. 11A. The radio receiver 20d measures the reception quality of a received signal (S301). The radio receiver 20d determines whether to control the carrier frequency by comparing the measured reception quality with the threshold of the reception quality (S302). In the case where the measured reception quality value is more than or equal to the threshold in step (S302), the radio receiver 20d determines to control the carrier frequency, generates an offset information signal 3, and transmits it to the radio transmitter 10 (S303). The radio receiver 20d then returns to step (S301), and repeats processing. Meanwhile, in the case where the measured reception quality is less than the threshold in step (S302), the radio receiver 20d determines not to control the carrier frequency, and does not generate an offset information signal 3. The radio receiver 20d then returns to step (S301), and repeats processing.

Figure 11B:
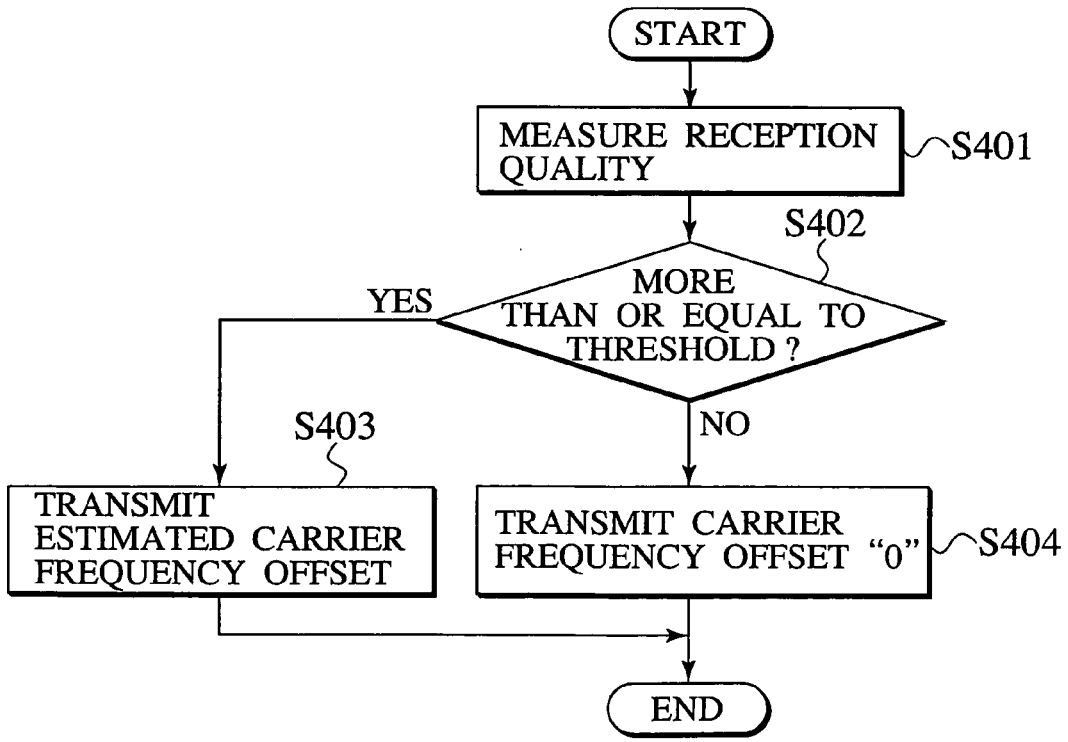

Another transmission procedure for an offset information signal in the radio communication method using the communication system 100d shown in FIG. 10 is described referencing FIG. 11B. The radio receiver 20d measures the reception quality of a received signal (S401). The radio receiver 20d determines whether to control the carrier frequency by comparing the measured reception quality with the threshold of the reception quality (S402). In the case where the measured reception quality is more than or equal to the threshold in step (S402), the radio receiver 20d determines to control the carrier frequency, generates an offset information signal 3 including the carrier frequency offset estimated by the frequency offset estimator 26, and transmits it to the radio transmitter 10 (S403). The radio receiver 20d then returns to step (S401), and repeats the processing. Meanwhile, in the case where the measured reception quality is less than the threshold in step (S402), the radio receiver 20d determines not to control the carrier frequency, generates an offset information signal 3 including the carrier frequency offset '0', and transmits it to the radio transmitter 10 (S404). The radio receiver 20d then returns to step (S401), and repeats the processing.

According to the radio communication system 100d, radio receiver 20d and radio communication method, the offset information signal 3 including the estimated carrier frequency offset may be transmitted to the radio transmitter 10 only when the reception quality of the received signal is high and the carrier frequency offset can be estimated with high accuracy. Therefore, only when the carrier frequency offset is highly accurate, the radio transmitter 10 can control the carrier frequency of the desired signal 1 based on the carrier frequency offset. In other words, the radio communication system 100d may control such that the carrier frequency offset is not effectively compensated in the case of low reception quality, and the carrier frequency offset is effectively compensated only in the case of high reception quality, which is done by not having an offset information signal 3 transmitted or transmitting the offset information signal 3 including carrier frequency offset '0' in the case of low reception quality, whereas transmitting the offset information signal 3 or the estimated carrier frequency offset only in the case of high reception quality. As a result, for example, carrier frequency offset compensation may be avoided in the case where the noise power is large, the CNR is low, and the estimation accuracy of the carrier frequency offset has degraded due to the noise power. Accordingly, the radio communication system 100d can compensate for the carrier frequency offset with higher accuracy.

[Sixth Embodiment]

Figure 12:
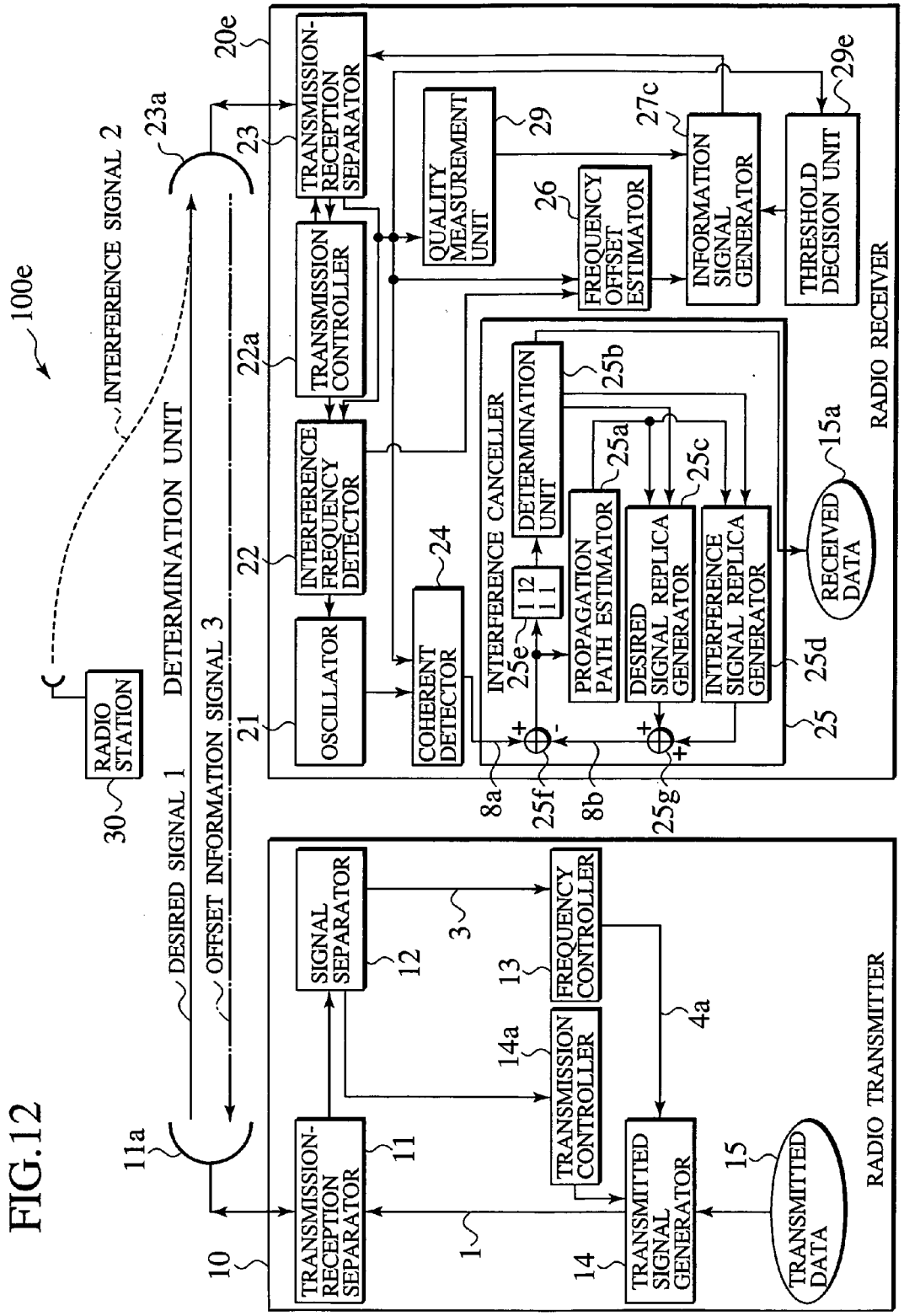
FIG. 12 is a block diagram showing a radio communication system of a sixth embodiment.

As shown in FIG. 12, a radio communication system 100e comprises the radio transmitter 10 and a radio receiver 20e. The radio receiver 20e comprises the oscillator 21, the interference frequency detector 22, the transmission controller 22a, the antenna 23a, the transmission-reception separator 23, the coherent detector 24, the interference canceller 25, the frequency offset estimator 26, the information signal generator 27c, the quality measurement unit 29, and a threshold decision unit 29e. The same reference numerals are given in FIG. 12 for the substantially same configuration as those in the radio communication systems 100 shown in FIG. 3, and a part of the description is omitted.

The transmission-reception separator 23 also inputs to the threshold decision unit 29e. The threshold decision unit 29e decides the threshold of the reception quality, which is used for determining whether to control the carrier frequency of the desired signal 1. It is preferable that the threshold decision unit 29e determines the threshold of the reception quality based on the modulation method used for the received signal from the transmission-reception separator 23.

In the case where the number of multi-value used for modulating the desired signal 1 and/or the interference signal 2 is large, the signal points of the desired signal 1 and the interference signal 2 are easily overlapped, an erroneous determination of the desired signal 1 is easily made, and estimation accuracy of the carrier frequency offset is easily degraded. Therefore, estimating the carrier frequency offset with high accuracy in the case of low reception quality becomes difficult. Accordingly, the threshold decision unit 29e decides the threshold of the reception quality to be a large value when the number of multi-value used for modulating the desired signal 1 or the interference signal 2, which is included in the received signal is large, and compensates for the carrier frequency offset only when the reception quality is high.

Meanwhile, in the case where the number of multi-value used for modulating the desired signal 1 or the interference signal 2 is small, the signal points of the desired signal 1 and the interference signal 2 do not overlap, the desired signal 1 may be determined without error, and estimation accuracy of the carrier frequency offset improves. Therefore, the carrier frequency offset may be estimated with high accuracy even if the reception quality is low. Accordingly, the threshold decision unit 29e decides the threshold of the reception quality to be a small value when the number of multi-value used for modulating the desired signal 1 or the interference signal 2, which is included in the received signal is small, and compensates for the carrier frequency offset even if the reception quality is low.

Figure 13:
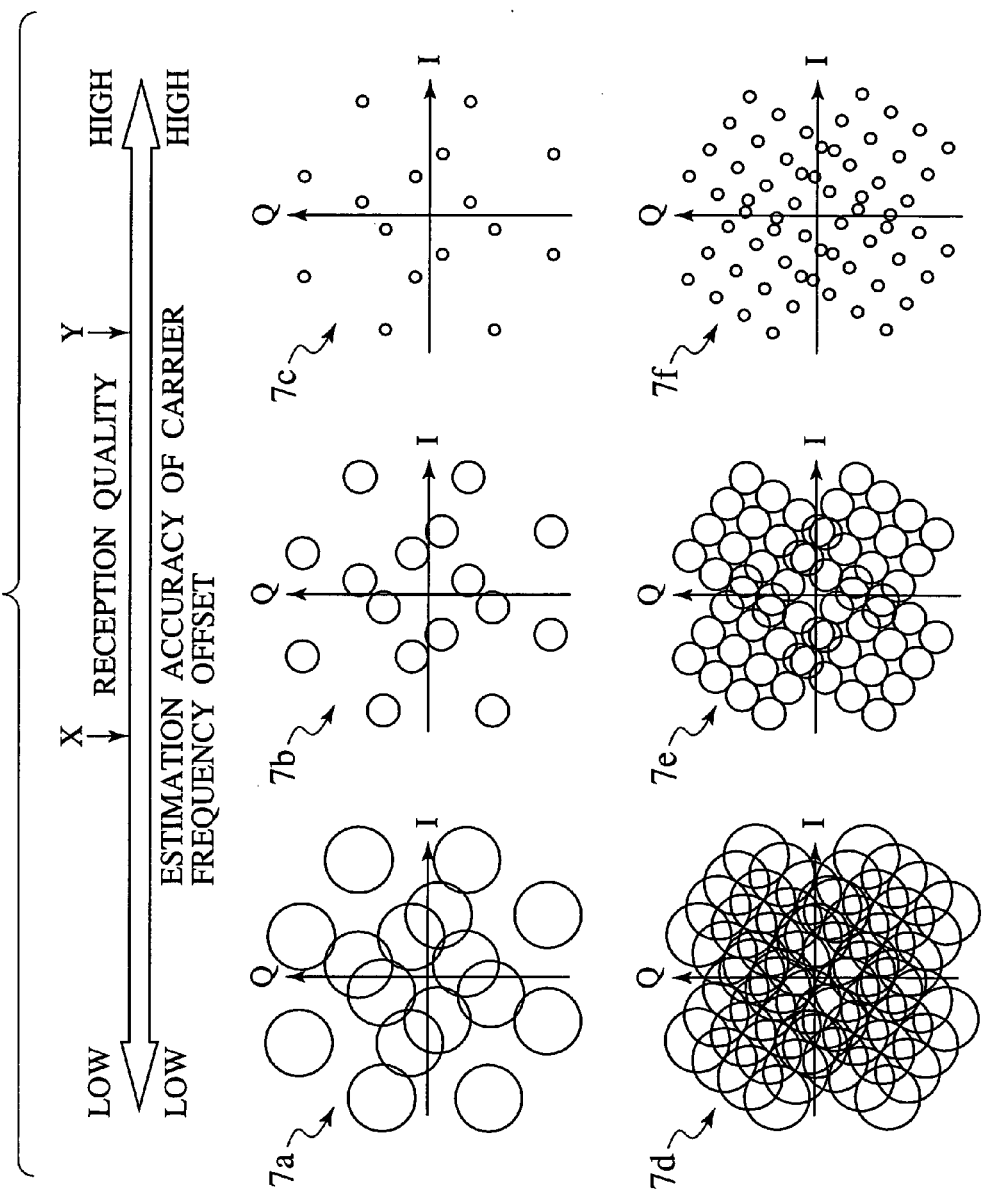
FIG. 13 shows relation of signal constellation diagrams of received signals, estimation accuracy of reception quality and carrier frequency offset.

For example, FIG. 13 presents signal constellation diagrams 7a through 7c for received signals when the modulation method for the desired signal 1 and the interference signal 2 is quadrature phase shift keying (QPSK) having the number of multi-value 4, and signal constellation diagrams 7d through 7f for received signals when the modulation method for either one of the desired signal 1 or the interference signal 2 is QPSK, and the other modulation method is 16 quadrature amplitude modulation (QAM) having the number of multi-value is 16. Further towards signal constellation diagram 7c from signal constellation diagram 7a and also further towards signal constellation diagram 7f from signal constellation diagram 7d, reception quality increases and estimation accuracy of the carrier frequency offset increases.

For example, the closer to signal constellation diagrams 7c and 7f when the noise power is low and reception quality is high, the signal points of the received signals do not overlap, the received signal may be determined without error, and estimation accuracy of the carrier frequency offset is higher. Furthermore, overlapping of signal points of the received signals and degradation in estimation accuracy of the carrier frequency offset is easier with the group of signal constellation diagrams 7d through 7f in the case of a large number of the multi-value used for modulation rather than with the signal constellation diagrams 7a through 7c in the case of a small number of the multi-value.

Therefore, in the case where the received signal modulated with the 4-value modulation method, the threshold decision unit 29e decides to compensate for the carrier frequency offset when the signal constellation diagrams 7b and 7c in which signal points do not easily overlap are obtained. The threshold decision unit 29e then decides the threshold of the reception quality (for example, CNR) to be a minimum value 'X' for the reception quality that can be obtained from signal constellation diagrams 7b and 7c, or a value exceeding the minimum value 'X'. Furthermore, in the case where the received signal modulated with the 16-value modulation method, the threshold decision unit 29e decides to compensate for the carrier frequency offset when the signal constellation diagram 7f in which signal points do not easily overlap is obtained. The threshold decision unit 29e then decides the threshold of the reception quality to be a minimum value 'Y' for the reception quality that can be obtained from signal constellation diagram 7f, or a value exceeding the minimum value 'Y'.

In addition, even when the radio receiver 20e already knows the symbol sequence of the desired signal 1, the radio receiver 20e may accurately estimate the carrier frequency offset through utilization of the known symbol sequence. Therefore, the carrier frequency offset may be estimated with sufficiently high accuracy even if the threshold of the reception quality is set even lower. Accordingly, the threshold decision unit 29e may decide the threshold of reception quality in the case where the radio receiver 20e receives a desired symbol 1 with an unknown symbol sequence (hereinafter, referred to as 'normal threshold'), and threshold of reception quality in the case where the radio receiver 20e receives a desired symbol 1 with a known symbol sequence (hereinafter, referred to as 'known signal threshold'). The threshold decision unit 29e may decide a known signal threshold that is lower than the normal threshold.

For example, the threshold decision unit 29e memorizes the symbol sequence of a pilot signal, and when the symbol sequence of a pilot signal included in the received signal from the transmission-reception separator 23 adjusts the symbol sequence of the memorized pilot signal, the received signal is determined to be known at the radio receiver 20e, and is determined to be unknown when they does not adjust. The threshold decision unit 29e then detects the modulation method used for the received signal, and decides the threshold of the reception quality based on the detection result and the determination result of whether it is a received signal with a known symbol sequence.

The threshold decision unit 29e inputs the decided threshold of the reception quality to the information signal generator 27c. The information signal generator 27c makes a determination of whether to control the carrier frequency by comparing the measured reception quality acquired from the quality measurement unit 29 with the threshold of the reception quality acquired from the threshold decision unit 29e.

According to the radio receiver 20e, the threshold of the reception quality is decided to be a high value when the number of multi-value modulation used for the desired signal 1 or the interference signal 2, which is included in the received signal, is large, and highly accurate estimation of the carrier frequency offset is difficult if the reception quality is low, and can compensate for the carrier frequency offset only when the reception quality is high. Meanwhile, the radio receiver 20e decides the threshold for the reception quality to be a low value when the number of multi-value modulation is small and highly accurate estimation of the carrier frequency offset is possible even if the reception quality is low, and can compensate for the carrier frequency offset even if the reception quality is low. Furthermore, the radio receiver 20e may decide the normal threshold or the known signal threshold depending on whether the symbol sequence of the received signal is known. As a result, the radio communication system 100d can compensate for the carrier frequency offset with higher accuracy according to the communication conditions. Furthermore, the remnant carrier frequency offset after carrier frequency offset compensation may be reduced.

[Seventh Embodiment]

Figure 14:
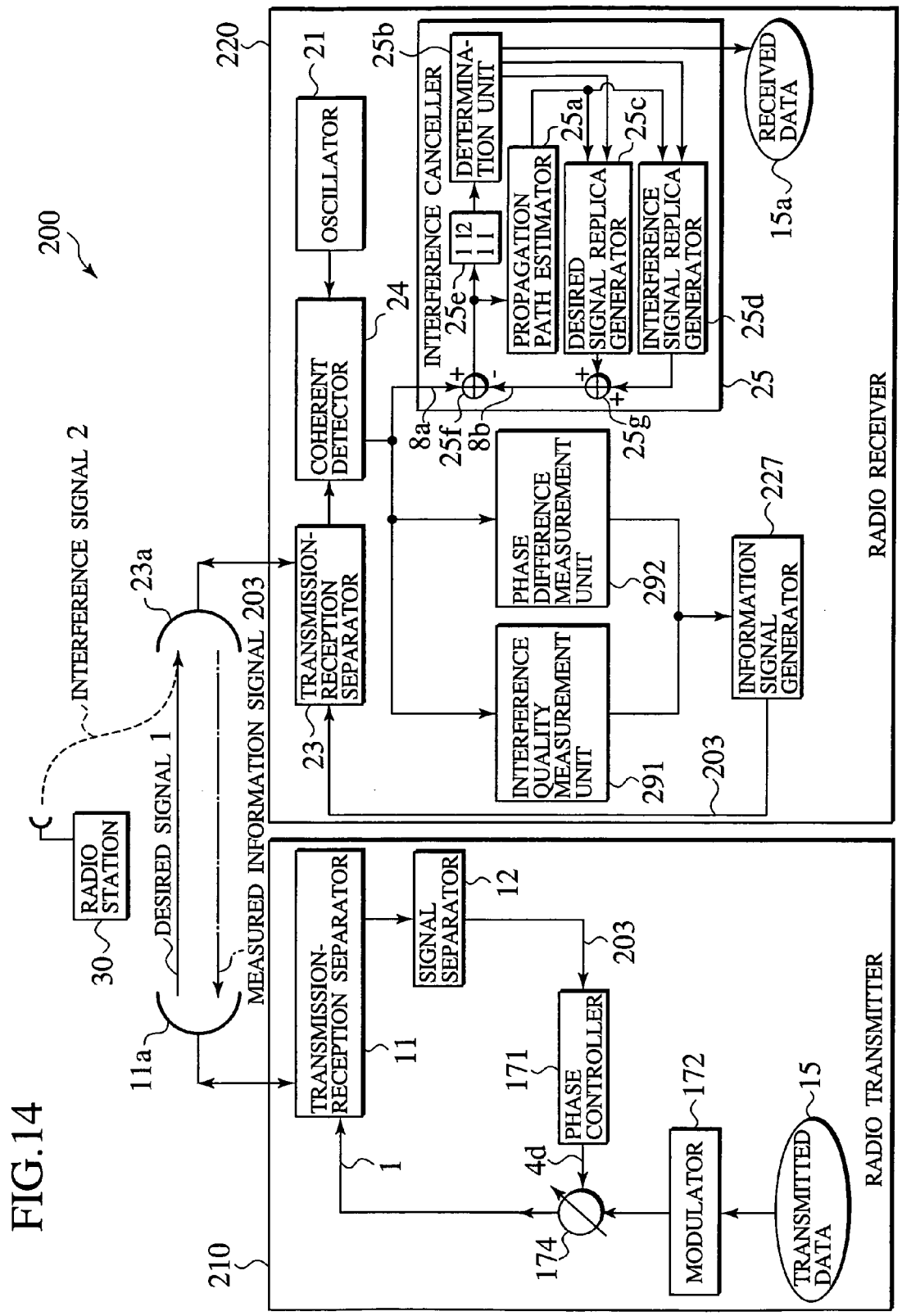
FIG. 14 is a block diagram showing a radio communication system of a seventh embodiment.

As shown in FIG. 14, a radio communication system 200 comprises a radio transmitter 210 and a radio receiver 220. The radio receiver 220 comprises the oscillator 21, the antenna 23a, the transmission-reception separator 23, the coherent detector 24, the interference canceller 25, an information signal generator 227, an interference quality measurement unit 291, and a phase difference measurement unit 292. The same reference numerals are given for the substantially same configuration as those in the radio receiver 20 shown in FIG. 3, and a part of the description is omitted.

The coherent detector 24 synchronously detects a received signal from the transmission-reception separator 23 based on the reference frequency input from the oscillator 21. The coherent detector 24 inputs the detected received signal to the interference canceller 25, the interference quality measurement unit 291, and the phase difference measurement unit 292.

The phase difference measurement unit 292 measures the phase difference between a desired signal 1 and an interference signal 2. The phase difference measurement unit 292 measures the phase difference between the desired signal 1 and the interference signal 2, which are included in the received signal from the coherent detector 24. For example, the phase difference measurement unit 292 may measure the phase difference through utilization of a pilot symbol. The phase difference measurement unit 292 inputs the measured phase differences to the information signal generator 227.

The interference quality measurement unit 291 measures the interference reception quality, which indicates the influence of an interference signal on the received signal. Everything, which is capable of indicating the influence of the interference signal on the received signal may be used as an interference reception quality. CIR and SIR for received signal, interference signal power, the power ratio of the desired signal 1 or received signal to the interference signal 2 and noise, or the power ratio of the received signal to the interference signal 2 or the like may be used for the interference reception quality. Note that it is preferable that the interference quality measurement unit 291 measures the CIR as the interference reception quality. The interference quality measurement unit 291 measures the interference reception quality of the received signal from the coherent detector 24. The interference quality measurement unit 291 inputs the measured interference reception quality to the information signal generator 227.

The information signal generator 227 generates a measured information signal 203 including the measured phase difference between the desired signal 1 and the interference signal 2, and the measured interference reception quality of the received signal, as an information signal. The information signal generator 227 generates the measured information signal 203 by modulating the information including the measured phase difference acquired from the phase difference measurement unit 292 and the measured interference reception quality acquired from the interference quality measurement unit 291, into signals. The information signal generator 227 inputs the generated measured information signal 203 to the transmission-reception separator 23. In this manner, the information signal generator 227 transmits the measured information signal 203 to the radio transmitter 210 via the transmission-reception separator 23 and the antenna 23a.

The radio transmitter 210 comprises the antenna 11a, the transmission-reception separator 11, the signal separator 12, a phase controller 171, a modulator 172, and a variable-phase shifter 174. The same reference numerals are given for the substantially same configuration as those in the radio transmitter 10 shown in FIG. 3, and a part of the description is omitted.

The antenna 11a receives a measured information signal 203. The signal separator 12 separates the measured information signal 203 from within the received signal input from the transmission-reception separator 11, and inputs it to the phase controller 171. The phase controller 171 controls the phase of a desired signal 1 to be transmitted by the radio transmitter 210. The phase controller 171 controls the phase of the desired signal 1 based on the measured phase difference and the measured interference reception quality, which are included in the measured information signal 203.

Here, there is a fixed relationship among the phase difference between the desired signal 1 and the interference signal 2, the interference reception quality of the received signal, and the minimum distance between the signal points of the received signals represented in a signal constellation diagram (hereinafter, referred to as 'minimum inter-signal point distance'). For example, the following Equation (2) is established; where '$\vec{X}n$' and '$\vec{Y}n$' denote unit vectors representing two signal points of the received signal, '$D_E$' denotes the minimum inter-signal point distance between those two signal points, 'θ' denotes the phase difference, and 'C' denotes the interference reception quality. CIR(dB) is used as the interference reception quality 'C' in the Equation (2).

$$D_E(\theta, C) = \min_{i,k,i \neq k} \left\{ \left| (\vec{X}i \cdot 10^{C/20} + \vec{Y}i \cdot e^{j\theta}) - (\vec{X}k \cdot 10^{C/20} + \vec{Y}k \cdot e^{j\theta}) \right|^2 \right\}$$

(Equation 2)

Therefore, the relationship among phase difference, interference reception quality, and minimum inter-signal point distance may be calculated. The phase controller 171 controls the phase of a transmitted desired signal based on the relationship among the phase difference between the desired signal 1 and the interference signal 2, the interference reception quality of the received signal and the minimum inter-signal point distance of the received signal, and the measured phase difference and the measured interference reception quality. Hereinafter, minimum inter-signal point distance to be targeted is referred to as 'target minimum inter-signal point distance'. The phase controller 171 controls the phase of the desired signal 1 based on the measured interference reception quality, so as to become a necessary phase difference for providing the target minimum inter-signal point distance with that interference reception quality. The target minimum inter-signal point distance may be set to the feasible maximum value with that interference reception quality, or it may be set to a feasible large value with that interference reception quality. Note that the distance between signal points, which are plotted on a coordinate with a Q and an I component and represent the unit vectors obtained by modulating the desired signal 1 and the interference signal 2, is used as the inter-signal point distance.

Based on the measured interference reception quality, the phase controller 171 calculates a necessary phase difference for making the minimum inter-signal point distance of the received signal equal to the target minimum inter-signal point distance (hereinafter, referred to as 'target phase difference'). For example, the phase controller 171 may calculate the target phase difference using the above-given Equation (2), or may rotate the phase of the desired signal 1 with the measured interference reception quality so as to obtain the relationship between the minimum inter-signal point distance and the phase difference and then calculate a phase difference that allows the minimum inter-signal point distance to be the target minimum inter-signal point distance, as the target phase difference. The target phase difference may be a necessary minimum phase difference for obtaining the target minimum inter-signal point distance, or it may be a necessary phase difference for obtaining one that is more than the target minimum inter-signal point distance, so long as it is a phase difference allowing the minimum inter-signal point distance of the received signal to be the target minimum inter-signal point distance.

The phase controller 171 decides a necessary phase shift amount of the desired signal 1 for making the phase difference between the desired signal 1 and the interference signal 2 at the radio receiver 220 equal to the target phase difference, based on the measured phase difference and the calculated target phase difference. The phase controller 171 controls the phase of the transmitted desired signal 1 by inputting a phase control signal 4d used to control the phase of the desired signal 1 to the variable-phase shifter 174. The phase controller 171 generates the phase control signal 4d including an instruction for rotating the phase of the desired signal 1 by just the decided phase shift amount, and inputs it to the variable-phase shifter 174. The phase controller 171 then makes the variable-phase shifter 174 rotate the phase of the desired signal 1. The phase controller 171 preferably controls the phase of the desired signal 1 using the feasible maximum value with the interference reception quality as a target minimum inter-signal point distance so that the minimum inter-signal point distance can be the feasible maximum value. In this manner, the phase controller 171 functions as a controller that controls at least one of the phase and transmission power of a transmitted desired signal 1 based on the measured phase difference and the measured interference reception quality.

The modulator 172 modulates the transmitted data 15 into a desired signal 1, inputting it to the variable-phase shifter 174. The variable-phase shifter 174 controls the phase of the desired signal 1 acquired from the modulator 172, based on the phase control signal 4d acquired from the phase controller 171. The variable-phase shifter 174 rotates the phase of the desired signal 1 acquired from the modulator 172 by just the phase shift amount included in the phase control signal 4d. The variable-phase shifter 174 then inputs the phase-controlled desired signal 1 to the transmission-reception separator 11 and transmits it to the radio receiver 220 via the antenna 11a.

According to the radio communication system 200, radio transmitter 210, and radio receiver 220, the radio transmitter 210 can control the phase of a transmitted desired signal 1 based on the measured phase difference and the measured interference reception quality of the received signal at the radio receiver 220. Specifically, the phase controller 171 controls the phase of the transmitted desired signal 1 based on the relationship among the phase difference between the desired signal 1 and the interference signal 2, the interference reception quality of the received signal and the minimum inter-signal point distance of the received signal, and the measured phase difference and the measured interference reception quality. Therefore, the radio communication system 200 can distribute the signal points of the received signals when plotting those signal points. Accordingly, the interference canceller 25 in the radio receiver 220 can reduce erroneous determination due to the signal points of the received signals being close to each other and output an appropriate desired signal 1, so that the interference signal 2 can be effectively removed. As a result, the radio communication system 200 may enhance the effectiveness of the interference canceller 25 and improve the frequency utilization efficiency.

Particularly, the phase controller 171 can distribute the signal points of the received signals over a wide signal area by controlling the phase of the desired signal 1 to a maximize value at the minimum inter-signal point distance. Accordingly, the radio transmitter 210 can output an appropriate desired signal 1 by more reliably avoiding erroneous determination, and can enhance the effectiveness of the interference canceller 25.

[Eighth Embodiment]

Figure 15:
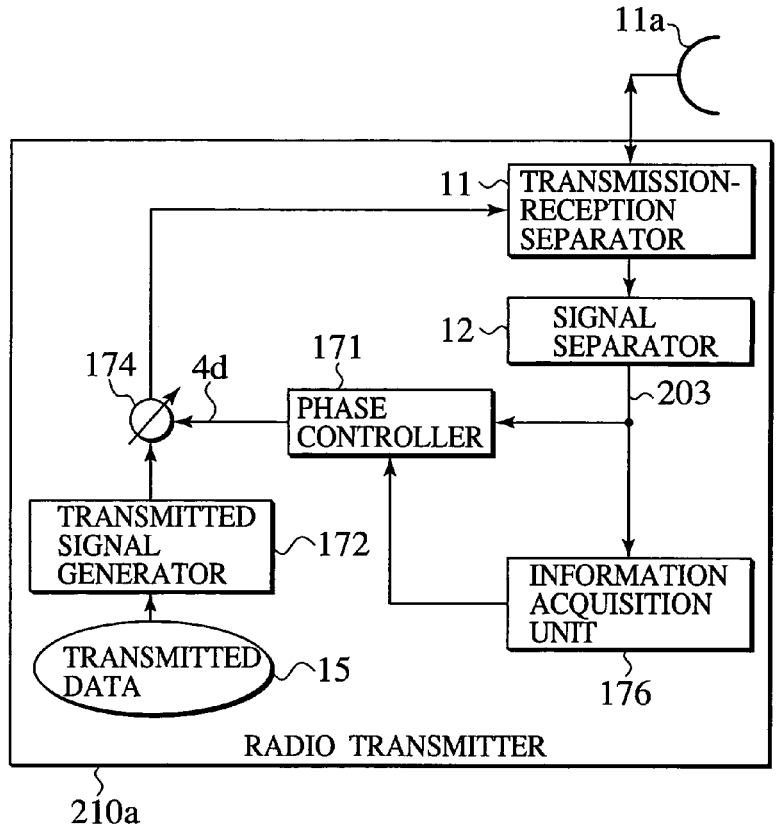
FIG. 15 is a block diagram showing a radio transmitter of an eighth embodiment.
Figure 16:
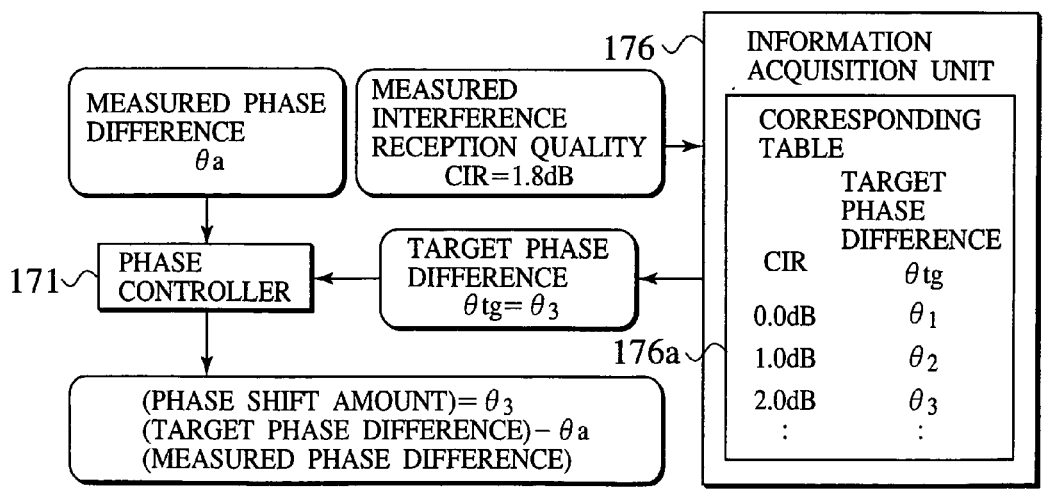
FIG. 16 is a diagram illustrating a decision method for phase shift amount of the eighth embodiment.

In the radio communication system 200 shown in FIG. 14, a radio transmitter 210a shown in FIG. 15 may be used in place of the radio transmitter 210. The radio transmitter 210a comprises the antenna 11a, the transmission-reception separator 11, the signal separator 12, the phase controller 171, the modulator 172, the variable-phase shifter 174, and an information acquisition unit 176. The same reference numerals are given for the substantially same configuration as those in the radio transmitter 210 shown in FIG. 14, and a part of the description is omitted. In addition, FIG. 16 illustrates a decision method for the phase shift amount.

The signal separator 12 inputs a measured information signal 203 to the phase controller 171 and the information acquisition unit 176. The information acquisition unit 176 acquires a target phase difference based on the measured interference reception quality. The information acquisition unit 176, as shown in FIG. 16, comprises a corresponding table holding information of the relationship between the interference reception qualities of the received signal and target phase differences. In this manner, the information acquisition unit 176 memorizes that relationship in advance. The corresponding table 176a holds the target phase difference $\theta tg$ for every interference reception quality at fixed intervals. The corresponding table 176a may be created by finding the relationship between interference reception quality obtained using the above-given Equation (2) and target phase difference, or may be created by rotating the phase of the desired signal 1 with various interference reception quality values, finding the relationship between the minimum inter-signal point distance and a phase difference, and calculating the phase difference as the target phase difference that allows the minimum inter-signal point distance to be the target minimum inter-signal point distance.

In this embodiment, CIR is used as the interference reception quality. The information acquisition unit 176 acquires a measured interference reception quality 'CIR=1.8 (dB)' from the measured information signal 203. The information acquisition unit 176 acquires a target phase difference '$\theta tg=\theta_3$' corresponding to the interference reception quality closest to the measured interference reception quality 'CIR=1.8 (dB)' from the corresponding table 176a, by referencing the interference reception quality (CIR) given in the corresponding table 176a and the measured interference reception quality. The information acquisition unit 176 inputs the acquired target phase difference '$\theta tg=\theta_3$' to the phase controller 171.

The phase controller 171 acquires the measured information signal 203 from the signal separator 12. The phase controller 171 acquires the target phase difference '$\theta tg=\theta_3$' from the information acquisition unit 176. The phase controller 171 acquires the measured phase difference '$\theta a$' from the measured information signal 203. The phase controller 171 decides a necessary amount of phase shift of the desired signal 1 for making the phase difference between the desired signal 1 and the interference signal 2 at the radio receiver 220 equal to the target phase difference, based on the measured phase difference acquired from the measured information signal 203 and the target phase difference acquired from the information acquisition unit 176. The phase controller 171 decides the phase shift amount by subtracting the measured phase difference '$\theta a$' from the target phase difference '$\theta tg=\theta_3$'. The phase controller 171 acquires the target phase difference from the information acquisition unit 176 in this manner without calculating it by itself.

According to the radio transmitter 210a, the control load on the phase controller 171 is reduced since the information acquisition unit 176 acquires the target phase difference. Furthermore, the information acquisition unit 176 holds the corresponding table 176a holding information of the relationship between the interference reception qualities of the received signal and the target phase differences, and acquires the target phase difference from the corresponding table 176a based on the measured interference reception quality. As a result, the information acquisition unit 176 may quickly acquire an appropriate target phase difference.

[Ninth Embodiment]

Figure 17:
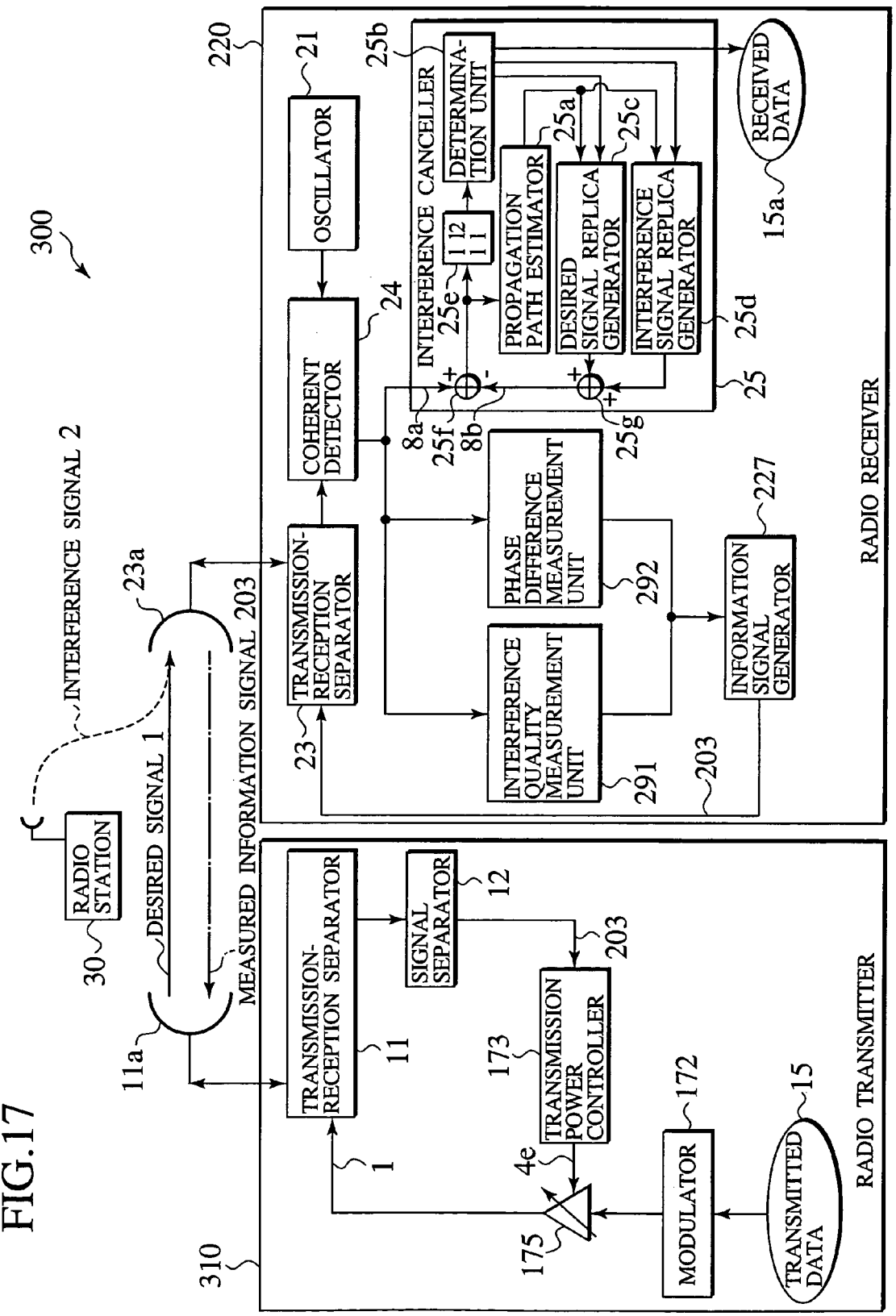
FIG. 17 is a block diagram showing a radio communication system of a ninth embodiment.

As shown in FIG. 17, a radio communication system 300 comprises a radio transmitter 310 and the radio receiver 220. The radio transmitter 310 comprises the antenna 11a, the transmission-reception separator 11, the signal separator 12, a transmission power controller 173, the modulator 172, and a variable amplifier 175. The same reference numerals are given for the substantially same configuration as those in the radio communication system 200 shown in FIG. 14, and a part of the description is omitted.

The antenna 11a receives a measured information signal 203. The signal separator 12 separates the measured information signal 203 from within the received signals input from the transmission-reception separator 11, and inputs it to the transmission power controller 173. The transmission power controller 173 controls the transmission power of a desired signal 1 to be transmitted by the radio transmitter 310. The transmission power controller 173 controls the transmission power of the desired signal 1 based on the measured phase difference included in the measured information signal 203 and the measured interference reception quality.

The transmission power controller 173 controls the transmission power of the transmitted desired signal based on the relationship among the phase difference between the desired signal 1 and the interference signal 2, the interference reception quality of the received signal and the minimum inter-signal point distance of the received signal, and the measured phase difference and the measured interference reception quality. The transmission power controller 173 controls the transmission power of the desired signal 1 based on the measured phase difference so as to become the necessary interference reception quality for obtaining the target minimum inter-signal point distance with that phase difference. The target minimum inter-signal point distance may be set to the feasible maximum value with that phase difference, or it may be set to a feasible large value with that phase difference.

Based on the measured phase difference, the transmission power controller 173 calculates the necessary interference reception quality for making the minimum inter-signal point distance of the received signal equal to the target minimum inter-signal point distance (hereinafter, referred to as 'target interference reception quality'). For example, the transmission power controller 173 may calculate the target interference reception quality using the above-given Equation (2), or may vary the transmission power of the desired signal 1 based on the measured phase difference, so as to obtain the relationship between the minimum inter-signal point distance and the transmission power and then calculate an interference reception quality that allows the minimum inter-signal point distance to be the target minimum inter-signal point distance, as the target interference reception quality. The target interference reception quality may be the minimum interference reception quality for obtaining the target minimum inter-signal point distance, or it may be an interference reception quality for an inter-signal point distance more than the target minimum inter-signal point distance, so long as it is an interference reception quality allowing the minimum inter-signal point distance of the received signal to equal to the target minimum inter-signal point distance.

The transmission power controller 173 decides the necessary transmission power for the desired signal 1 to make the interference reception quality of the received signal at the radio receiver 220 equal to the target interference reception quality, based on the measured interference reception quality and the calculated target interference reception quality. The transmission power controller 173 controls the transmission power of the transmitted desired signal 1 by inputting to the variable amplifier 175 a power control signal 4e, which is used to control the transmission power of the desired signal 1. The transmission power controller 173 generates the power control signal 4e including an instruction for transmitting the desired signal 1 with the determined transmission power, and inputs it to the variable amplifier 175. The transmission power controller 173 then makes the variable amplifier 175 to transmit the desired signal 1 with the determined transmission power. The transmission power controller 173 preferably controls the transmission power of the desired signal 1 so that the minimum inter-signal point distance becomes a maximum value using the feasible maximum value with the phase difference thereof as the target minimum inter-signal point distance. In this manner, the transmission power controller 173 functions as a controller that controls at least one of the phase and transmission power of a desired signal 1 to be transmitted based on the measured phase difference and the measured interference reception quality.

The modulator 172 modulates the transmitted data 15 into the desired signal 1, and inputs it to the variable amplifier 175. The variable amplifier 175 controls the transmission power of the desired signal 1 acquired from the modulator 172, based on the power control signal 4e acquired from the transmission power controller 173. The variable amplifier 175 amplifies the transmission power of the desired signal 1 acquired from the modulator 172 until reaching the transmission power included in the power control signal 4e. The variable amplifier 175 then inputs the transmission power-controlled desired signal 1 to the transmission-reception separator 11 and transmits it to the radio receiver 220 via the antenna 11a.

According to the radio communication system 300, radio transmitter 310 and radio receiver 220, the radio transmitter 310 can control the transmission power of a transmitted desired signal based on the measured phase difference and the measured interference reception quality of the received signal at the radio receiver 220. Specifically, the transmission power controller 173 controls the transmission power of the desired signal 1 to be transmitted based on the relationship among the phase difference between the desired signal 1 and the interference signal 2, the interference reception quality of the received signal and the minimum inter-signal point distance of the received signal, and the measured phase difference and the measured interference reception quality. Therefore, the radio communication system 300 can distribute the signal points of the received signals when plotting those signal points. Accordingly, the interference canceller 25 at the radio receiver 220 can reduce erroneous determination due to the signal points of the received signals being close to each other and output an appropriate desired signal 1, so that the interference signal 2 can be effectively removed. As a result, the radio communication system 300 may enhance the effectiveness of the interference canceller 25 and improve the frequency utilization efficiency.

Particularly, the transmission power controller 173 can distribute the signal points of the received signals over a wide signal area by controlling the transmission power of the desired signal 1 to maximize the minimum inter-signal point distance. Accordingly, the radio transmitter 310 can output an appropriate desired signal 1 by more reliably avoiding erroneous determination, and can enhance the effectiveness of the interference canceller 25.

[Tenth Embodiment]

Figure 18:
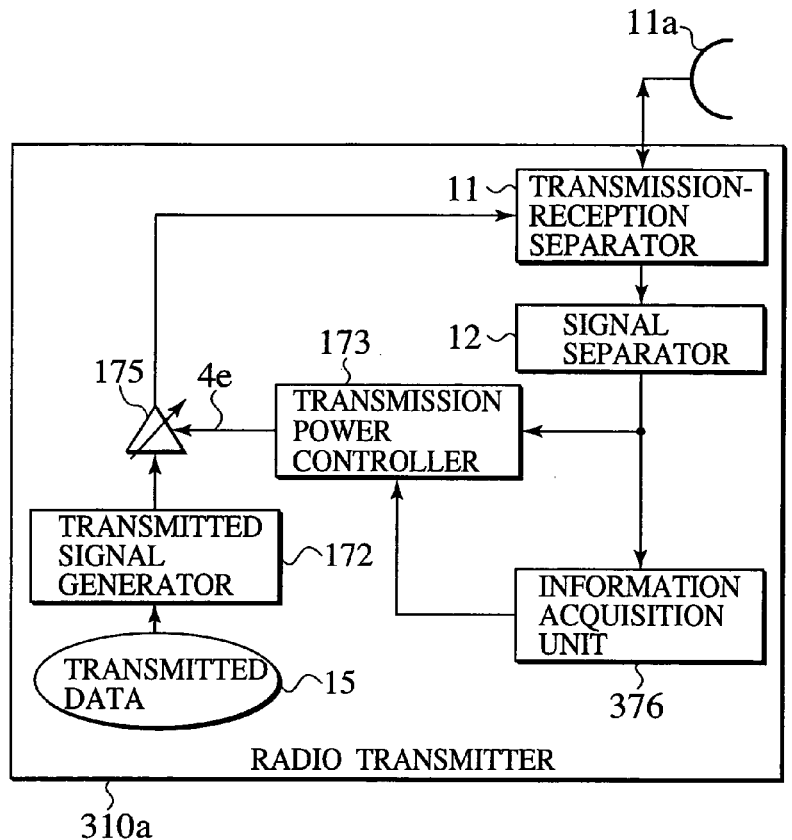
FIG. 18 is a block diagram showing a radio transmitter of a tenth embodiment.
Figure 19:
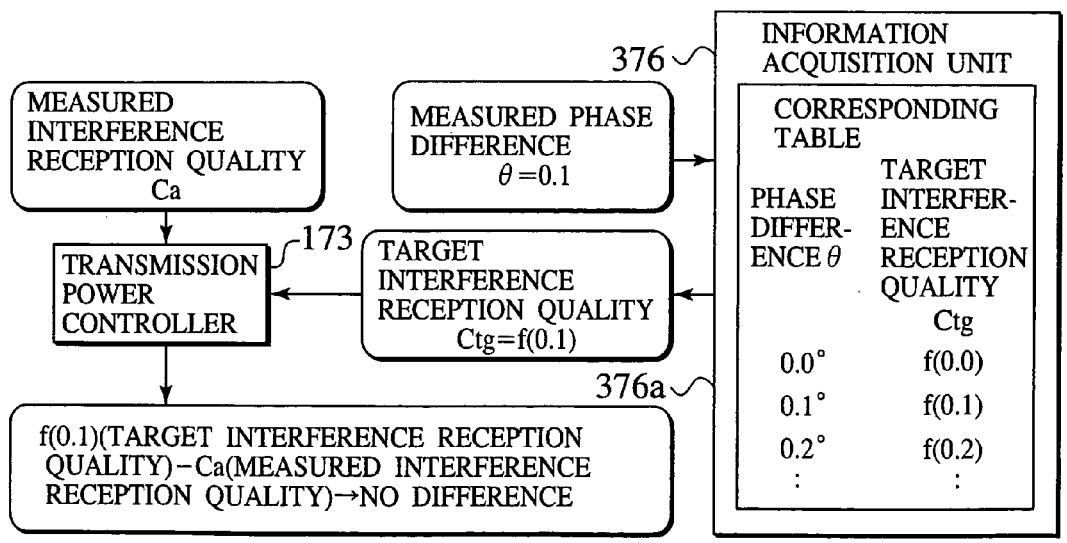
FIG. 19 is a diagram illustrating a decision method for transmission power of the tenth embodiment.

In the radio communication system 300 shown in FIG. 17, a radio transmitter 310a shown in FIG. 18 may be used in place of the radio transmitter 310. The radio transmitter 310a comprises the antenna 11a, the transmission-reception separator 11, the signal separator 12, the transmission power controller 173, the modulator 172, the variable amplifier 175, and an information acquisition unit 376. The same reference numerals are given for the substantially same configuration as those in the radio transmitter 310 shown in FIG. 17, and a part of the description is omitted. In addition, FIG. 19 illustrates a decision method for transmission power.

The signal separator 12 inputs a measured information signal 203 to the transmission power controller 173 and the information acquisition unit 376. The information acquisition unit 376 acquires a target interference reception quality based on the measured phase differences. The information acquisition unit 376, as shown in FIG. 19, comprises a corresponding table 376a holding information of the relationship between the phase differences of the received signal and the target interference reception qualities. In this manner, the information acquisition unit 376 memorizes that relationship in advance. The corresponding table 376a holds the target interference reception quality 'Ctg' for every phase difference at fixed intervals. In this embodiment, CIR is used as the interference reception quality. The corresponding table 376a may be created by obtaining the relationship between the phase differences obtained using the above-given Equation (2) and the target interference reception quality, or may be created by varying the transmission power of the desired signal 1 with various phase difference values, obtaining the relationship between the minimum inter-signal point distance and the transmission power, and calculating the transmission power as the target transmission power where the minimum inter-signal point distance is the target minimum inter-signal point distance.

The information acquisition unit 376, for example, acquires the measured phase difference '$\theta$=0.1°' based on the measured information signal 203. The information acquisition unit 376 acquires a target interference reception quality 'Ctg=f(0.1)' corresponding to the interference phase difference closest to the measured phase difference '$\theta$=0.1°' from the corresponding table 376a, by referencing the phase difference given in the corresponding table 376a and the acquired measured phase difference 'f($\theta$)' is a function indicating the interference reception quality with a phase difference '$\theta$'. The information acquisition unit 376 inputs the acquired target interference reception quality 'Ctg=f(0.1)' in the transmission power controller 173.

The transmission power controller 173 acquires the measured information signal 203 from the signal separator 12. The transmission power controller 173 acquires the target interference reception quality 'Ctg=f(0.1)' from the information acquisition unit 376. The transmission power controller 173 acquires the measured interference reception quality Ca from the measured information signal 203. The transmission power controller 173 decides the necessary transmission power of the desired signal 1 for making the interference reception quality at the radio receiver 220 equal to the target interference reception quality, based on the measured interference reception quality acquired from the measured information signal 203 and the target interference reception quality acquired from the information acquisition unit 376. The transmission power controller 173 decides a transmission power such that there is no difference between the target interference reception quality 'Ctg=f(0.1)' and the measured interference reception quality 'Ca'. The transmission power controller 173 acquires the target interference reception quality from the information acquisition unit 376 in this manner without calculating it by itself.

According to the radio transmitter 310a, the control load of the transmission power controller 173 is reduced since the information acquisition unit 376 acquires the target transmission power. Furthermore, the information acquisition unit 376 comprises the corresponding table 376a holding information of the relationship between phase difference and target interference reception quality, and acquires the target interference reception quality from the corresponding table 376a based on the measured the phase difference. As a result, the information acquisition unit 376 may quickly acquire an appropriate target interference reception quality.

[Eleventh Embodiment]

Figure 20:
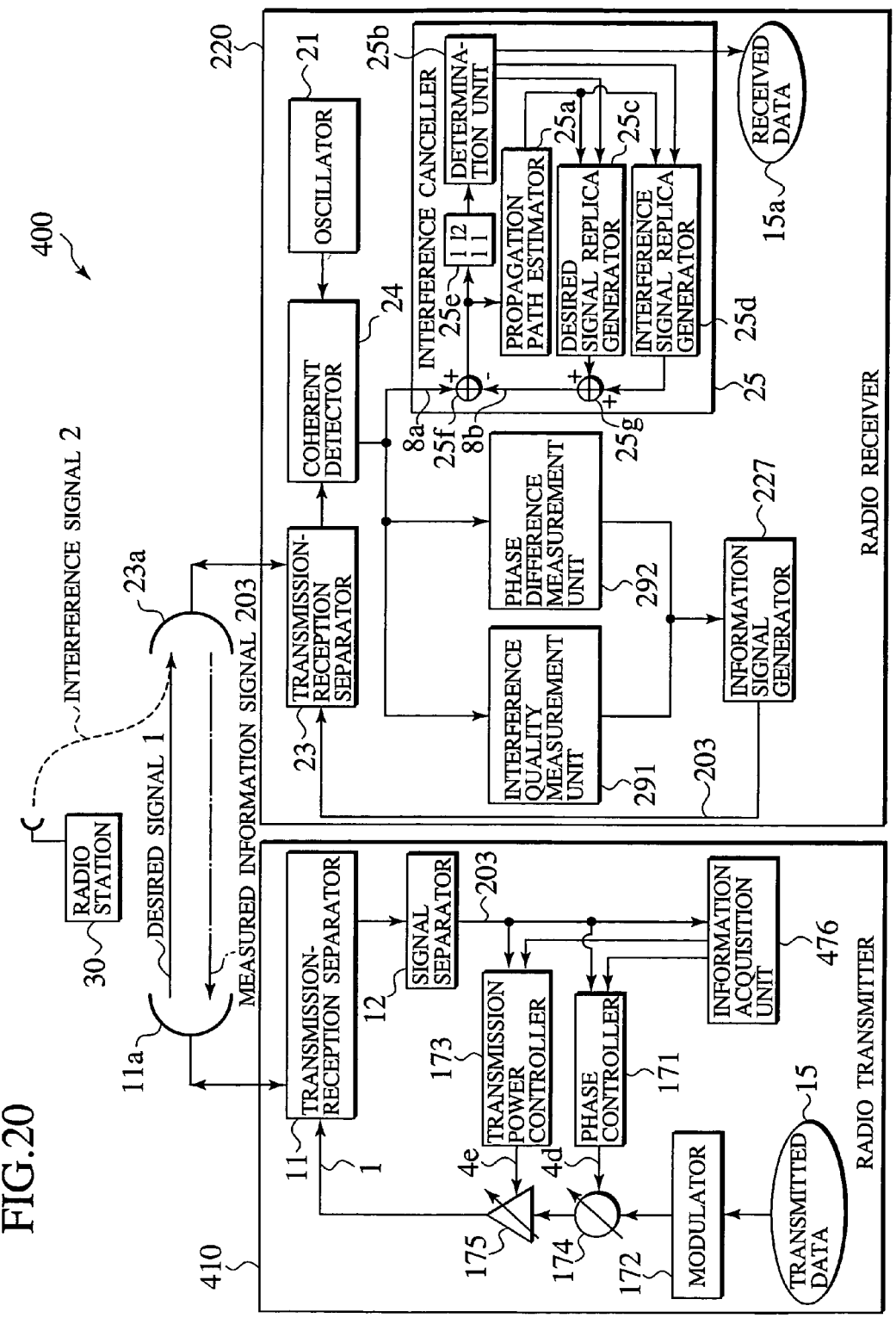
FIG. 20 is a block diagram showing a radio communication system of an eleventh embodiment.

As shown in FIG. 20, a radio communication system 400 comprises a radio transmitter 410 and the radio receiver 220. The radio transmitter 410 comprises the antenna 11a, the transmission-reception separator 11, the signal separator 12, the phase controller 171, the transmission power controller 173, the modulator 172, the variable-phase shifter 174, the variable amplifier 175, and an information acquisition unit 476. The same reference numerals are given for the substantially same configuration as those in the radio communication system 200 shown in FIG. 14, and a part of the description is omitted. In addition, FIG. 21 illustrates a decision method for a target phase difference and a target interference reception quality.

The signal separator 12 inputs a measured information signal 203 to the phase controller 171, the transmission power controller 173, and the information acquisition unit 476. The information acquisition unit 476 acquires a target phase difference and a target interference reception quality.

For example, to begin with, the information acquisition unit 476 calculates and acquires the target phase difference based on the measured interference reception quality included in the measured information signal 203. The information acquisition unit 476 may calculate the target phase difference using the above-given Equation (2), or may rotate the phase of the desired signal 1 based on the measured interference reception quality, so as to obtain the relationship between the minimum inter-signal point distance and the phase difference and then calculate as the target phase difference a phase difference that allows the minimum inter-signal point distance to be the target minimum inter-signal point distance. Next, the information acquisition unit 476 calculates and acquires the target interference reception quality based on the calculated phase difference. The information acquisition unit 476 may calculate the target interference reception quality using the above-given Equation (2), or may vary the transmission power of the desired signal 1 based on the target phase difference, so as to obtain the relationship between the minimum inter-signal point distance and the transmission power and then calculate an interference reception quality that allows the minimum inter-signal point distance to be the target minimum inter-signal point distance, as the target interference reception quality.

Alternatively, the information acquisition unit 476, to begin with, calculates and acquires the target interference reception quality based on the measured phase difference included in the measured information signal 203. The information acquisition unit 476 may calculate the target interference reception quality using the above-given Equation (2), or may vary the transmission power for the desired signal 1 based on the measured phase difference, so as to obtain the relationship between minimum inter-signal point distance and transmission power and then calculate an interference reception quality that allows the minimum inter-signal point distance to be the target minimum inter-signal point distance, as the target interference reception quality. Next, the information acquisition unit 476 calculates and acquires the target phase difference based on the calculated target interference reception quality. The information acquisition unit 476 may calculate the target phase difference using the above-given Equation (2), or may rotate the phase of the desired signal 1 based on the target interference reception quality, so as to obtain the relationship between the minimum inter-signal point distance and the phase difference and then calculate a phase difference that allows the minimum inter-signal point distance to be the target minimum inter-signal point distance as the target phase difference.

Figure 21A:
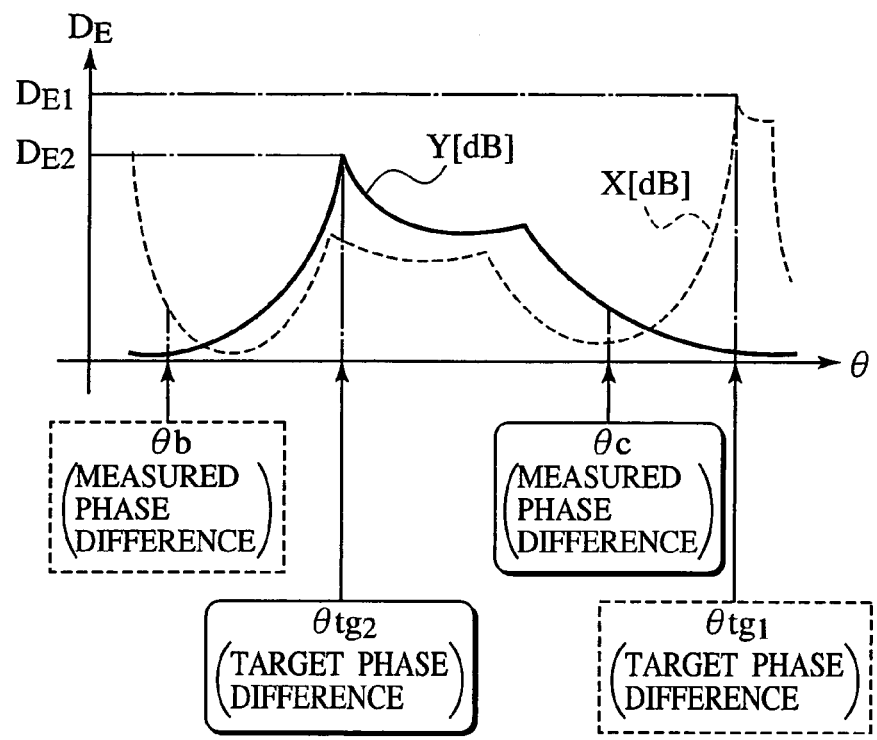
FIGS. 21A and 21B are diagrams illustrating a decision method for target phase difference and target interference reception quality of the eleventh embodiment.

Furthermore, as shown in FIG. 21A, the information acquisition unit 476 may calculate a relationship between minimum inter-signal point distance and phase difference by rotating the phase of the desired signal 1 with various interference reception quality values, and hold the information of a relationship between minimum inter-signal point distance and phase difference. Then the information acquisition unit 476 may obtain the target phase difference and the target interference reception quality using this relationship.

In this case, the information acquisition unit 476 decides the target interference reception quality based on the measured phase difference, and a phase difference that allows the minimum inter-signal point distance to be the maximum value with the target interference reception quality as the target phase difference. In FIG. 21A, CIR is used as the interference reception quality. In FIG. 21A, the vertical axis represents minimum inter-signal point distance '$D_E$', and the horizontal axis represents phase difference 'θ'. The information acquisition unit 476 holds information of a relationship between phase difference and minimum inter-signal point distance at CIR=X(dB) represented by the dotted line, and a relationship between phase difference and minimum inter-signal point distance at CIR=Y(dB) represented by the solid line.

When the measured phase difference is 'θb', for example, the information acquisition unit 476 decides the interference reception quality 'CIR=X(dB)' that allows the minimum inter-signal point distance to be a maximum value at phase difference 'θb' as the target interference reception quality. Next, the information acquisition unit 476 decides a phase difference '$θtg_1$' that allows the minimum inter-signal point distance to be a maximum value as target phase difference, and also decides the minimum inter-signal point distance at that target phase difference as target minimum inter-signal point distance $D_{E1}$. Furthermore, when the measured phase difference is 'θc', for example, the information acquisition unit 476 decides the interference reception quality 'CIR=Y(dB)' that allows the minimum inter-signal point distance to be a maximum value at phase difference 'θc' as the target interference reception quality. Next, the information acquisition unit 476 decides a phase difference '$θtg_2$' that allows the minimum inter-signal point distance to be a maximum value as target phase difference, and also decides the minimum inter-signal point distance at that target phase difference as target minimum inter-signal point distance $D_{E2}$.

The information acquisition unit 476 may calculate and hold information of a relationship between minimum inter-signal point distance and transmission power, by varying the transmission power of the desired signal 1 with various phase difference values, and then calculate the target phase difference and the target interference reception quality using this relationship. In this case, The information acquisition unit 476 decides the target phase difference based on the measured interference reception quality, and the interference reception quality that allows the minimum inter-signal point distance to be a maximum value at the target phase difference as the target interference reception quality.

Figure 21B:
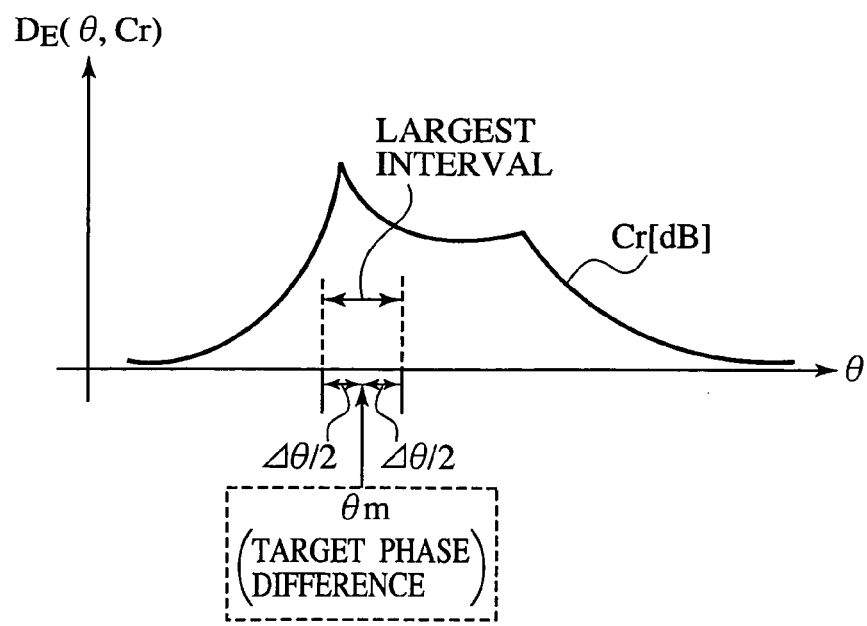

In addition, the information acquisition unit 476 may determine the interval with a maximum average value of the minimum inter-signal point distance (hereinafter, referred to as 'largest interval') from the phase difference intervals each having a predetermined width, and then acquire the intermediate value of the phase difference in that largest interval as a target phase difference. In this case as well, the information acquisition unit 476 calculates and holds a relationship between minimum inter-signal point distance and phase difference by rotating the phase difference of the desired signal 1 with various target interference reception quality values. The case where the information acquisition unit 476 decides the interference reception quality to be 'CIR=Cr(dB)' that allows the minimum inter-signal point distance to be a maximum value at the measured phase difference is described. The relationship between phase difference and minimum inter-signal point distance at CIR=Cr(dB) is illustrated in FIG. 21B. In FIG. 21B, the vertical axis represents minimum inter-signal point distance '$D_E(\theta,Cr)$', and the horizontal axis represents phase difference '$\theta$'.

To begin with, the information acquisition unit 476 decides interference reception quality '$CIR=CR(dB)$', which is decided as one that allows the minimum inter-signal point distance to be a maximum value at a measured phase difference, as the target interference reception quality. Next, the information acquisition unit 476 partitions the relationship between phase difference and minimum inter-signal point distance at $CIR=Cr(dB)$ into phase difference intervals each having a predetermined width, and then retrieves from those intervals the largest interval, which allows the average value of minimum inter-signal point distance $D_E$ to be a maximum value. Next, the information acquisition unit 476 calculates an intermediate value '$\theta_m$' of the phase differences in the largest interval. The predetermined width of each phase difference interval may be set arbitrarily; however, it is preferably set based on the control intervals for controlling the phase or transmission power.

Note that the intermediate value '$\theta_m$' of the phase differences in the largest interval, which allows the average value of minimum inter-signal point distances $D_E$, to be a maximum value, may be calculated using Equation (3) given below.

$$E[D_E(\theta_0, Cr)]\Delta\theta = \left\{\int_{\theta_0-\Delta\theta/2}^{\theta_0+\Delta\theta/2} D_E(\theta, Cr)d\theta\right\}\bigg/\Delta\theta \quad \text{(Equation 3)}$$

where '$\theta_0$' denotes a parameter and is equivalent to the intermediate value '$\theta_m$' of the phase differences in the largest interval. The information acquisition unit 476 decides the calculated parameter '$\theta_0$' as the target phase difference. The information acquisition unit 476 inputs the acquired target phase difference to the phase controller 171, and the target interference reception quality to the transmission power controller 173.

Note that the information acquisition unit 476 may calculate the transmission power of the transmitted desired signal to maximize the minimum inter-signal point distance in a phase difference interval having a predetermined width as a transmission power for obtaining the target interference reception quality.

The phase controller 171 acquires the measured information signal 203 from the signal separator 12. The phase controller 171 acquires the target phase difference from the information acquisition unit 476. The phase controller 171 acquires the measured phase difference from the measured information signal 203. The phase controller 171 decides a necessary amount of phase shift of the desired signal 1 for making the phase difference between the desired signal 1 and the interference signal 2 at the radio receiver 220 equal to the target phase difference based on the measured phase difference acquired from the measured information signal 203 and the target phase difference acquired from the information acquisition unit 476. The phase controller 171 generates the phase control signal 4*d* including an instruction for rotating the phase of the desired signal 1 by just the decided phase shift amount, and inputs it to the variable-phase shifter 174.

The variable-phase shifter 174 controls the phase of the desired signal 1 acquired from the modulator 172, based on the phase control signal 4*d* acquired from the phase controller 171. The variable-phase shifter 174 rotates the phase of the desired signal 1 acquired from the modulator 172 by just the phase shift amount included in the phase control signal 4*d*. The variable-phase shifter 174 then inputs to the variable amplifier 175 the phase-controlled desired signal 1.

The transmission power controller 173 acquires the measured information signal 203 from the signal separator 12. The transmission power controller 173 acquires the target interference reception quality from the information acquisition unit 476. The transmission power controller 173 acquires the measured interference reception quality from the measured information signal 203. The transmission power controller 173 decides a necessary transmission power of the desired signal 1 for making the interference reception quality at the radio receiver 220 equal to the target interference reception quality based on the measured interference reception quality acquired from the measured information signal 203 and the target interference reception quality acquired from the information acquisition unit 476. The transmission power controller 173 generates a power control signal 4 including an instruction for transmitting the desired signal 1 with the decided transmission power, and inputs it to the variable amplifier 175.

Note that the transmission power controller 173 may acquire the transmission power of the transmitted desired signal to maximize the minimum inter-signal point distance in the phase difference interval having the predetermined width as a transmission power for obtaining the target interference reception quality, and generate the power control signal 4.

The variable amplifier 175 controls the transmission power of the desired signal 1 acquired from the variable-phase shifter 172, based on the power control signal 4*e* acquired from the transmission power controller 174. The variable amplifier 175 amplifies the transmission power of the desired signal 1 acquired from the variable-phase shifter 174 just until reaching the transmission power included in the power control signal 4*e*. The variable amplifier 175 then inputs the transmission power-controlled desired signal 1 to the transmission-reception separator 11 and transmits it to the radio receiver 220 via the antenna 11*a*.

According to the radio communication system 400, radio transmitter 410 and radio receiver 220, the radio transmitter 410 can control both the phase difference and the transmission power of a transmitted desired signal based on the measured phase difference and the measured interference reception quality of the received signal at the radio receiver 220. For example, when the target phase difference is decided based on the measured interference reception quality, or when the target interference reception quality is decided based on the measured phase difference, the interference reception quality and the phase difference, which are bases of decision of the target interference reception quality or the target phase difference, may also be controlled. Therefore, the radio communication system 400 can improve the effect of distributing the signal points of received signals. Accordingly, the interference canceller 25 of the radio receiver 220 may reduce erroneous determination due to the signal points of the received signals being close to each other.

Particularly, the phase controller 171 controls the phase of a desired signal 1 using an intermediate value of the phase differences in a phase difference interval that allows the average of the minimum inter-signal point distances to be a maximum value as a target phase difference, so that the phase of the desired signal 1 can equal to the intermediate value. As a result, maintaining a large inter-signal point distance and reducing erroneous determination can be achieved, even in an environment where the phase difference between the desired signal 1 and the interference signal 2 widely varies due to changes in propagation conditions such as a propagating path. In addition, the transmission power controller 173 may control the transmission power of the transmitted desired signal 1 to maximize the minimum inter-signal point distance in the phase difference interval having the predetermined width. As a result, the same effect can be obtained.

[Twelfth Embodiment]

Figure 22:
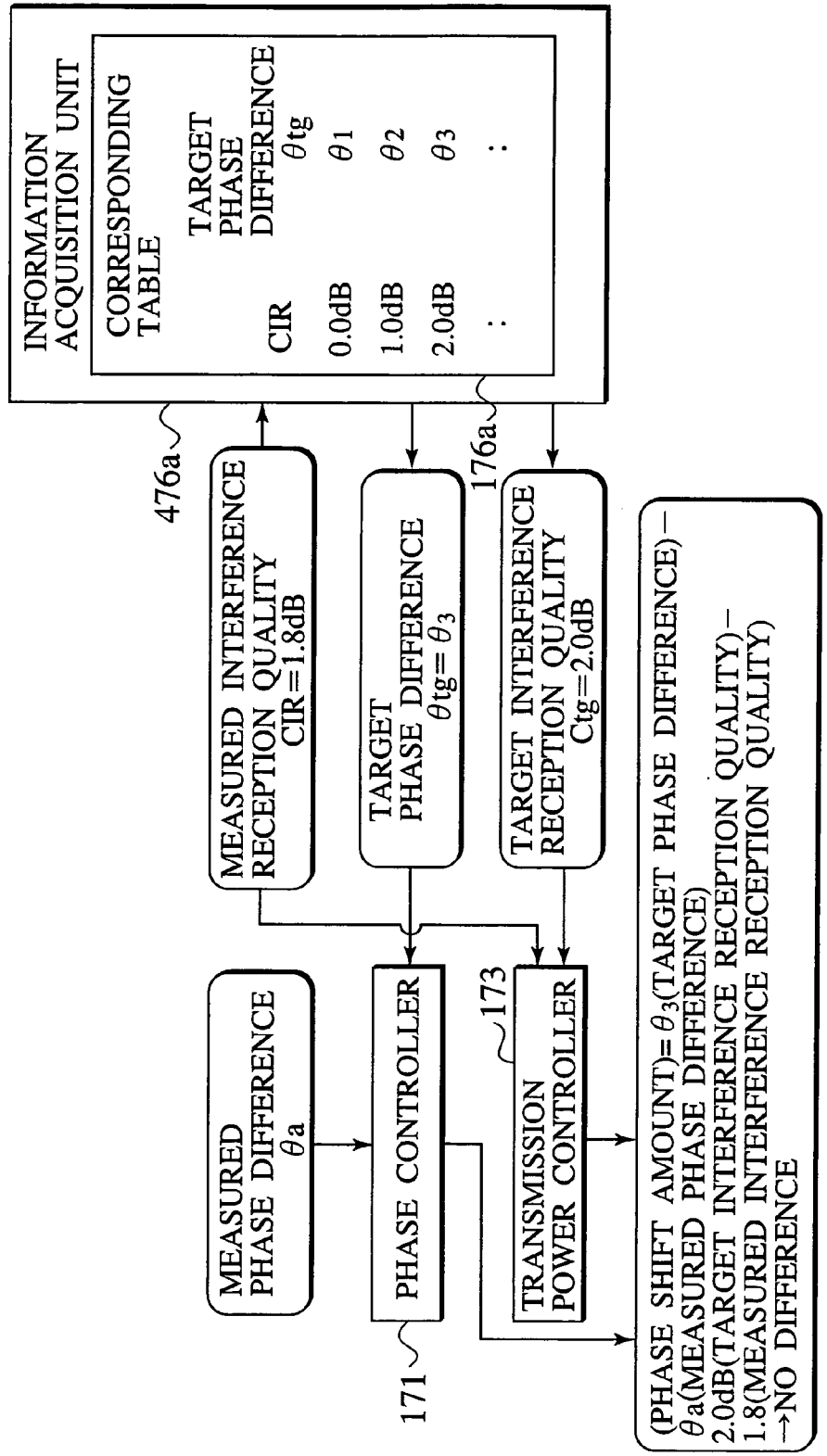
FIG. 22 is a diagram showing an information acquisition unit of a twelfth embodiment.

The radio transmitter 410 shown in FIG. 20 may comprise an information acquisition unit 476a shown in FIG. 22 in place of the information acquisition unit 476. The information acquisition unit 476, as shown in FIG. 22, comprises a corresponding table 176a holding information of the relationship between interference reception quality and target phase difference of the received signal. The corresponding table 176a holds the target phase difference 'θtg' for every interference reception quality at fixed intervals. In this embodiment, CIR is used as the interference reception quality.

To begin with, the information acquisition unit 476 calculates a target phase difference from the measured interference reception quality. The information acquisition unit 476a acquires a measured interference reception quality 'CIR=1.8(dB)' from the measured information signal 203. The information acquisition unit 476 acquires a target phase difference 'θtg=θ$_3$' corresponding to the interference reception quality 'CIR=2.0(dB)' closest to the measured interference reception quality 'CIR=1.8(dB)' from the corresponding table 176a by referencing the interference reception quality (CIR) given in the corresponding table 176a and the acquired measured interference reception quality. The information acquisition unit 476a inputs the acquired target phase difference 'θtg=θ$_3$' to the phase controller 171.

Next, the information acquisition unit 476 acquires from the corresponding table 176a the interference reception quality 'CIR=2.0(dB)', which is closest to the measured interference reception quality 'CIR=1.8(dB)' and corresponds to the acquired target phase difference 'θtg=θ$_3$'. The information acquisition unit 476 inputs the acquired target interference reception quality 'Ctg=2.0(dB)' to the transmission power controller 173.

The phase controller 171 acquires the measured information signal 203 from the signal separator 12. The phase controller 171 acquires the target phase difference 'θtg=θ$_2$' from the information acquisition unit 476. The phase controller 171 acquires the measured phase difference 'θa' from the measured information signal 203. The phase controller 171 decides a necessary amount of phase shift of the desired signal 1 for making the phase difference between the desired signal 1 and the interference signal 2 at the radio receiver 220 equal to the target phase difference, based on the measured phase difference calculated from the measured information signal 203 and the target phase difference acquired from the information acquisition unit 476a. The phase controller 171 determines the amount of phase shift by subtracting the measured phase difference θa from the target phase difference θtg=θ$_3$.

The transmission power controller 173 acquires the measured information signal 203 from the signal separator 12. The transmission power controller 173 acquires the target interference reception quality 'Ctg=2.0(dB)' from the information acquisition unit 476a. The transmission power controller 173 acquires a measured interference reception quality 'CIR=1.8 (dB)' from the measured information signal 203. The transmission power controller 173 decides a necessary transmission power of the desired signal 1 for making the interference reception quality at the radio receiver 220 equal to the target interference reception quality based on the measured interference reception quality acquired from the measured information signal 203 and the target interference reception quality acquired from the information acquisition unit 476a. The transmission power controller 173 decides a transmission power enough to improve the interference reception quality by just the difference '0.2(dB)' in interference reception quality, which results from subtracting the measured interference reception quality '1.8(dB)' from the target interference reception quality 'Ctg=2.0(dB)'.

Note that the information acquisition unit 476a may comprise a corresponding table 376a shown in FIG. 19 holding information of the relationship between interference reception quality and target phase difference of the received signal. In this case, the information acquisition unit 476a first acquires the target interference reception quality and then acquires a phase difference that is closest to the measured phase difference and corresponds to the acquired target interference reception quality from the corresponding table 376a as the target phase difference.

According to the radio transmitter 410 comprises such information acquisition unit 476a, even without holding in detail the relationship between the interference reception quality and the target phase difference, or the relationship between the phase difference and the target interference reception quality, the phase difference and the interference reception quality may be easily and appropriately controlled by controlling the interference reception quality and the phase difference that are bases of the decision of the target interference reception quality and the target phase difference.

[Thirteenth Embodiment]

Figure 23:
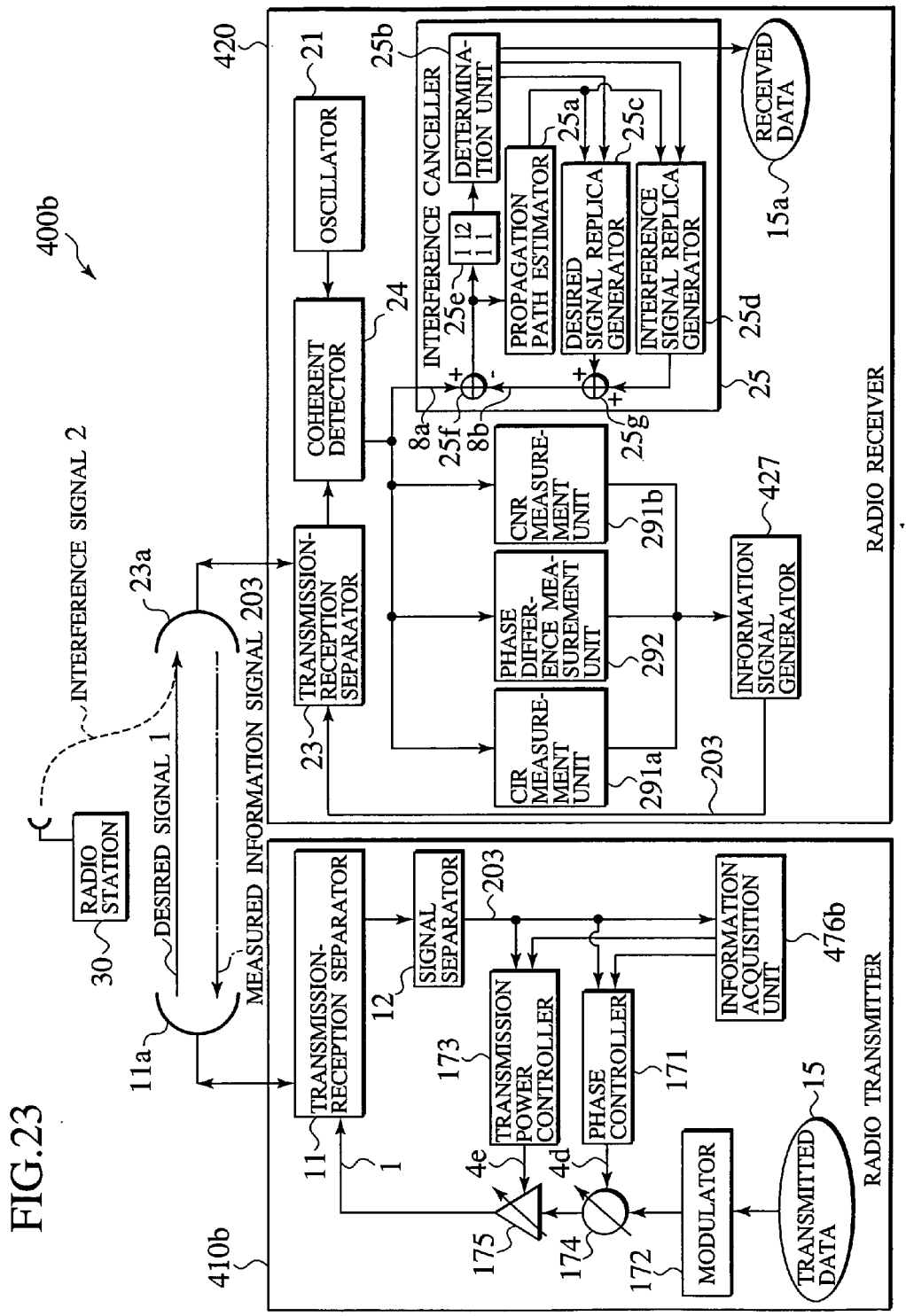
FIG. 23 is a block diagram showing a radio communication system of a thirteenth embodiment.

As shown in FIG. 23, a radio communication system 400b comprises a radio transmitter 410b and a radio receiver 420. The radio receiver 420 comprises the oscillator 21, the antenna 23a, the transmission-reception separator 23, the coherent detector 24, the interference canceller 25, an information signal generator 427, a CIR measurement unit 291a, a CNR measurement unit 291b, and the phase difference measurement unit 292. The same reference numerals are given for the substantially same configuration as those in the radio receiver 220 shown in FIG. 14, and a part of the description is omitted.

The coherent detector 24 synchronously detects a received signal from the transmission-reception separator 23 based on the reference frequency input from the oscillator 21. The coherent detector 24 inputs the detected received signal to the interference canceller 25, the CIR measurement unit 291a, the CNR measurement unit 291b, and the phase difference measurement unit 292.

The CIR measurement unit 291a measures the CIR of the received signal from the coherent detector 24. The CIR measurement unit 291a functions as the interference quality measurement unit. The CIR measurement unit 291a inputs the measured CIR value to the information signal generator 427. The CNR measurement unit 291b measures the CNR of the received signal from the coherent detector 24. The CNR measurement unit 291b is a noise quality measurement unit that measures the noise reception quality, which indicates the influence of the noise on the received signal. The CNR measurement unit 291b inputs the measured CIR to the information signal generator 427. Note that as the noise quality measurement unit, other unit for measuring noise reception quality other than the CNR measurement unit 291*b* measuring the CNR, may be used. SNR or the like, for example, may be used as a noise reception quality.

The information signal generator 427 generates a measured information signal 203 by modulating the information including the measured phase difference acquired from the phase difference measurement unit 292, the measured CIR acquired from the CIR measurement unit 291*a*, and the measured CNR acquired from the CNR measurement unit 291*b*, into signals. The information signal generator 427 inputs the generated measured information signal 203 to the transmission-reception separator 23. In this manner, the information signal generator 427 transmits the measured information signal 203 to the radio transmitter 410*b* via the transmission-reception separator 23 and the antenna 23*a*.

The radio transmitter 410 comprises the antenna 11*a*, the transmission-reception separator 11, the signal separator 12, the phase controller 171, the transmission power controller 173, the modulator 172, the variable-phase shifter 174, the variable amplifier 175, and an information acquisition unit 476*b*. The same reference numerals are given for the substantially same configuration as those in the radio transmitter 410 shown in FIG. 20, and a part of the description is omitted.

Figure 24:
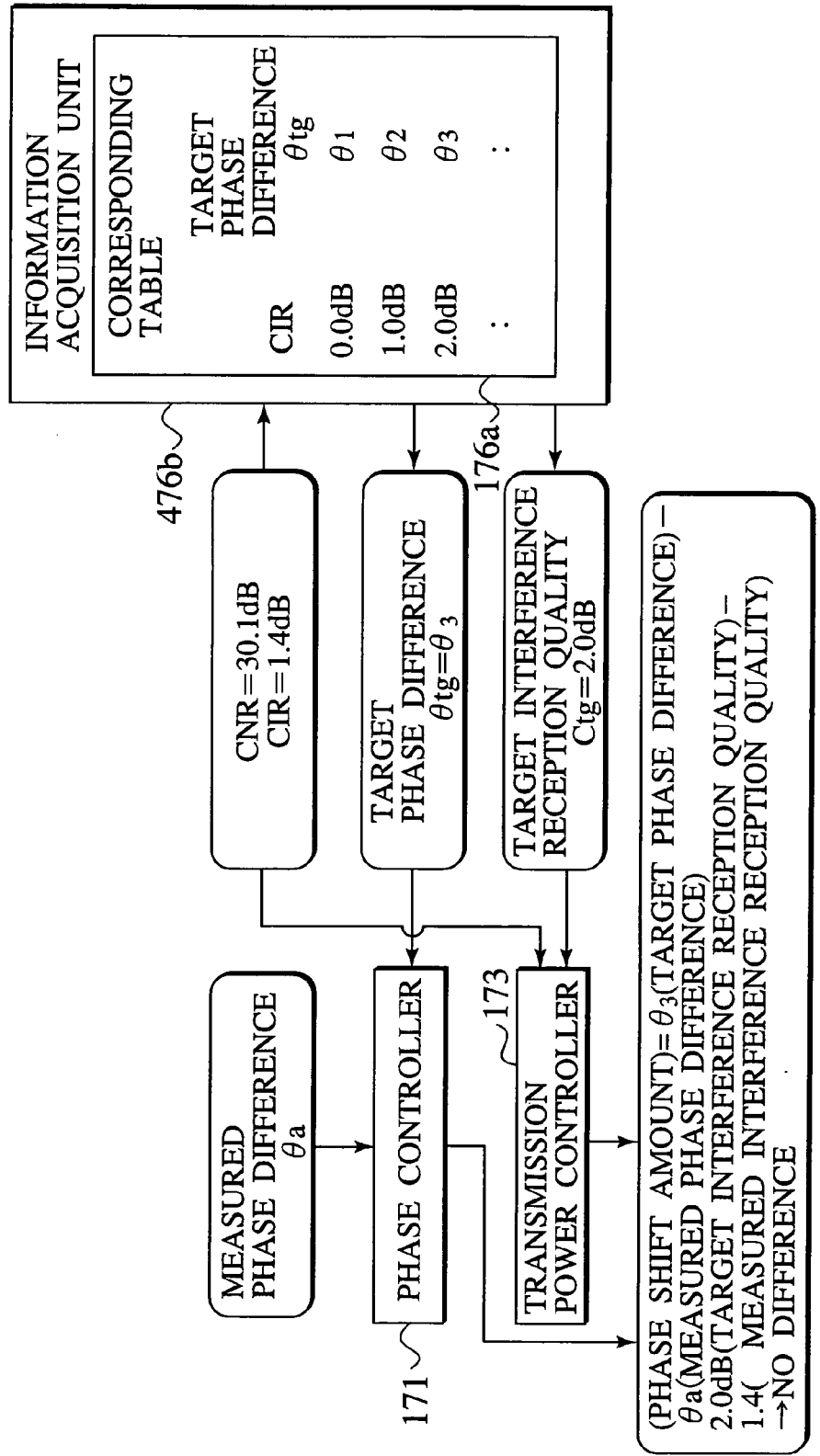
FIG. 24 is a diagram illustrating a decision method for target phase difference and target interference reception quality of the thirteenth embodiment.

The information acquisition unit 476*b*, as shown in FIG. 24, comprises a corresponding table 176*a* holding information of the relationship between the interference reception quality of the received signal and the target phase difference. The corresponding table 176*a* holds the target phase difference 'θtg' for every interference reception quality at fixed intervals. In this embodiment, the corresponding table 176*a* holding the relationship between CIR and target phase difference is used. Furthermore, the information acquisition unit 476*b* holds a required value for noise reception quality. This required value is set to a certain value required for avoiding extreme decline in noise reception quality and increase in erroneous determination for the received signal. In this embodiment, the required CNR, which represents a noise reception quality, is set to 30.0(dB).

The information acquisition unit 476*b* acquires measured CIR 'CIR=1.4(dB)' and measured CNR 'CNR=30.1(dB)' from the measured information signal 203. The information acquisition unit 476*b* acquires a target interference quality and a target phase difference based on the measured CIR and measured CNR. The information acquisition unit 476*a* acquires an interference reception quality (CIR) closest to the measured interference reception quality (CIR) allowing the noise reception quality (CNR) at the radio receiver 420 to satisfy the required value for noise reception quality (CNR) when controlling the transmission power as the target interference reception quality.

For example, in the corresponding table 176*a*, the closest CIR to the measured CIR '1.4(dB)' is '1.0(dB)', and the next closest CIR is '2.0(dB)'. The information acquisition unit 476*b* determines whether the required CNR can be satisfied based on the measured CNR in the case where the transmission power is controlled such that the CIR becomes '1.0(dB)', namely whether the CNR becomes more than or equal to '30.0(dB)'. The information acquisition unit 476*b* determines whether 'CNR=30.0(dB)' can be satisfied in the case where the transmission power is controlled such that the measured CIR becomes close to '2.0(dB)' after it has been determined that the required CNR has not been satisfied with 'CIR=1.0(dB)'.

Given CIR being '2.0(dB)' when the information acquisition unit 476*b* determines that the required CNR is satisfied, 'CIR=2.0(dB)' is determined as be the closest CIR to the measured CIR satisfying the required CNR when controlling the transmission power, and thus the information acquisition unit 476*b* acquires it as a target interference reception quality Ctg from the corresponding table 176*a*. Furthermore, the information acquisition unit 476*b* acquires the target interference phase difference 'θtg=θ$_3$' corresponding to the target interference reception quality decided as 'CIR=2.0(dB)'. The information acquisition unit 476*b* inputs the acquired target interference reception quality 'Ctg=2.0(dB)' to the transmission power controller 173, and the acquired target phase difference 'θtg=θ$_3$' to the phase controller 171.

The phase controller 171 decides the phase shift amount by subtracting the measured phase difference 'θa' from the target phase difference 'θtg=θ$_3$'. The transmission power controller 173 decides a transmission power enough to improve the interference reception quality by just the difference '0.6(dB)' in interference reception quality, which results from subtracting the measured interference reception quality '1.4(dB)' from the target interference reception quality 'Ctg=2.0(dB)'.

According to the radio communication system 400, radio transmitter 410*b* and radio receiver 420, the radio transmitter 410 can control the phase and transmission power of the desired signal 1 to be transmitted based on the measured phase difference, measured interference reception quality, and measured noise reception quality of the received signal at the radio receiver 420. Therefore, the radio communication system 400 can avoid the noise reception quality from extremely declining by controlling the transmission power used for distributing signal points of the received signals. Accordingly, a signal constellation with even less erroneous determination for the received signal may be implemented.

[Fourteenth Embodiment]

Figure 25:
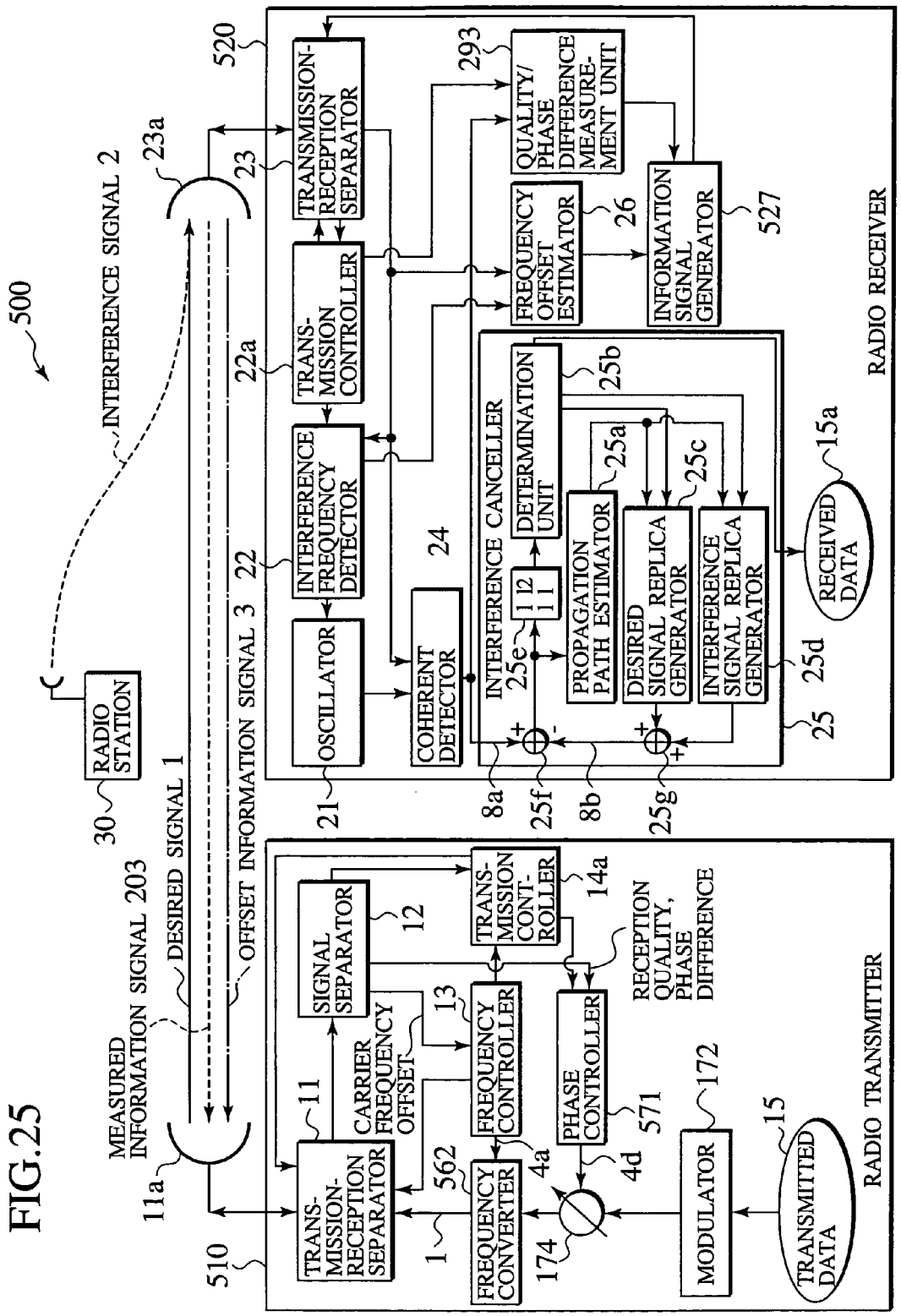
FIG. 25 is a block diagram showing a radio communication system of a fourteenth embodiment.

As shown in FIG. 25, a radio communication system 500 comprises a radio transmitter 510 and a radio receiver 520. The radio receiver 520 comprises the oscillator 21, the interference frequency detector 22, the transmission controller 22*a*, the antenna 23*a*, the transmission-reception separator 23, the coherent detector 24, the interference canceller 25, the frequency offset estimator 26, an information signal generator 527 and a quality/phase difference measurement unit 293. The same reference numerals are given in FIG. 25 for the substantially same configuration as those in the radio receiver 20 shown in FIG. 3, and a part of the description is omitted.

With the radio communication system 500, compensation for carrier frequency offset is first performed, and then the phase of the desired signal 1 is controlled. The transmission controller 22*a* receives a termination notice of carrier frequency offset compensation from the radio transmitter 10 via the antenna 23*a* and the transmission-reception separator 23. The transmission controller 22*a* detects the power of the interference signal 2 until receiving a termination notice, and then instructs the interference frequency detector 22 to detect the carrier frequency of the interference signal 2. Upon reception of a termination notice, the transmission controller 22*a* halts inputting the detection instruction to the interference frequency detector 22. The transmission controller 22*a* also instructs the radio transmitter 510 to start transmission of the desired signal 1. Furthermore, the transmission controller 22*a* instructs the quality/phase difference measurement unit 293 to start measurement.

The interference frequency detector 22 does not input the carrier frequency of the interference signal 2 to the frequency offset estimator 26 while there is no detection instruction from the transmission controller 22a. The frequency offset estimator 26 estimates the carrier frequency offset only while the carrier frequency of the interference signal 2 is acquired from the interference frequency detector 22.

The coherent detector 24 synchronously detects a received signal from the transmission-reception separator 23 based on the reference frequency input from the oscillator 21. The coherent detector 24 inputs the detected received signal to the quality/phase difference measurement unit 293 and the frequency offset estimator 26.

The quality/phase difference measurement unit 293 measures the interference reception quality of the received signal and the phase difference between the desired signal 1 and the interference signal 2 in the same manner as the interference quality measurement unit 291 and the phase difference measurement unit 292 shown in FIG. 14. The quality/phase difference measurement unit 293 acquires a measurement start instruction from the transmission controller 22a, and starts measurement of interference reception quality and phase difference. The quality/phase difference measurement unit 293 inputs the measured interference reception quality and the measured phase difference to the information signal generator 527.

The information signal generator 527 generates an offset information signal 3 when the carrier frequency offset is acquired from the frequency offset estimator 26. The information signal generator 527 generates a measured information signal 203 when the measured interference reception quality and the measured phase difference are acquired from the quality/phase difference measurement unit 293.

The radio transmitter 510 comprises the antenna 11a, the transmission-reception separator 11, the signal separator 12, the frequency controller 13, the transmission controller 14, a phase controller 571, the modulator 172, the variable-phase shifter 174, and a frequency converter 562. The same reference numerals are given in FIG. 25 for the substantially same configuration as those in the radio transmitters 10 and 210 shown in FIG. 3 and 14, respectively, and a part of the description is omitted.

The frequency controller 13 inputs to the frequency converter 562 a carrier frequency control signal 4a based on the carrier frequency offset and notifies the transmitted signal generator 14a of termination after the carrier frequency offset compensation operation finishes. Upon reception of a termination notice from the frequency controller 13, the transmission controller 14a inputs the carrier frequency offset compensation termination notice to the transmission-reception separator 11, in other words, the transmission controller 14a transmits the termination notice to the radio receiver 520 via the transmission-reception separator 11 and the antenna 11a.

The frequency converter 562 acquires a modulated desired signal 1 from the modulator 172 via the variable-phase shifter 174. The frequency converter 562 converts the carrier frequency of the desired signal 1 based on the carrier frequency control signal 4a and adjusts it to carrier frequency of the interference signal 2. The frequency converter 562 then inputs the desired signal 1 to the transmission-reception separator 11, in other words, the frequency converter 562 transmits the desired signal 1 to the radio receiver 520 via the antenna 11a and the transmission separator 11.

The signal separator 12 separates the received signal into the offset information signal 3 and the measured information signal 203. The signal separator 12 inputs the separated offset information signal 3 to the frequency controller 13, and the measured information signal 203 to the phase controller 571.

After carrier frequency offset compensation, the transmission controller 14a receives an instruction to start transmission of the desired signal 1 from the radio receiver 520 via the antenna 11a and the transmission-reception separator 11. Upon reception of a transmission start instruction, the transmission controller 14a instructs the phase controller 571 to start phase control.

The phase controller 571 acquires the phase control start instruction from the transmission controller 14a and starts control. The phase controller 571 controls the phase of the transmitted desired signal 1 so that the distance between the signal points of received signal replica 8b at the radio receiver 520 increases. The phase controller 571 controls the phase for every combination of a plurality of desired signal symbol sequence candidates and interference signal symbol sequence candidates so that the distance between signal points of the received signal replica 8b increases.

The phase controller 571 controls the phase of the desired signal 1 based on the measured phase difference and the measured interference reception quality. In the same manner as the phase controller 171 shown in FIG. 14, the phase controller 571 controls the phase of the transmitted desired signal 1 based on the relationship among the phase difference between the desired signal 1 and the interference signal 2, the interference reception quality of the received signal and the minimum inter-signal point distance of the same received signal, and the measured phase difference and the measured interference reception quality, so that the distance between the signal points of the received signal replica 8b increases.

In other words, the phase controller 571 calculates a target phase difference, which is necessary phase difference for making the minimum inter-point signal distance of the received signal replica 8b with that interference reception quality to equal to the target minimum inter-signal point distance, based on the measured interference reception quality. The phase controller 571 then decides the necessary phase shift amount of the desired signal 1 for making the phase difference between the desired signal 1 and the interference signal 2 at the radio receiver 520 to equal to the target phase difference, based on the measured phase difference and the calculated target phase differences. The phase controller 571 controls the phase of the transmitted desired signal 1 by inputting to the variable-phase shifter 174 a phase control signal 4d, which is used to control the phase of the desired signal 1. The phase controller 571 generates the phase control signal 4d including an instruction for rotating the phase of the desired signal 1 by just the decided phase shift amount, and inputs it to the variable-phase shifter 174. The variable-phase shifter 174 inputs the phase-shifted desired signal 1 to the transmission-reception separator 11 via the frequency converter 562.

According to the radio communication system 500, radio transmitter 510 and radio receiver 520, the radio transmitter 510 can control the phase of a transmitted desired signal 1 so that the distance between signal points of the received signal replica 8b increases. Therefore, the radio communication system 500 can distribute the signal points of the received signals 8a when plotting those signal points. Accordingly, the interference canceller 25 at the radio receiver 520 can output an appropriate desired signal 1 with reduction in erroneous determination due to the signal points of the received signal 8a being close to each other, and can effectively remove the interference signal 2.

However, with the radio communication system 500, the radio receiver 520 may estimate the carrier frequency offset and then notify the radio transmitter 510 thereof. The radio transmitter 510 may then adjust the carrier frequency of the transmitted desired signal 1 to carrier frequency of the interference signal 2 based on the notified carrier frequency offset estimated by the radio receiver 520. Accordingly, the carrier frequency offset may be independently compensated on each radio link connected between the radio receiver 520 and the radio transmitter 510. Therefore, an interference canceller 25 of the radio receiver 520 may remove the interference signal 2 by following the propagation path estimation. As an effect, the radio communication system 500 may distribute the signal points of the received signal 8a after variation in the propagation path has been controlled by compensating the carrier frequency offset. Thereby, the radio communication system 500 may enhance the effectiveness of the interference canceller 25 and improve the frequency utilization efficiency.

[Fifteenth Embodiment]

Figure 26:
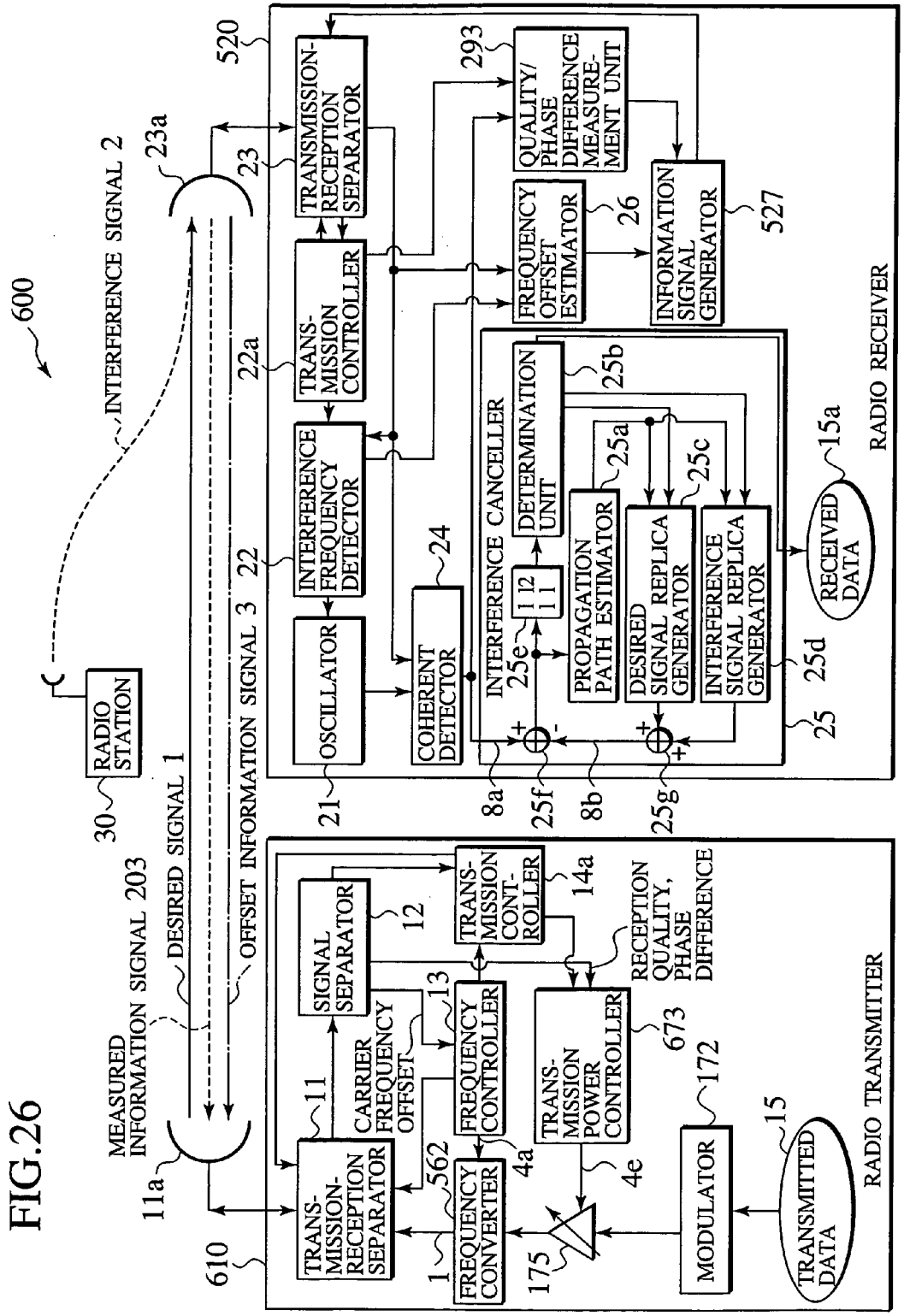
FIG. 26 is a block diagram showing a radio communication system of a fifteenth embodiment.

As shown in FIG. 26, a radio communication system 600 comprises a radio transmitter 610 and the radio receiver 520. The same reference numerals are given in FIG. 26 for the substantially same configuration as those in the radio communication systems 500 and 300 shown in FIGS. 25 and 17, and a part of the description is omitted. The radio transmitter 610 comprises the antenna 11a, the transmission-reception separator 11, the signal separator 12, the frequency controller 13, a transmission power controller 673, the modulator 172, the variable amplifier 175, and the frequency converter 562.

With the radio communication system 600, compensation for carrier frequency offset is first performed, and then the transmission power of the desired signal 1 is controlled. The signal separator 12 inputs the separated measured information signal 203 to the transmission power controller 673. Upon reception of a transmission start instruction from radio receiver 520 after the carrier frequency offset has been compensated, the transmission controller 14a instructs the transmission power controller 673 to start controlling transmission power.

The transmission power controller 673 acquires the transmission power control start instruction from the transmission controller 14a and starts control. The transmission power controller 673 controls the transmission power of the desired signal 1 to be transmitted so that the distance between the signal points of a received signal replica 8b at the radio receiver 520 increases. The transmission power controller 673 controls the transmission power for every combination of a plurality of desired signal symbol sequence candidates and interference signal symbol sequence candidates so that the distance between signal points of the received signal replica 8b sufficiently increases.

The transmission power controller 673 controls the transmission power of the desired signal 1 based on the measured phase difference and the measured interference reception quality. In the same manner as the transmission power controller 173 shown in FIG. 17, the transmission power controller 673 controls the transmission power of the transmitted desired signal 1 based on the relationship among the phase difference between the desired signal 1 and the interference signal 2, the interference reception quality and the minimum inter-signal point distance of the received signals, and the measured phase difference and the measured interference reception quality, so that the distance between the signal points of the received signal replica 8b increases.

In other words, the transmission power controller 673 calculates a target interference reception quality, which is necessary interference reception quality for making the minimum inter-point signal distance of the received signal replica 8b at that measured phase difference to equal to the target minimum inter-signal point distance, based on the measured phase difference. The transmission power controller 673 then decides a necessary transmission power of the desired signal 1 for making the interference reception quality at the radio receiver 520 equal to the target interference reception quality based on the measured interference reception quality and the calculated target interference reception quality. The transmission power controller 673 controls the transmission power of the desired signal 1 to be transmitted by inputting to the variable amplifier 175 a power control signal 4e used to control the transmission power of the desired signal 1. The transmission power controller 673 generates a power control signal 4e including an instruction for transmitting the desired signal 1 with the decided transmission power, and inputs it to the variable amplifier 175. The variable amplifier 175 inputs the amplified desired signal 1 to the transmission-reception separator 11 via the frequency converter 562.

According to the radio communication system 600, radio transmitter 610 and radio receiver 520, the radio transmitter 610 can control the transmission power of the transmitted desired signal 1 so that the distance between signal points of the received signal replica 8b increases. Therefore, the radio communication system 600 can distribute the signal points of the received signals 8a when plotting those signal points. Accordingly, the interference canceller 25 at the radio receiver 520 can reduce erroneous determination due to the signal points of the received signals 8a being close to each other and output an appropriate desired signal 1, and effectively remove the interference signal 2.

However, with the radio communication system 600, the radio receiver 520 may estimate the carrier frequency offset and then notify the radio transmitter 610 thereof. The radio transmitter 610 may then adjust the carrier frequency of the transmitted desired signal 1 to carrier frequency of the interference signal 2 based on the notified carrier frequency offset estimated by the radio receiver 520. Accordingly, the carrier frequency offset may be independently compensated on each radio link connected between the radio receiver 520 and the radio transmitter 610. Therefore, the interference canceller 25 of the radio receiver 520 may remove the interference signal 2 by following the propagation path estimation. As an effect, the radio communication system 600 may distribute the signal points of the received signals 8a after variation in the propagation path has been controlled by compensating the carrier frequency offset. The radio communication system 600 can enhance the effectiveness of the interference canceller 25 and improve the frequency utilization efficiency.

[Sixteenth Embodiment]

Figure 27:
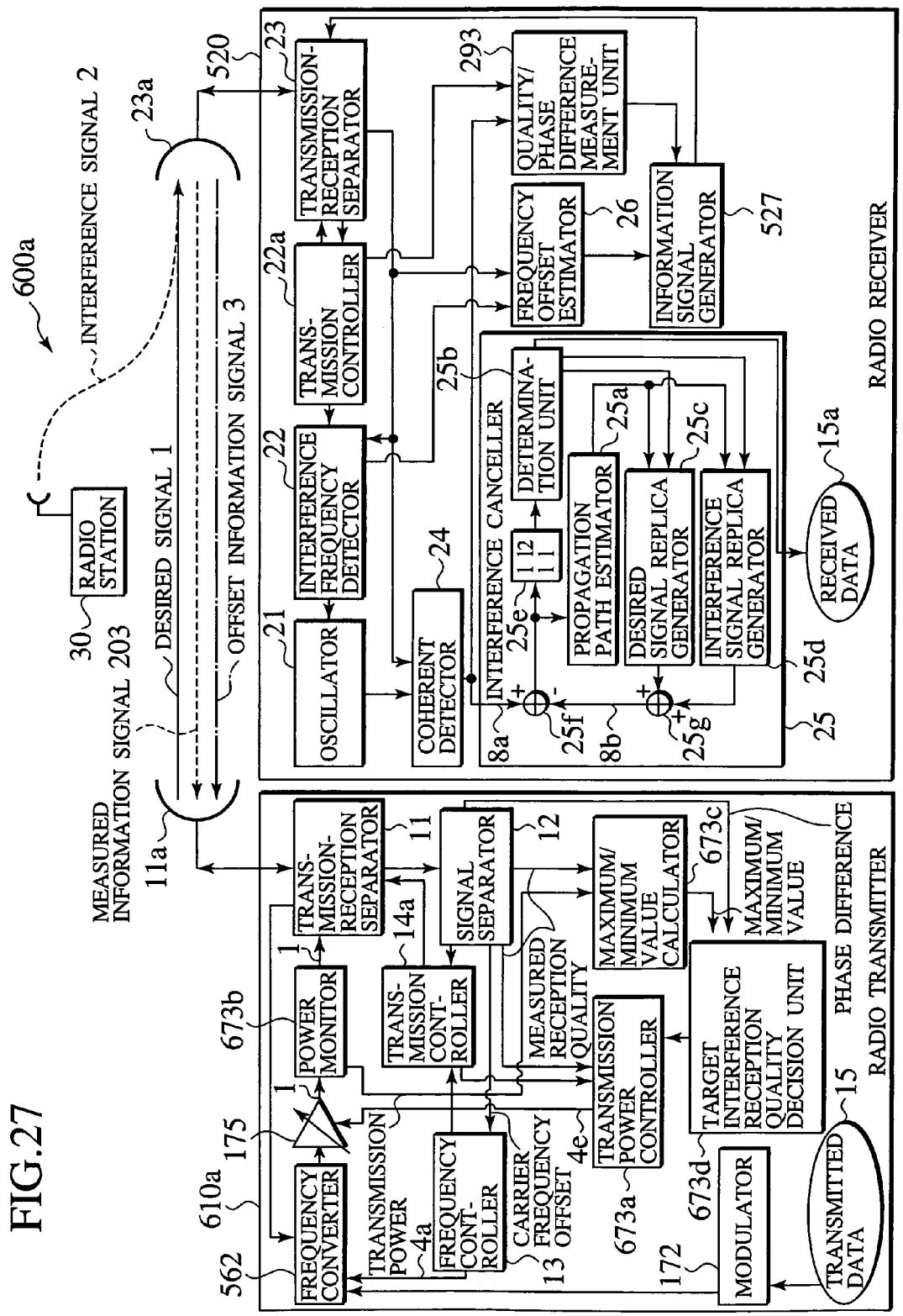
FIG. 27 is a block diagram showing a radio communication system of a sixteenth embodiment.

As shown in FIG. 27, a radio communication system 600a comprises a radio transmitter 610a and the radio receiver 520. The same reference numerals are given in FIG. 27 for the substantially same configuration as those in the radio communication systems 600 in FIG. 26, and a part of the description is omitted. The radio transmitter 610 comprises the antenna 11a, the transmission-reception separator 11, the signal separator 12, the frequency controller 13, the transmission controller 14a, a transmission power controller 673a, a power monitor 673b, a maximum/minimum value calculator 673c, a target interference reception quality decision unit 673d, the modulator 172, the variable amplifier 175, and the frequency converter 562.

With the radio communication system 600a, compensation for carrier frequency offset is first performed, and then the transmission power of the desired signal 1 is controlled. The signal separator 12 separates the measured information signal 203 into the measured interference reception quality and the measured phase difference. The signal separator 12 inputs the separated measured interference reception quality to the transmission power controller 673a and the maximum/minimum value calculator 673c, and the measured phase difference to the target interference reception quality decision unit 673d.

The power monitor 673b monitors the transmission power of the desired signal 1. The power monitor 673b acquires the transmission power of the desired signal 1 by acquiring the desired signal 1 from the variable amplifier 175. The power monitor 673b inputs the transmission power of the acquired desired signal 1 to the maximum/minimum value calculator 673c.

The maximum/minimum value calculator 673c calculates the interference reception quality of the time when the maximum transmission power is utilized (hereinafter referred to as 'maximum interference reception quality value'), and the interference reception quality of the time when the minimum transmission power is utilized (hereinafter referred to as 'minimum interference reception quality value') from the relationship between the an actual transmission power of the desired signal 1 and the measured interference reception quality, and the upper and the lower limit of the variable power range for the variable amplifier 175. The maximum/minimum value calculator 673c acquires the actual transmission power of the desired signal 1 and the measured interference reception quality from the signal separator 12. In addition, the maximum/minimum value calculator 673c memorizes the upper and the lower limit of the variable power range for the variable amplifier 175 in advance. For example, the maximum/minimum value calculator 673c calculates the CIR of the time when the maximum transmission power is used (hereinafter referred to as 'Cmax') as the maximum interference reception quality value and the CNR of the time when the minimum transmission power is used (hereinafter referred to as 'Cmin') as the minimum value of interference reception quality. The maximum/minimum value calculator 673c inputs the calculated maximum and minimum interference reception quality values to the target interference reception quality decision unit 673d.

The target interference reception quality decision unit 673d decides the target interference reception quality based on the measured phase difference within the range of the calculated maximum and minimum interference reception quality values. The target interference reception quality decision unit 673d decides the target interference reception quality from the measured phase difference acquired from the signal separator 12 and the maximum and minimum interference reception quality values acquired from the maximum/minimum value calculator 673c. For example, the target interference reception quality decision unit 673d decides the target CIR 'Ctg' as the target interference reception quality by calculating the following Equation (4) using 'Cmax', 'Cmin', and a measured phase difference 'θr'. In Equation (4), 'C' denotes CIR, and '$D_E$' denotes the minimum inter-signal point distance calculated from the phase difference and CIR.

$$D_E(\theta r, Ctg) = \max D_E(\theta r, C), \quad C\min \leq C \leq C\max \quad \text{(Equation 4)}$$

In this manner, the target interference reception quality decision unit 673d decides the target interference reception quality, which is necessary for making the minimum inter-point signal distance of the received signal replica 8b at the measured phase difference to equal to the target minimum inter-signal point distance. The target interference reception quality decision unit 673d inputs the decided target interference reception quality to the transmission power controller 673a. Note that the target interference reception quality decision unit 673d may calculate and hold the minimum inter-signal point distance at each of a plurality of interference reception quality and phase differences so as to decide the target interference reception quality based on the relationship between the a plurality of interference reception quality and the measured minimum inter-signal point distance in advance. The target interference reception quality decision unit 673d may calculate and hold, for example, the minimum inter-signal point distances at a predetermined interval phase difference and predetermined interval interference reception qualities.

The transmission power controller 673a acquires from the transmission controller 14a an instruction for starting transmission power control, and then starts control. The transmission power controller 673a decides a necessary transmission power of the desired signal 1 for making the interference reception quality at the radio receiver 520 to equal to the target interference reception quality based on the measured interference reception quality acquired from the signal separator 12 and the target interference reception quality acquired from the target interference reception quality decision unit 673d. For example, the transmission power controller 673a decides a necessary transmission power of the desired signal 1 for making the CIR of the received signal at the radio receiver 520 to equal to the 'Ctg' by calculating the difference between the measured CIR and the target interference reception quality 'Ctg'. The transmission power controller 673a generates a power control signal 4e including an instruction for transmitting the desired signal 1 with the determined transmission power, and inputs it to the variable amplifier 175.

The frequency converter 562 inputs the converted desired signal 1 to the transmission-reception separator 11 via the variable converter 175 and the power monitor 673b. The variable amplifier 175 acquires a modulated desired signal 1 from the modulator 172 via the frequency converter 562. The variable amplifier 175 amplifies the transmission power of the desired signal 1 based on the power control signal 4e. The variable amplifier 175 inputs the amplified desired signal 1 to the power monitor 673b. The variable amplifier 175 transmits to the radio receiver 520 via the power monitor 673b, the transmission-reception separator 11, and the antenna 11a.

According to the radio communication system 600a and radio transmitter 610a, the transmission power is controlled within the range of the maximum and the minimum value of interference reception quality calculated with the upper and the lower limit of the variable power range for the variable amplifier 175. Therefore, the radio transmitter 610a can restrict the transmission power below the upper limit for the variable amplifier 175, preventing from interfering with other radio links. The radio transmitter 610a can also restrict the transmission power to the lower limit for the variable amplifier 175, avoiding an increase in the ratio of noise to the received signal. Accordingly, accuracy in interference removal by the interference canceller 25 can be maintained.

In addition, the radio transmitter 610a can control the transmission power based on the measured phase difference by deciding the necessary target interference reception quality for obtaining the target minimum inter-signal point distance each time. Therefore, the radio communication system 600*a* can more optimally distribute the signal points of received signals. For example, when the maximum value of the minimum inter-signal point distance is set as the target minimum inter-signal point distance, the transmission power may be controlled by calculating an interference reception quality that allows the minimum inter-signal point distance at that time to be the maximum value, and an optimum distributing effect of signal points may be achieved.

MODIFIED EXAMPLE

The present invention is not limited to the above embodiments, and various modifications thereof are possible. In order to simplify the description of the above-given embodiments, the radio transmitter is described having a transmission system configuration and the radio receiver having a reception system configuration, however, the radio transmitter may include as the reception system configuration, an oscillator, a coherent detector, and a demodulator demodulating a synchronously detected received signal. Furthermore, the radio receiver may include as the transmission system configuration, a modulator, a frequency converter, an oscillator used for the frequency converter, and a signal mixer. The signal mixer acquires an information signal such as the offset information signal 3 or the measured information signal 203 from the information signal generators 27, 27*c*, 227, 427, or 527, respectively. Furthermore, the signal mixer acquires a desired signal including transmission data modulated by the modulator. The signal mixer then combines the received information signal and the desired signal and inputs it to a transmission-reception separator. Furthermore, the radio receiver may include an amplifier. The amplifier acquires a signal from the transmission-reception separator and amplifies the power thereof. The amplifier inputs the amplified signal to the coherent detector.

Furthermore, if the radio receiver 20*e* shown in FIG. 7 erroneously determines which kind of symbol has been transmitted as the desired signal 1 or the interference signal 2, there is concern that the rotation speed measurement unit 28 may not be able to accurately measure the rotation speed. As a result, there is concern that the frequency offset estimator 26*c* may also not be able to accurately estimate the carrier frequency offset. Therefore, the radio receiver 20*e* preferably includes the CNR measurement unit 29 and the threshold decision unit 29*e* as with the radio receivers 20*d* and 20*e* shown in FIGS. 10 and 12.

Moreover, in FIGS. 10 and 12, the radio receivers 20*d* and 20 determine whether to control the carrier frequency, however, the radio receiver may also determine whether to control the carrier frequency by transmitting the measured interference reception quality and the estimated carrier frequency offset based on the measured interference reception quality that the radio transmitter has received and the estimated carrier frequency offset. Each of the radio transmitters 510 and 610 shown in FIGS. 25 and 26, respectively, control either the phase or transmission power for the desired signal 1, however, they may control both the phase and the transmission power as with the radio transmitters 410 and 410*b* shown in FIGS. 20 and 23, respectively.

In addition, the information signal generators 27, 27*c* and 527 shown in FIGS. 3, 5, 6, 7, 10, 12, 25, 26, and 27 may generate a carrier frequency control signal 4*a* controlling the carrier frequency of the desired signal 1, as with the frequency controller 13 of the radio transmitter 10. The information signal generator 27 may transmit the generated carrier frequency control signal as an offset information signal including information decided from the carrier frequency offset. Furthermore, the information signal generators 227, 427, and 527 shown in FIGS. 14, 17, 20, and 23 may determine as with the phase controller 171, the transmission power controller 173, and the information acquisition units 176, 376, 476, and 476*a* the target phase difference and the target interference reception quality and transmit to the radio transmitter the signal including the decided target phase difference and target interference reception quality. In this case, the phase controller 171 and the transmission power controller 173 at the radio transmitter perform phase control and transmission power control using the received target phase difference and target interference reception quality. In addition, the combination of radio transmitter and radio receiver is not limited to the above embodiments, and various combinations thereof are possible.

In addition, a radio communication network system communicates by transmitting/receiving a signal between a transmission side radio base station and a reception side radio base station, and comprises an interference canceller configured to generate a replica of a received signal and remove an interference wave at the reception side radio base station, an interference wave frequency detector configured to detect a carrier frequency of an interference signal at the reception side radio base station, a frequency offset estimator configured to estimate a carrier frequency offset between a carrier frequency of the interference signal detected by the interference wave frequency detector and a carrier frequency of a desired signal, and a frequency controller configured to control the carrier frequency of the desired signal according to the carrier frequency offset at the transmission side radio base station. Further more, the interference wave frequency detector detects the carrier frequency of the interference signal, when detecting the interference wave received with power, which is more than or equal to predetermined power at the reception side radio base station. And the frequency offset detector detects the carrier frequency offset after termination of detecting operation, and transmits the detected carrier frequency offset to transmission side radio base station. Then the transmission side radio base station controls to adjust the carrier frequency of the desired signal to the carrier frequency of the interference signal, based on the received carrier frequency offset.

In addition, a radio communication network system communicates by transmitting/receiving a signal between a transmission side radio base station and a reception side radio base station, and comprises an interference canceller configured to generate a replica of a received signal and remove an interference wave at the reception side radio base station, a phase difference measurement unit configured to measure a phase difference between a desired signal and the interference signal removed by the interference canceller at the reception side radio base station, a reception quality measurement unit configured to measure power ratio of the desired signal to the interference signal or noise (hereinafter, referred to as 'reception quality') at the reception side radio base station, and a controller configured to control a phase or a transmission power of the desired signal based on a measurement result by the phase difference measurement unit and reception quality measurement unit at the transmission side radio base station. Furthermore, the transmission side radio base station controls the phase or transmission power of the desired signal by the controller controls based on the measurement result by the phase difference measurement unit and reception quality measurement unit at.

In addition, a radio communication network system communicates by transmitting/receiving a signal between a transmission side radio base station and a reception side radio base station, and comprises a propagation path estimator configured to estimate propagation paths of a desired signal and an interference signal at the reception side radio base station, a replica generator configured to generate a replica of a received signal for a symbol candidate of the desired signal and the interference signal based on the estimated propagation path value at the propagation path estimator, and a maximum likelihood estimator configured to output desired signal components of symbol candidate generating a received signal replica closest to actual received signal by comparing the received signal replica generated at the replica generator with actual received signal. Furthermore, the transmission side radio base station controls the phase or transmission power of the desired signal for making a distance between signal points of combined signal replica to enough great distance, for different combination of the desired signal symbol and the interference signal symbol. And the replica generator generates the replica of received signal, and the maximum likelihood estimator out puts the desired signal symbol in the combination of the desired signal symbol and the interference signal symbol given the received signal replica closest to actual received signal at the reception side radio base station.

In addition, a base station comprises an interference canceller configured to generate a replica of a received signal and remove an interference signal, an interference wave frequency detector configured to detect a carrier frequency of an interference signal, a frequency offset estimator configured to estimate a carrier frequency offset between a carrier frequency of the interference signal detected by the interference wave frequency detector and a carrier frequency of a desired signal, and an information signal generator configured to generate an information signal for notifying communication destination of the carrier frequency offset detected by the interference wave frequency detector. Furthermore, the interference wave frequency detector detects the carrier frequency of the interference signal, when detecting the interference wave received with power, which is more than or equal to predetermined power. And the frequency offset detector detects the carrier frequency offset after termination of detecting operation.

Furthermore, the base station further comprises a coherent detector configured to synchronously detect the received signal, a reference frequency signal oscillator configured to oscillate a reference frequency of the coherent detector, and a rotation speed measurement unit configured to measure a rotation speed of the desired signal components of a baseband signal output from the coherent detector, wherein the frequency offset detector sets the reference frequency of the reference frequency signal oscillator to a frequency detected by the interference wave frequency detector, synchronously detects the received signal, estimates a frequency offset amount of the desired signal and interference signal by measuring the rotation speed of the desired signal wave components of a baseband signal output from the coherent detector through the rotation speed measurement unit, and transmits the estimated carrier frequency offset amount to the communication destination.

In addition, the base station further comprises a reception quality measurement unit configured to measure power ratio of a signal subjected for a measurement to the interference signal or noise, wherein the information signal generator compares the power ratio measured by the reception quality measurement unit with predetermined threshold, and decides whether to transmit the frequency offset amount or transmission contents based on this comparison result.

Furthermore, the base station further comprises a threshold extraction unit configured to acquire a modulation method of the desired signal, and extract the threshold based on the acquired modulation method, wherein the information signal generator compares the power ratio measured by the reception quality measurement unit with the threshold extracted by the threshold extraction unit.

In addition, a base station has frequency controller configured to control to adjust the carrier frequency of the desired signal to the carrier frequency of the interference signal, based on the received carrier frequency offset between a carrier frequency of the interference signal detected at communication destination and a carrier frequency of a desired signal.

Furthermore, the base station further comprises a baseband modulator configured to modulate a transmitted data signal into a baseband modulation signal, a frequency converter configured to convert a center frequency of output from the baseband modulator, and a phase rotation unit configured to phase rotate an output signal from the baseband modulator, between the baseband modulator and the frequency converter, wherein the phase rotation unit adjusts a carrier frequency of a desired wave to a carrier frequency of an interference wave by rotating a phase of Transmitted signal at an angular speed in accordance with the frequency offset, according to the carrier frequency offset.

Furthermore, the base station further comprises a baseband modulator configured to output a baseband signal, a frequency converter configured to convert a center frequency of output from the baseband modulator, a station unit oscillator configured to output a reference frequency of the frequency converter, and a station unit oscillator frequency controller, wherein the station unit oscillator frequency controller controls a frequency of the station unit oscillator to adjust the carrier frequency of the desired signal to the carrier frequency of the interference signal according to the carrier frequency offset.

In addition, a base station comprises an information acquisition unit configured to represent signal vectors obtained by modulating a desired signal and an interference signal as signal points on a coordinate and acquire a target phase difference based on a calculation result calculated a minimum inter-signal point distance, which is minimum value of a distance on the coordinate between two signal points of a combined signal obtained by combining each signal vector as a relationship of the minimum inter-signal point distance and the phase difference between the desired signal and the interference signal by rotating desired signal components at arbitrary angular for a power ratio of the desired signal to the interference signal, a phase difference between the interference signal and the desired signal, and the power ratio of the desired signal to the interference signal, and a phase controller configured to control the phase of the transmitted signal for making the phase difference between the desired signal and the interference signal at a communication destination to the target phase difference.

The phase controller controls the phase of the desired signal to maximize the minimum inter-signal point distance. Furthermore, the phase controller retrieves a phase difference interval, which average value for the phase difference having predetermined width of the minimum inter-signal point distance become maximum for the predetermined reception quality, and changes the phase of the desired signal such that the phase difference becomes an intermediate value of the retrieved phase difference interval.

In addition, a base station comprises a transmission power controller configured to represent signal vectors obtained by modulating a desired signal and an interference signal as signal points on a coordinate, and control a transmission power of a transmitted signal based on a calculation result calculated a minimum inter-signal point distance, which is minimum value of a distance on the coordinate between two signal points of a combined signal obtained by combining each signal vector as a relationship of the minimum inter-signal point distance and the transmission power by changing the transmission power of the desired signal for predetermined phase difference between the desired signal and the interference signal, the phase difference between the interference signal and the desired signal, the power ratio of the desired signal to the interference signal, and the reception quality.

The transmission power controller controls the transmission power of the desired signal to maximize the minimum inter-signal point distance.

A radio communication method is communicating by transmitting/receiving a signal between a transmission side radio base station and a reception side radio base station, and comprises a step (1) of detecting a carrier frequency of an interference signal at the reception side radio base station, a step (2) of estimating a carrier frequency offset between a carrier frequency of the interference signal detected at the step (1), and a step (3) of controlling the carrier frequency of the desired wave according to the carrier frequency offset to adjust the carrier frequency of the desired wave to the carrier frequency of the interference wave at the transmission side radio base station. Further more, in the step (1) when detecting the interference wave received with power, which is more than or equal to predetermined power at the reception side radio base station, instructing the transmission side radio base station to halt a transmission, and detecting the carrier frequency of the interference signal is performed. And in the step (2), detecting the carrier frequency offset after termination of detecting operation and resumption of transmission of the desired signal is performed.

In addition, in the step (3) measuring power ratio of a signal subjected for a measurement to the interference signal or noise, and comparing the measured power ratio with predetermined threshold, and deciding whether to control the frequency based on this comparison result is performed.

A radio communication method is communicating by transmitting/receiving a signal between a transmission side radio base station and a reception side radio base station, and comprises a step (1) of generating a replica of a received signal, removing an interference wave, and measuring a phase difference with the interference signal removed, a step (2) of measuring a reception quality at the reception side radio base station, a step (3) of representing signal vectors obtained by modulating the desired signal and the interference signal as signal points on a coordinate, and calculating a minimum inter-signal point distance, which is minimum value of a distance on the coordinate between two signal points of a combined signal obtained by combining each signal vector, as a relationship of the minimum inter-signal point distance and the phase difference between the desired signal and the interference signal by rotating desired signal components at arbitrary angular for a predetermined reception quality, and a step (4) of controlling the phase of the transmitted signal at the reception side radio base station based on the calculation result and the reception quality.

A radio communication method is communicating by transmitting/receiving a signal between a transmission side radio base station and a reception side radio base station, and comprises a step (1) of generating a replica of a received signal, removing an interference wave, and measuring a phase difference with the interference signal removed, a step (2) of measuring a reception quality at the reception side radio base station, a step (3) of representing signal vectors obtained by modulating the desired signal and the interference signal as signal points on a coordinate, and calculating a minimum inter-signal point distance, which is minimum value of a distance on the coordinate between two signal points of a combined signal obtained by combining each signal vector, as a relationship of the minimum inter-signal point distance and the transmission power by rotating desired signal components at arbitrary angular for a predetermined phase difference between the desired signal and the interference signal, and a step (4) of controlling the transmission power of the transmitted signal at the reception side radio base station based on the calculation result and the reception quality.

What is claimed is:

1. A radio communication system, comprising:
   a radio receiver including an interference canceller configured to generate a replica of a received signal and remove an interference signal from the received signal, and
   a frequency offset estimator configured to estimate a carrier frequency offset between a carrier frequency of the interference signal and a carrier frequency of a desired signal included in the received signal; and
   a radio transmitter including a frequency controller configured to adjust a carrier frequency of a transmitted desired signal to the carrier frequency of the interference signal based on the carrier frequency offset received from the radio receiver.

2. A radio station, comprising:
   a frequency controller configured to adjust a carrier frequency of a transmitted desired signal to a carrier frequency of an interference signal based on a carrier frequency offset between the carrier frequency of the interference signal and a carrier frequency of a desired signal, and estimated by a radio receiver.

3. The radio station of claim 2, further comprising:
   a baseband modulator configured to modulate a transmitted data to be included in the desired signal into a baseband signal, wherein
   the frequency controller adjusts the carrier frequency of the transmitted desired signal to the carrier frequency of the interference signal by rotating a phase of the baseband signal at an angular speed in accordance with the carrier frequency offset.

4. The radio station of claim 2, further comprising:
   a baseband modulator configured to modulate a transmitted data to be included in the desired signal into a baseband signal; and
   a frequency converter configured to convert a center frequency of the baseband signal using a reference frequency to the desired signal; wherein
   the frequency controller adjusts the carrier frequency of the desired signal to be transmitted to the carrier frequency of the interference signal by controlling the reference frequency based on the carrier frequency offset.

5. A radio communication method, comprising:
  estimating a carrier frequency offset between a carrier frequency of an interference signal and a carrier frequency of a desired signal included in a received signal; and
  adjusting a carrier frequency of a transmitted desired signal to the carrier frequency of the interference signal based on the carrier frequency offset.

6. The radio communication method of claim 5, further comprising:
  measuring a reception quality of the received signal; and
  determining whether to adjust the carrier frequency based on a measured reception quality of the received signal.

* * * * *